US010230587B2

(12) United States Patent
Cordray et al.

(10) Patent No.: US 10,230,587 B2
(45) Date of Patent: *Mar. 12, 2019

(54) DYNAMICALLY DEPLOYABLE SELF CONFIGURING DISTRIBUTED NETWORK MANAGEMENT SYSTEM WITH SPECIFICATION DEFINING TRUST DOMAIN MEMBERSHIP AND/OR PRIVILEGES AND DATA MANAGEMENT COMPUTING COMPONENT

(71) Applicant: ScienceLogic, Inc., Reston, VA (US)

(72) Inventors: Christopher G. Cordray, Chantilly, VA (US); Richard Chart, Truro (GB); David Link, Falls Church, VA (US); Matthew Luebke, Front Royal, VA (US); Karl Ginter, Beltsville, MD (US); Michael Bartman, Potomac, MD (US)

(73) Assignee: ScienceLogic, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,603

(22) Filed: Jul. 15, 2016

(65) Prior Publication Data

US 2016/0323152 A1 Nov. 3, 2016

Related U.S. Application Data

(62) Division of application No. 12/578,364, filed on Oct. 13, 2009, now Pat. No. 9,418,040.

(Continued)

(51) Int. Cl.
*H04L 12/24* (2006.01)
*G06F 15/173* (2006.01)

(Continued)

(52) U.S. Cl.
CPC ............ *H04L 41/20* (2013.01); *G06F 9/4843* (2013.01); *G06F 15/173* (2013.01);
(Continued)

(58) Field of Classification Search
CPC ...... G06F 12/08; G06F 15/173; G06F 15/177; G06F 11/0709; G06F 2221/2101;
(Continued)

(56) References Cited

U.S. PATENT DOCUMENTS 5,204,961 A * 4/1993 Barlow ................... G06F 21/57
703/21
6,108,616 A 8/2000 Borchers et al.
(Continued)

FOREIGN PATENT DOCUMENTS

WO 03/084130 A1 10/2003

OTHER PUBLICATIONS

Bergenti, Toward a Probabilistic Model of Trust in Agent Societies, Engineering Societies in the Agent World (ESAW), 2007, pp. 270-283.
(Continued)

*Primary Examiner* — Greg C Bengzon
(74) *Attorney, Agent, or Firm* — Nixon & Vanderhye P.C.

(57) ABSTRACT

Systems, software, and methods for managing networks of connected electronic devices are described. In one example, network management policy and network management applications are transferred automatically upon detection and identification of a new device, protocol or application on the network. In another example, information related to at least one aspect of the network is obtained by an NMAS, and at least one applicable management policy is identified by the NMAS; and the identified policy is used to manage at least one aspect of the network's operation.

26 Claims, 28 Drawing Sheets

Related U.S. Application Data

(60) Provisional application No. 61/104,426, filed on Oct. 10, 2008.

(51) Int. Cl.
| | | |
|---|---|---|
| *G06F 15/177* | (2006.01) | |
| *H04L 29/06* | (2006.01) | |
| *H04L 29/08* | (2006.01) | |
| *G06F 9/48* | (2006.01) | |
| *H04L 29/14* | (2006.01) | |
| *G06F 12/08* | (2016.01) | |

(52) U.S. Cl.
CPC .......... *G06F 15/177* (2013.01); *H04L 41/042* (2013.01); *H04L 41/082* (2013.01); *H04L 41/0806* (2013.01); *H04L 41/12* (2013.01); *H04L 63/0227* (2013.01); *H04L 63/10* (2013.01); *H04L 67/1002* (2013.01); *H04L 67/16* (2013.01); *H04L 67/2842* (2013.01); *H04L 67/34* (2013.01); *H04L 69/40* (2013.01); *G06F 12/08* (2013.01); *H04L 41/0816* (2013.01)

(58) Field of Classification Search
CPC .............. G06F 11/079; G06F 11/3495; G06F 17/30091; G06F 17/301; G06F 21/554; G06F 21/57; G06F 21/577; G06F 21/645; G06F 2221/2113; G06F 9/45512; G06F 9/54; H04L 41/046; H04L 41/0213; H04L 43/0817; H04L 69/329; H04L 41/042; H04L 41/0631; H04L 41/16; H04L 43/00; H04L 67/12; H04L 12/2807; H04L 12/2818; H04L 2012/285; H04L 41/024; H04L 41/082; H04L 41/0856; H04L 41/0893; H04L 41/12; H04L 41/5003; H04L 41/5009; H04L 41/5032; H04L 43/081; H04L 43/0847; H04L 43/0852; H04L 43/0882; H04L 43/0888; H04L 43/0894; H04L 43/12; H04L 63/0428; H04L 63/105; H04L 63/20; H04L 12/24; H04L 12/2803; H04L 12/2814; H04L 12/282; H04L 12/2823; H04L 12/2825; H04L 12/2827; H04L 12/2832; H04L 29/06; H04L 41/00; H04L 41/0253; H04L 41/064; H04L 41/0816; H04L 41/0853; H04L 63/08; H04L 63/0823; H04L 63/102; H04L 63/1416; H04L 12/2602; G06Q 10/04; G06Q 10/06; G06Q 10/0631; G06Q 10/06311; G06Q 10/06312; G06Q 10/06315; G06Q 10/0637; G06Q 30/02; G06Q 30/04; G06Q 40/12; G06Q 10/06375; G06Q 10/10; G06Q 20/201; G06Q 20/202; G06Q 30/06; G06Q 40/04; G05B 13/024; G05B 13/0265; G05B 15/02; G05B 2219/32015; G05B 2219/32017; G05B 23/0213; G05B 23/0294; G06N 5/02; H04Q 3/0075

See application file for complete search history.

(56) References Cited

U.S. PATENT DOCUMENTS

| | | | |
|---|---|---|---|
| 6,314,555 B1 | 11/2001 | Ndumu et al. | |
| 6,430,613 B1 | 8/2002 | Brunet et al. | |
| 6,704,883 B1 | 3/2004 | Zhang et al. | |
| 6,718,137 B1 | 4/2004 | Chin | |
| 6,834,303 B1 | 12/2004 | Garg et al. | |
| 7,047,423 B1* | 5/2006 | Maloney | H04L 43/045 345/473 |
| 7,089,584 B1* | 8/2006 | Sharma | G06F 21/335 709/203 |
| 7,117,051 B2 | 10/2006 | Landry et al. | |
| 7,123,164 B2 | 10/2006 | Zoladek et al. | |
| 7,213,068 B1 | 5/2007 | Kohli et al. | |
| 7,305,371 B2 | 12/2007 | Brueckner et al. | |
| 7,328,454 B2* | 2/2008 | Strickland | H04L 63/1433 713/188 |
| 7,440,408 B1 | 10/2008 | Anderson | |
| 7,568,025 B2* | 7/2009 | Vasudeva | G06F 11/3409 709/202 |
| 7,689,676 B2 | 3/2010 | Vinberg et al. | |
| 7,725,570 B1* | 5/2010 | Lewis | G06Q 10/04 709/223 |
| 7,725,571 B1* | 5/2010 | Lewis | G06Q 10/04 709/223 |
| 7,730,172 B1* | 6/2010 | Lewis | G06Q 10/04 709/223 |
| 7,802,144 B2 | 9/2010 | Vinberg et al. | |
| 7,814,190 B2 | 10/2010 | Kacin et al. | |
| 7,870,238 B2 | 1/2011 | Pusateri et al. | |
| 7,912,873 B2 | 3/2011 | Or et al. | |
| 7,937,387 B2 | 5/2011 | Frazier et al. | |
| 7,962,590 B1 | 6/2011 | Or et al. | |
| 7,984,074 B1 | 7/2011 | Becher et al. | |
| 8,019,851 B2 | 9/2011 | Nagarajrao et al. | |
| 8,194,680 B1* | 6/2012 | Brandwine | H04L 61/103 370/398 |
| 8,214,329 B2 | 7/2012 | Gilder et al. | |
| 8,234,641 B2* | 7/2012 | Fitzgerald | G06F 21/51 718/1 |
| 8,353,012 B2* | 1/2013 | Del Real | G06F 21/6218 705/326 |
| 8,381,284 B2* | 2/2013 | Dang | G06F 9/468 718/1 |
| 8,417,715 B1 | 4/2013 | Bruckhaus et al. | |
| 8,429,708 B1* | 4/2013 | Tandon | G06F 21/00 380/247 |
| 8,706,851 B2* | 4/2014 | Flinta | H04L 41/0253 370/230 |
| 9,015,703 B2* | 4/2015 | Fitzgerald | G06F 9/45537 718/1 |
| 9,069,599 B2* | 6/2015 | Martinez | G06F 9/455 |
| 9,071,626 B2 | 6/2015 | Morris et al. | |
| 9,641,537 B2 | 5/2017 | Cohen et al. | |
| 9,705,792 B2 | 7/2017 | Cohn | |
| 9,740,757 B1 | 8/2017 | Gilder et al. | |
| 2001/0052005 A1 | 12/2001 | Lachaud et al. | |
| 2002/0046260 A1 | 4/2002 | Day, II | |
| 2002/0091819 A1 | 7/2002 | Melchione et al. | |
| 2003/0014322 A1 | 1/2003 | Kreidler et al. | |
| 2003/0014387 A1 | 1/2003 | Kreidler et al. | |
| 2003/0046443 A1 | 3/2003 | Glitho et al. | |
| 2003/0097425 A1 | 5/2003 | Chen | |
| 2003/0200304 A1 | 10/2003 | Thorpe et al. | |
| 2004/0030796 A1 | 2/2004 | Cooper et al. | |
| 2004/0042470 A1 | 3/2004 | Cooper et al. | |
| 2004/0049698 A1* | 3/2004 | Ott | G06F 21/554 726/23 |
| 2004/0051731 A1 | 3/2004 | Chang et al. | |
| 2004/0064558 A1 | 4/2004 | Miyake | |
| 2004/0083129 A1* | 4/2004 | Herz | G06Q 20/201 726/25 |
| 2004/0098610 A1* | 5/2004 | Hrastar | H04L 41/0893 726/1 |
| 2004/0181664 A1 | 9/2004 | Hoefelmeyer et al. | |
| 2004/0187031 A1* | 9/2004 | Liddle | H04L 63/20 726/1 |
| 2004/0237094 A1 | 11/2004 | Vambenepe et al. | |
| 2004/0249935 A1 | 12/2004 | Jackson et al. | |
| 2005/0091227 A1 | 4/2005 | McCollum et al. | |
| 2005/0091647 A1 | 4/2005 | McCollum et al. | |
| 2005/0102534 A1* | 5/2005 | Wong | G06F 21/577 726/4 |

(56) References Cited

U.S. PATENT DOCUMENTS

| | | |
|---|---|---|
| 2006/0026552 A1 | 2/2006 | Mazzitelli et al. |
| 2006/0072505 A1 | 4/2006 | Carrillo et al. |
| 2006/0107311 A1 | 5/2006 | Dawson et al. |
| 2006/0174323 A1* | 8/2006 | Brown ............... H04L 63/0428 726/3 |
| 2006/0178898 A1 | 8/2006 | Habibi |
| 2006/0218651 A1* | 9/2006 | Ginter ................... G06F 21/00 726/27 |
| 2006/0230109 A1 | 10/2006 | Lee et al. |
| 2006/0248084 A1 | 11/2006 | Sack et al. |
| 2006/0248085 A1 | 11/2006 | Sack et al. |
| 2007/0112574 A1 | 5/2007 | Greene |
| 2007/0180490 A1* | 8/2007 | Renzi ................... G06F 21/577 726/1 |
| 2007/0180519 A1* | 8/2007 | Boccon-Gibod ....... G06F 21/10 726/21 |
| 2007/0198663 A1 | 8/2007 | Helander |
| 2008/0010233 A1 | 1/2008 | Sack et al. |
| 2008/0010288 A1 | 1/2008 | Hinton et al. |
| 2008/0010631 A1* | 1/2008 | Harvey ..................... G06F 8/36 717/131 |
| 2008/0040174 A1 | 2/2008 | Murthy et al. |
| 2008/0046984 A1* | 2/2008 | Bohmer ............. H04L 63/0853 726/5 |
| 2008/0072032 A1 | 3/2008 | Cohen et al. |
| 2008/0103610 A1 | 5/2008 | Ebrom et al. |
| 2008/0109870 A1* | 5/2008 | Sherlock ............... G06F 21/552 726/1 |
| 2008/0189405 A1 | 8/2008 | Larenin et al. |
| 2008/0196099 A1* | 8/2008 | Shastri ............... H04L 41/0893 726/12 |
| 2008/0222711 A1* | 9/2008 | Michaelis .......... G07C 9/00039 726/7 |
| 2008/0228908 A1 | 9/2008 | Link et al. |
| 2008/0235804 A1* | 9/2008 | Bade ..................... G06F 21/57 726/26 |
| 2008/0307488 A1* | 12/2008 | Hammond, II ....... H04L 41/046 726/1 |
| 2009/0007223 A1* | 1/2009 | Centonze ............. G06F 21/6227 726/1 |
| 2009/0013210 A1 | 1/2009 | McIntosh et al. |
| 2009/0089625 A1 | 4/2009 | Kannappan et al. |
| 2009/0217163 A1 | 8/2009 | Jaroker |
| 2009/0249440 A1* | 10/2009 | Platt ................... H04L 63/0815 726/1 |
| 2009/0249473 A1* | 10/2009 | Cohn ................ H04L 29/12028 726/15 |
| 2009/0254970 A1* | 10/2009 | Agarwal ............... G06F 21/554 726/1 |
| 2009/0271504 A1 | 10/2009 | Ginter et al. |
| 2009/0300724 A1* | 12/2009 | Cho ........................ G06F 21/10 726/4 |
| 2010/0005103 A1 | 1/2010 | Hager et al. |
| 2010/0017870 A1* | 1/2010 | Kargupta ............ H04L 63/1408 726/14 |
| 2010/0023151 A1 | 1/2010 | Shieh et al. |
| 2010/0030893 A1 | 2/2010 | Berg et al. |
| 2010/0186091 A1* | 7/2010 | Turner .................. G06F 17/241 726/26 |
| 2010/0228854 A1* | 9/2010 | Morrison ................ H04L 29/00 709/224 |
| 2010/0332630 A1* | 12/2010 | Harlow ................. H04L 41/048 709/221 |
| 2010/0332638 A1* | 12/2010 | Lewis ..................... H04L 41/00 709/223 |
| 2011/0314148 A1* | 12/2011 | Petersen ............. G06F 11/3476 709/224 |
| 2012/0331388 A1 | 12/2012 | Nedelcu et al. |
| 2014/0201811 A1* | 7/2014 | Sack ................... G06F 21/6227 726/3 |
| 2014/0208426 A1* | 7/2014 | Natarajan, Sr. ..... H04L 63/1416 726/23 |
| 2015/0319182 A1* | 11/2015 | Natarajan, Sr. ......... G06F 21/53 726/24 |
| 2016/0294869 A1 | 10/2016 | Labana et al. |
| 2016/0321572 A9* | 11/2016 | Martinez ................ G06Q 10/06 |

OTHER PUBLICATIONS

Feridun, M., et al., "Distributed Management with Mobile Components," IBM Research Report, Feb. 1999, XP-002158233, pp. 857-870.

Kawamura, R., et al., "A Middleware Architecture for Active Distributed Management of IP Networks," IEEE, Apr. 2000, XP-010376690, pp. 291-304.

Rueppel, Collaborative Fire Protection Engineering Based on Software Agents, 19th International Symposium on Automation and Robotics in Construction (ISARC), Sep 23, 2002.

Wikipedia, Software agent definition, Sep. 8, 2009.

* cited by examiner

FIGURE 16 (Model 1)

(Model 1)

FIGURE 18 (Model 2)

(Model 2)

(Model 3)

DYNAMICALLY DEPLOYABLE SELF CONFIGURING DISTRIBUTED NETWORK MANAGEMENT SYSTEM WITH SPECIFICATION DEFINING TRUST DOMAIN MEMBERSHIP AND/OR PRIVILEGES AND DATA MANAGEMENT COMPUTING COMPONENT

1 CROSS REFERENCE TO RELATED U.S. PATENT APPLICATIONS

This application is a division of U.S. patent application Ser. No. 12/578,364 filed Oct. 13, 2009; which claims the benefit of Provisional Application No. 61/104,426 filed Oct. 10, 2008; both of which are incorporated herein by reference. The present application is related to U.S. patent application Ser. No. 11/175,407 filed on Jul. 7, 2005, now U.S. Pat. No. 9,077,611; and U.S. patent application Ser. No. 12/051,125 filed on Mar. 19, 2008; the entireties of both applications are incorporated herein by reference for all purposes.

2 BACKGROUND OF THE TECHNOLOGY HEREIN 2.1 Field

The exemplary, illustrative, technology herein relates to systems, software, and methods for managing the operation of networks composed of various and disparate electronic devices. More particularly, the exemplary, illustrative, technology herein provides systems, software, and methods for automatically configuring and enabling network management and monitoring software and systems for managing and monitoring the operation of networks composed of various and disparate electronic devices. The technology herein has applications in the areas of network management, computer science, electronics, and electronic commerce.

2.2 Background

Computer network technology has experienced phenomenal growth over the past two decades, from the esoteric experimental defense-related projects known to only a handful of electronics and military specialists in the 1960s and 1970s, to the epicenter of the so-called dot-com stock market boom of the late 1990s. Today, tens, perhaps hundreds, of millions of people all over the globe rely on computer networks for their jobs, education, and entertainment. In the industrialized world, access to computer networks appears to be almost ubiquitous. Examples include not only the traditional TCP/IP-based networks, such as the Internet and home or office Local Area Networks (LANs), but also include building control networks for managing a building's internal environment, networks of sensors for monitoring air quality, factory floor automation, and combined communications systems connecting previously disparate systems. Non-traditional networks, such as those used for monitoring and control of factory automation or building systems are referred to collectively herein as "SCADA" networks. SCADA stands for "Supervisory Control And Data Acquisition". SCADA network systems provide process supervisory control and data collection capabilities used to operate many industrial systems today. Industrial processes and machines are controlled by SCADA systems using industrial controllers such as programmable logic controllers (PLCs). In recent years, PLCs have become better integrated with TCP/IP-based networks, but often still require custom applications for control and management. Other industrial controllers have not migrated to TCP/IP due to various technical and other considerations. Thus, in general, the term "network" or "computer network" includes both "traditional networks," i.e., those using TCP/IP and/or Simple Network Management Protocol (SNMP) protocols, and "non-traditional" networks that do not have either an SNMP (or other TCP/IP management stack), an SNMP Object ID (OID)-based management data hierarchy, or other aspects required for "traditional" network management functions to operate as understood by those having ordinary skill in the art. Typically, non-traditional networks use protocols such as Controller Area Network (CAN) bus, used in vehicles, industrial automation and medical devices and IEEE 488 or General Purpose Interface Bus (GPIB). The differentiation of traditional and non-traditional computer networks will be apparent to those persons having ordinary skill in the art.

As used herein, "network" or "computer network" includes both traditional and non-traditional networks as just defined. A "network" is a configuration of devices and software that are in mutual communication and can exchange information, including data and instructions. Such communication is accomplished by the presence of a direct physical connection between devices (i.e., wired communication) and/or indirectly by electromagnetic or other non-physically connected communication (i.e., wireless communication), using whatever protocols are extant between the two devices. A network can include arbitrary numbers and types of devices, systems, and applications, which, in some exemplary, illustrative, non-limiting embodiments, function in accordance with established policies. In some networks the devices, systems and applications comprising the network can change over time, as can their configurations, locations and other parameters as devices are connected or disconnected from the network whether purposely or inadvertently.

Examples of devices, systems, and applications that can comprise a traditional network consistent with the technology described herein include, without limitation:

- Traditional network infrastructure devices such as routers, switches, and hubs;
- Traditional networked computing assets, such as mainframes, servers and workstations;
- Traditional network links, including dedicated and dial-up connections and related devices (e.g., Digital Subscriber Loop (DSL) connections, modems, concentrators, and the like);
- Industrial devices, such as those controlled by programmable logic controllers (PLCs), embedded computers, or other controllers that can support traditional network protocols;
- Network services, such as Simple Object Access Protocol (SOAP)-based application servers, web services, network infrastructure services such as Domain Name System (DNS) and Dynamic Host Configuration Protocol (DHCP), and file sharing services;
- Applications, such as databases (e.g., those sold commercially by Oracle (Redwood City, Calif.), IBM (Armonk, N.Y.), and Microsoft (Redmond, Wash.)), e-mail systems (e.g., sendmail, POP/IMAP servers); customer relationship management (CRM) systems, and enterprise management applications (e.g. those sold commercially by Oracle and SAP (Walldorf, Federal Republic of Germany));
- Consumer appliances (e.g., "smart" cell phones, audio/visual equipment, network-connected home lighting controllers); and
- Systems acting as "gateways" to non-traditional networks, that allow data to be transferred between traditional and non-traditional networks due to their connectivity to both types of network, and ability to use appropriate networking protocols for each.

Examples of devices, systems, and applications that can comprise a non-traditional network consistent with the technology described herein include, without limitation:

Dedicated building control components, such as thermostats, furnace and chiller controls;
Vehicle vessel and aircraft control and communication systems
Medical device control and communication systems
Ladder logic controllers, such as those used to operate elevator or other systems;
Scales, flow or pressure gauges, tachometers, or other measurement devices;
Meters and other devices for the display of aspects of system status, usually in "real time";
Sensors, including various types of embedded sensors and arrays of sensors, including RFID sensors, bar code readers or video scanners;
Industrial device controllers, such as PLCs, embedded computers, Coordinate Measuring Machines (CMMs), and similar devices when connected on non-TCP/IP based networks;
Data acquisition and Control networks, such as DeviceNet, CANopen, ModBus, VLXI, VME, IEEE 1394, and IEEE 488;
Process automation robotics;
Telephony-based networks, including analog and digital cellular networks;
Power grid networks for distributing electrical power
Consumer appliances (e.g., cell phones, audio-visual equipment, information kiosks); and
Dedicated infrastructure components (e.g. Private Branch Exchange (PBX's), automated dialers, and call routing systems).

The network configuration can be either static (i.e., the devices that comprise the network do not change during network operation) or the configuration can be dynamic (i.e., devices may be connected to, or disconnected from, the network during operation). In some instances connection or disconnection of devices from the network can result in segmentation of the network, where some parts of the network lose connectivity with other parts of the network, while retaining connectivity between devices in each part (e.g. when a router device that connects two network segments is disconnected or fails, the two network segments lose connectivity with each other, but retain connectivity between devices within each segment).

Not only have computer networks become more common, but the complexity of these electronic webs has increased as well. Today, a network administrator must deal simultaneously with a myriad of different devices, manufacturers, network types, and protocols, as well as support the ad-hoc attachment and removal of devices from the network as portable wireless devices automatically connect and disconnect from the network infrastructure. Often the coordination among the developers of the software, hardware, and firmware of networked devices is loose at best. Devices must be able to communicate properly across the network without interfering with each other, but this is not always the case whether due to design, malfunction, misconfiguration, or misuse. In particular, administrators must be able to identify warnings and troubleshoot abnormal behavior on the network and network-attached systems before risk to network integrity or availability occurs. Non-traditional networks (e.g. CANbus, IEEE 488) and the devices connected to them are often used in real-time operation of SCADA systems, increasing the urgency that these networks and devices be effectively managed. Traditional management systems, i.e., management systems that are used to manage traditional computer networks, typically do not integrate with non-traditional networks and traditional management paradigms are generally not extensible to support non-traditional networks and devices.

To handle the growing network management workload, various network management devices ("NMDs") have been developed, examples of which are described in the above-incorporated '407 and '125 Applications. By way of illustration, the network management device (NMD) of U.S. patent application Ser. No. 12/051,125 is a network appliance device, comprising hardware and software components, designed to flexibly operate upon traditional, SCADA, and Statistical Process Control (SPC) networks that are connected using a variety of transports, gateways, and networks. Traditional TCP/IP-based controllers, PC-connected or connections using gateway-style interface applications, and direct device control mechanisms are all supported using the same NMD. Various dynamic application(s) and templates interact with a collector installed upon the NMD to provide capabilities to interact with both traditional and non-traditional networks, either individually or in hybrid networks that combine both traditional- and non-traditional networks. The collector relies upon pre-installed network interface software present on the NMD to permit access to network data and devices through the NMD's network interface hardware. The collector and other NMD software also rely on known NMD operating system capabilities, such as input/output (I/O) libraries or services, and inter-process communication capabilities for access to non-volatile data storage systems, such as file systems on disk drives or relational database servers, to store collected data, retrieve dynamic application programs and templates, and other data resources necessary to the functioning of the NMD. NMD software is created with an understanding of the capabilities of the NMD hardware, such as CPU type, processing power, RAM memory capacity, I/O throughput, non-volatile storage capacity, number and type of network interfaces, so as to guarantee that NMD software can execute and provide the required level of performance to adequately monitor the network it is installed upon.

Current non-NMD network management systems are often complex and do not operate well for most users. First, these systems can have onerous deployment and operation requirements. Many require specialized expertise just to install and configure the network management software and additional applications. Others require additional expertise-based configurations of the software and applications to monitor a network, including: complex collections of vendor-specific applications to monitor disparate hardware and software and extensive custom programming to monitor applications.

Second, many non-NMD management systems can monitor only a limited number of attributes per network connected device, use a single network management protocol, or do not monitor system, application status, network performance, or quality of service ("QoS") attributes. Furthermore, many non-NMD management systems do not cross-correlate between multiple network services and check for discrepancies between network services that provide coordinated services. Moreover, many network management systems are designed under the presumption that the network infrastructure is always functioning; and therefore may not be reliable when network service interruptions or degradations occur. Even the NMD has limitations in this area, since it can only monitor the network as seen from the point it is connected to, and when failures or misconfiguration of network components results in breaks in the network topology, the NMD can no longer monitor those network segments on the far side of a break in the network's connectivity. In many cases, management systems are tied to particular hardware devices, such as "sniffers" (e.g. the Portable Analysis System, sold by Network Instruments of Minneapolis, Minn.), or the NMD referred to above. Having a specific hardware component in the management system simplifies the initial deployment of the system, but places limitations on speed and flexibility of response to changes in network configuration, such as temporary network partitioning due to router failure or misconfiguration, and can involve other adverse factors such as expense, delay, and infrastructure requirements (e.g. space, power and cabling) when networks grow, change topology, or experience changes in traffic load, whether temporarily or permanently.

Third, the day-to-day operation of most current network management products requires skilled network operations staff to configure and maintain the management software and network, including adding and removing devices and device configurations as the network topology changes. Configuration typically requires that the staff manually collect information about network management applications (and management information base ("MIB") configurations) used to manage the devices that are part of the network from individual device manufacturers, manually install and configure the software, and then manually set the thresholds for sending alerts. Many network management systems and applications are limited to using a single management protocol, for example, the Simple Network Management Protocol ("SNMP"), to collect information from devices, forcing the network operators to reconcile SNMP requirements with their management policies. Furthermore, the tools available to accomplish these tasks are primitive, often overloading network operators with excessive reporting responsibilities and failing to support automatic correlation of information about devices present on the network. For example, limitations in SNMP architecture force network operators to manage networks of devices from a single management station, or clear the same error reports from multiple terminals. Often, network devices only report their own internal status; but do not provide a network operator with critical information on the status of the device's communication with the network, nor do they provide information regarding the status of applications and services operating on the device.

Current network management systems are typically not responsive to degradations in network performance. They do not adjust their own use or monitoring of the network to alleviate or troubleshoot network issues that might be resulting from hardware failures, denial of service (DoS) attacks, ill-advised changes in network topology, spikes in network usage levels, or breaks in network connectivity.

FIG. 1 displays a diagram of an exemplary prior art network (1000) that includes an NMD (1080) as well as a number of other devices of various types, such as mainframe computers (1015), desktop computers (1010), file servers (1025), and printers (1020). Network 1000 includes a plurality of network segments (1060, 1060') connected by various technologies, such as Ethernet (1045), or Token Ring (1040), sometimes separated by firewalls (1070, 1070') and with links to a larger network (1090), such as the Internet, where additional devices such as wireless networking devices (1050) and wireless mobile devices (1030) can exist that can connect with the devices of the managed network segments. Those with skill in the art will realize that the depicted network is exemplary only, and that many configurations of the devices shown, as well as other devices not shown, are possible.

In such networks it is possible to form connections between devices on a first network segment (1060) and devices on a second network segment (1060') for some purposes while being unable to monitor network or device state or traffic on the second network segment from the first network segment due to the restrictions imposed by firewalls or other limiting devices. For example, continuing with FIG. 1, if the NMD (1080) detects data communication between a first device (1065) on its segment (1060) and a second device (1065') on the firewalled segment (1060'), this discovery can result in a desire to monitor network use and device status of the second device (1065'), but the firewalls (1070 and 1070') block all traffic except that involved in the link between the first device (1065) and the second device (1065'). Using NMDs (1080) to monitor the second device (1065') requires physically connecting the NMD (1080) to the second device's network segment (1060'), which can preclude continued monitoring of the first device's network segment (1060) (depending on the specifics of the firewall restrictions), and might involve relocating the NMD into physical proximity to the second device's network segment, perhaps over a great distance (in the example depicted, from Washington, D.C., USA to Tokyo, Japan). This can result in both lengthy delays and expenditures of money. Alternatively, a second NMD (1080') can be procured and installed on the second device's network segment (1060'). This would permit simultaneous monitoring of both network segments, but still involves an expenditure of time and money, and may not be practical when there are a large number of network segments and a small budget for network monitoring, or if some network segments are located in areas lacking required resources, such as space, power or management personnel.

As depicted in FIG. 2, an exemplary prior art NMD (2000) is a network appliance device made up of dedicated hardware and software systems that work together to monitor and manage a network and the devices connected to it. Often such prior art NMDs self-configure once connected to a network through an auto-discovery mechanism using both passive and active techniques to detect, identify, configure and monitor other network devices using embedded and dynamic applications (2400), as well as optionally providing preintegrated applications (2500) such as Domain Name System (DNS), Dynamic Host Configuration Protocol (DHCP), and other such services as required. The exemplary prior art NMDs also provide a user interface (Device Interface) (2200) to the prior art NMD (2000) so as to allow control and configuration of the device (with configuration information stored in a Configuration Policy (2060)), examination of the data collected, and other required tasks, to generate reports, to receive alerts and traps as required, and can provide storage (2810) for collected monitoring data (2814) and configuration data for various devices or device types (2816 or 2812) as well as management of the available data storage resources (2800). The prior art NMD additionally has an Operating System (2100) to manage processes and resources of each discovered device in conjunction with a device manager (2050), communications interfaces (2600) for publishing (2620) and receiving (2610) information, a Maintenance Scheduler (2900) for performing periodic or timed activities, and an Error Handler (2910) for dealing with various error conditions. Detection and recognition of other devices, as well as monitoring, is performed by a Recognizer (2700), consisting of a Collector (2720) and its plug-in applications (2730), and three manager functions which manage dynamic applications (2710), Templates (2750) that describe various devices, device types, and events (2740).

The above-described exemplary prior art NMDs cannot be easily, inexpensively, or quickly replicated to deal with network growth, or be flexibly and dynamically deployed to continue monitoring activities during partial network outages or device failures (including failures of the prior art NMD hardware itself), or relocated to monitor isolated network segments, such as those on the opposite side of a router or switch, without expenses for additional hardware, transport and staff time. Furthermore, such prior art NMDs do not provide automated control and specification of flexibly deployable data collection and device management mechanisms, the specification of a flexibly deployable data storage and retrieval mechanism, or automatic adjustment of a prior art NMD's behavior, its data collection and handling mechanisms, and dynamic application behavior, or use based on network environment factors such as current traffic load, network outages, device failures, or DoS attacks. Furthermore, prior art NMDs do not support flexible trust configurations so as to allow monitoring and management of a given network by a plurality of entities (e.g. IT departments, ISPs or network support companies) without permitting all to have full access to the network and related data.

Thus, there is an immediate need for network management systems that are more robust, and simpler to install, configure, and maintain, which are responsive to changes in network performance so as to maintain a desired Quality of Service (QoS), and of monitoring even if the network topology is disrupted or is unstable. The exemplary illustrative non-limiting technology described herein meets these and still other needs.

3 SUMMARY OF THE TECHNOLOGY HEREIN

One exemplary illustrative non-limiting implementation herein provides a network management method comprising: deploying network collection software on a first network or subnetwork; executing said network collection software on a hardware component of the first network or subnetwork; discovering, with the executing network collection software, information relating to the configuration of the first network or subnetwork; and sharing said discovered configuration-related information with a further, trusted instance of the same or different network collection software that is also discovering information relating to the configuration of the first network or subnetwork to thereby collaborate network configuration discovery.

A further exemplary illustrative non-limiting implementation herein provides a method of collecting configuration data for a plurality of network segments, comprising: deploying a first collection unit on first network segment; using said first collection unit to collect configuration related information concerning the configuration of said first network segment, including filtering said configuration related information using at least a first filtering profile; deploying a second collection unit on second network segment different from said first network segment; using said second collection unit to collect configuration related information concerning the configuration of said second network segment, including filtering said configuration related information using at least a second filtering profile different from said first filtering profile.

A further exemplary illustrative non-limiting implementation herein provides a method of dynamically distributing network configuration monitoring functions among plural disparate collection units residing in different network domains, comprising: deploying plural collection units across at least one network; pushing at least one network configuration collection function or template to at least some of said deployed collection units; allowing at least some of said deployed collection units to pull at least one further network configuration collection function or template.

An additional exemplary illustrative non-limiting implementation provides a collection of cooperative network configuration collection units deployed across at least one network comprising: a first collection unit disposed on a first network segment; a second collection unit disposed on a second network segment; wherein said first and second collection units operate together as a distributed collection unit to produce an integrated set of collected information.

A further exemplary illustrative non-limiting implementation provides a network configuration collection architecture comprising: a first collection unit disposed on a first network segment, said first collection unit automatically collecting configuration information relating to said first network segment; a second collection unit disposed on a second network segment, said second collection unit automatically collecting configuration information relating to said second network segment; and plural task managers cooperating to at least in part control at least one of said first and second collection units.

A further exemplary illustrative non-limiting implementation provides a network discovery architecture comprising: at least one collection unit disposed on at least one network segment, said at least one collection unit operable to discover configuration information pertaining to said at least one network segment; and a software-based data manager deployed to communicate with said at least one collection unit, said data manager storing at least some information that supports said at least one collection unit.

A further exemplary illustrative non-limiting implementation provides a network management system operable on a first network or subnetwork, comprising: plural instances of network collection software deployed on at least one network or subnetwork, said plural network collection software instances discovering, in a collaborative manner, information relating to the configuration of the at least one network or subnetwork and sharing said discovered configuration-related information therebetween; and a control node coupled to said at least one network or subnetwork, said control mode being configured to communicate commands and other control information with said plural network collection software instances over said at least one network or subnetwork, wherein said control mode has a relationship of trust with said plural network collection software instances.

Additional exemplary illustrative non-limiting features and advantages include:

The abstraction of the collection unit (CU) component as stand-alone software which is not part of an EM7 or other network appliance, which supports ease of deployment, software-only deployment scenarios, and deployment extensibility and configurability. This eases the deployment of CUs and their control infrastructure and permits the CUs to be automatically deployed, self-discovering, self-configuring, and self-assembling into groups of CUs under common control called CUGs. Collection units may be managed as trusted groups called trust domains (TD). Trust domains are typically independent of object origin, location or use, and comprise privileges that vary between entities within a TD. CU and CUGs may simultaneously belong to one or more trust domains.

CU deployments may occur on, and can monitor, many types of hardware and software on a network. In particular, CUs may be instantiated to monitor and/or control SCADA networks, either upon devices within a SCADA network itself, or from gateway devices attached to the SCADA network.

One important aspect of the collection units is that they are extensible, and this extensibility may be managed from any task manager (TM) in the CU's trust domain, or by cooperatively by members of the CU's trust domain, e.g. other CUs, Data Managers (DM), and/or TMs. The extensibility is enabled by the specification and/or push of templates and dynamic applications from other CUs, Data Managers, and/or TMs. Extensible CUs are not limited by initial construction or configuration but can change capability based on needs as they are determined. These capability changes are dynamic in response to changing requirements, and may include changes in processing capabilities, the gathering of information, and the defined processing of information and its distribution.

CUs in a trust domain may receive tasking instructions and provide task status and collected information to other members of the trust domain, including one or more task managers and/or one or more data managers. CUGs may be controlled by plurality of Task Managers, where each task manager may severably or jointly be effective to control one or more CUs. In some exemplary embodiments, this control is performed when there are two (or more) TMs, each from the same TD. In another exemplary embodiment, this control is performed when there are two (or more) TMs, each from disparate TDs. Tasking for each CU may be provided by one or more TMs, by one or more CUs within the CU trust domain on a cooperative basis. CU's tasking instructions may also include instructions as to the dynamic applications and/or templates to use during monitoring and/or processing of collected information. Control from a plurality of TMs reduces likelihood of CU/CUG isolation from a controlling TM caused by network partitioning, broken links, or other operational problems.

Centralized control of tasking within the CUG, and provides for distributed control within a CUG without requiring every CU to participate in the overhead operations. This provides the capability to respond to collection load changes by replication, redeployment and/or task restriction of CUs, and directly supports load balancing between the CUs of the CUG. This response may be under TM control, or, within a CUG, by CUG internal interactions.

In some exemplary implementations, the distribution of tasking may be made based upon load factors (e.g. based upon absolute load, upon overall load balancing of a set of CUs), specific assignments from another CU or TM, as an automatic failover when a first CU detects the failure of a second CU, by a first CU "winning" a bidding process for the right to provide CU services. Failover of a CUs tasks to remaining CUs in the CUG when the CU is lost either by task reinstatement when CU recovers, by delayed re-joining of the failed CU, or by automatic load balancing.

Additional aspects of exemplary embodiments provide for cooperating TMs to share CU/CUGs. This may occur when a first TM directs an existing CU/CUG to monitor one or more aspects of a network or network segment and to send resulting data to a DM of second (disparate) TM. Alternatively, it may occur by a first TM instructing an existing CU/CUG to join a TD managed by a second TM, resulting in a first TM in a first TD sharing a CU and/or CUG with a second TM in a second TD, which reduces number of CU/CUG required to monitor a given network. Similarly, aspects of exemplary embodiments permit cooperating TMs share DMs, again by a first TM directing one or more DM(s) associated with a first TM in a trust relationship to send specific collected information to one or more DM(s) associated with at least a second TM. Alternatively, a first TM can direct an associated DM to join a TD managed by a second TM. The sharing of DMs enables more rapid and efficient allocation of CU/CUGs Groups of cooperative CUs that operate together as a distributed CU (CUG) may share discovered (collected) information between members of the CUG, and/or share dynamic applications between CUG members In additional aspects of exemplary implementations, CUs may provide filtering, transformation, and transient storage of information collected related to aspects of the network. The CUs and their data managers (DMs) may be configured in a variety of topologies as makes sense by the particular implementation. For example, a CU may be configured to send part or all of the information collected to a first DM, and send a different part (or same or complete set) of the collected information to a second DM. The collection, transformation, and communication of information from CU to DM is performed under instruction as described above. Specific exemplary configurations include: a) where Data Collection Filtering is performed on a CU by CU basis, including restriction of CU Monitoring (i.e. a "don't collect this" capability), b) where each CU sends data to one or more DM, c) were a CU can send to another CU that forwards the data according to its own routing rules, optionally where the priority of the data affects the forwarding CU's choice of data route, d) where each CU stores prepared data individually for different DMs, e) where each CU stores prepared data individually for different DM's (re operations), f) where communications between a CU and a DM occur at differing times, and/or using differing methods, such as having a CU push collected information to a DM, or having a CU cache and digests the collected information and push the collected information to DM after the cache has filled to a specific level or amount, having a CU cache the collected information and digest the information, then having the CU push the digested information to the DM, having the CU cache the collected information, scan the collected information for specific results, and the have the CU alert the DM, either with an alert or by pushing the collected information or a subset of that information to the DM; or by having a DM retrieve the cached collected information from a CU as desired by the DM (either on a timed basis, on an alert basis, or on an as-needed basis).

In some exemplary implementations, a DM may be a member of a single TD. Alternatively, it may be configured as part of a plurality of TDs.

In exemplary implementations, a CU, TM, and/or DM may be instantiated on a device connected to a non-traditional network, such as a SCADA network. CU, TM, and/or DM components may be configured as stand-alone components (e.g. not part of an NMD).

Exemplary implementations of the inventions illustrate processes for remotely managing one or more CU and/or CUGs, where a TM (or other authorized member of the a TD, such as an authorized DM and/or CU, also known as a control node) instructs one or more CU and/or CUG as to the dynamic apps and monitoring to perform, specifically, instances where: a) where a TM instructs a CU on or more aspects of information to collect and report, b) where a TM instructs any CU in a CUG and the CU relays to other CUG members, c) where a CU reports new discoveries to a TM, and the TM subsequently instructs a CU (the same or different) to collect and report information about the discovered device, d) where a TM instructs two or more CUs to effect the movement of monitoring and reporting functions for a device from one CU to another, e) where a TM instructs a CU what devices and/or services to monitor/process and/or not to monitor/process, f) where a TM instructs a CU where to store the collected information, and may further instruct the CU as to pre-processing steps to take.

The exemplary implementations presented herein illustrate the features of the inventions described herein, including: a) rapid replication and/or redeployment of management components, including CU, CUG, DM and TM on an as needed basis, b) the ability to deploy CUs to and have them monitor areas where hardware appliance can not be installed, and c) more comprehensive network coverage, particularly when the networks are broken or unintentionally segmented. In many cases, it is likely some collecting will continue even after individual device failures. In particular, the exemplary implementations permit the monitoring of SCADA nets from traditional networks, from traditional network to SCADA network gateways, and internally within SCADA networks.

4 BRIEF DESCRIPTION OF THE DRAWINGS

These and other features and advantages will be better and more completely understood by referring to the following detailed description of exemplary non-limiting illustrative embodiments in conjunction with the drawings of which:

Figure 5:
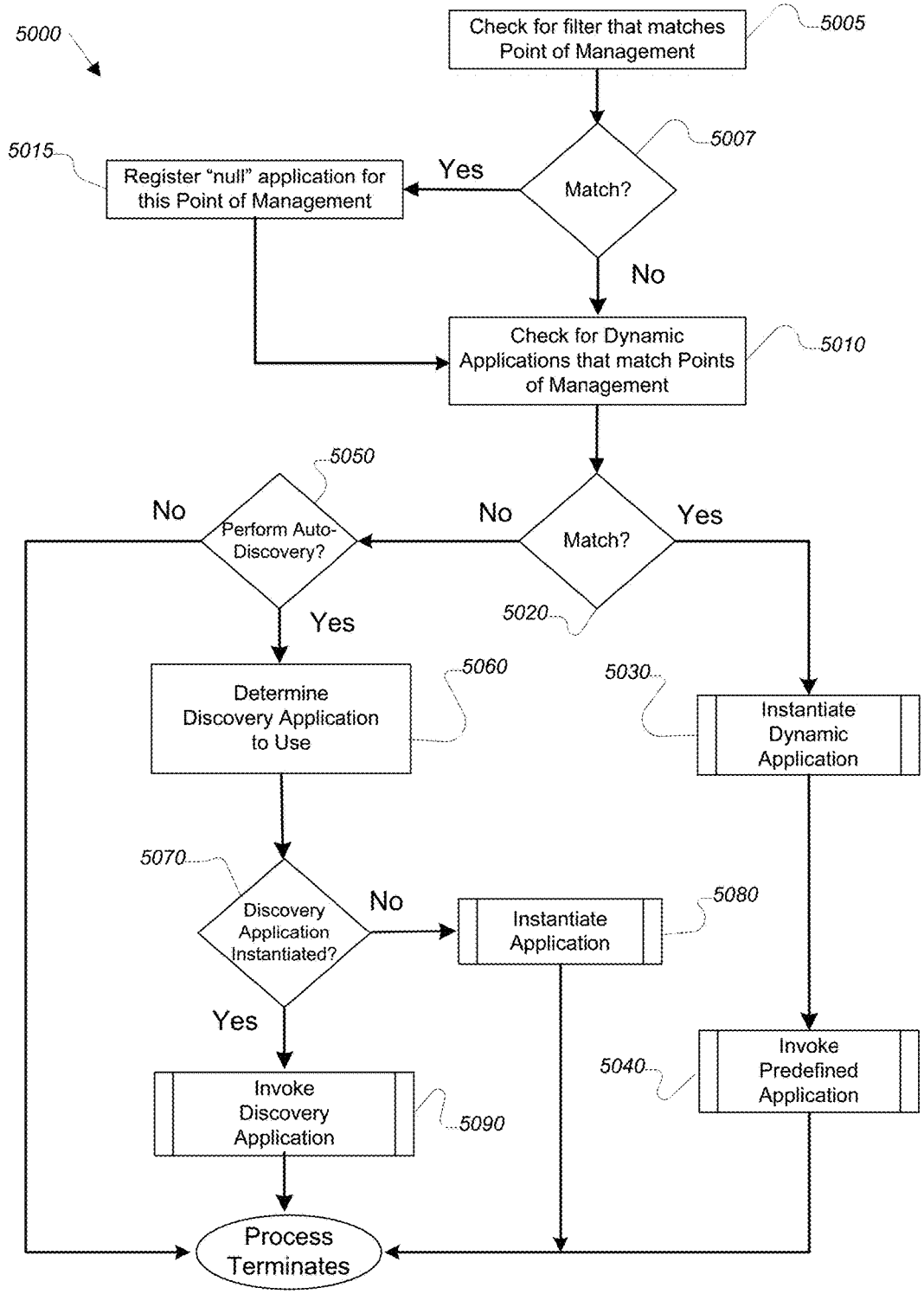

FIG. 5 comprises a flowchart describing an exemplary auto-discovery process wherein filtering is performed on some Points of Management through the use of a "null" application specification in accordance with an exemplary embodiment of the illustrative technology herein.

Figure 6:
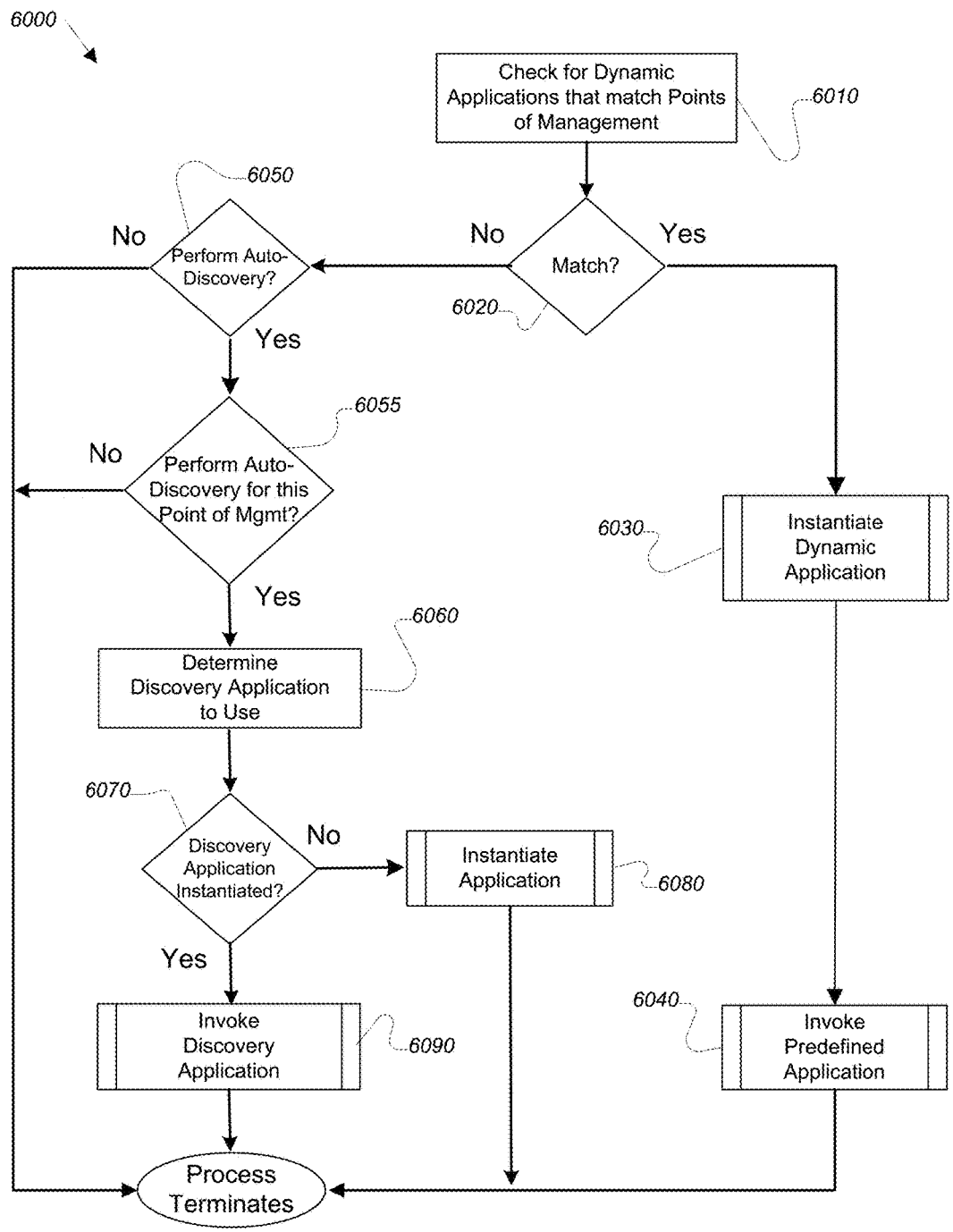

FIG. 6 comprises a flowchart describing an alternative exemplary auto-discovery process wherein some Points of Management are not to have auto-discovery performed on them in accordance with an exemplary embodiment of the illustrative technology herein.

Figure 7:
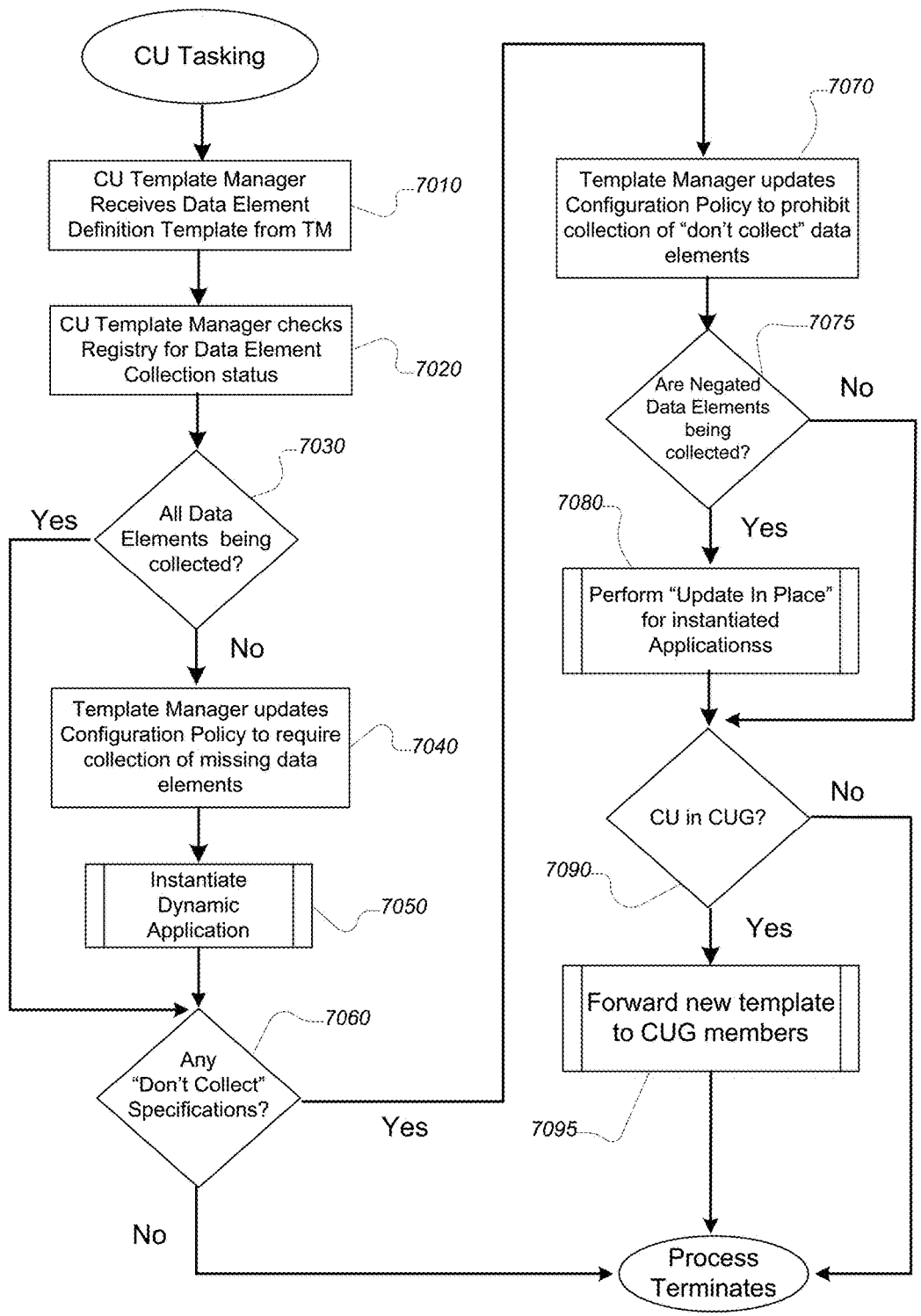

FIG. 7 comprises a flowchart describing the process of a CU being given data collection and/or non-collection tasking in accordance with an exemplary embodiment of the illustrative technology herein.

Figure 8:
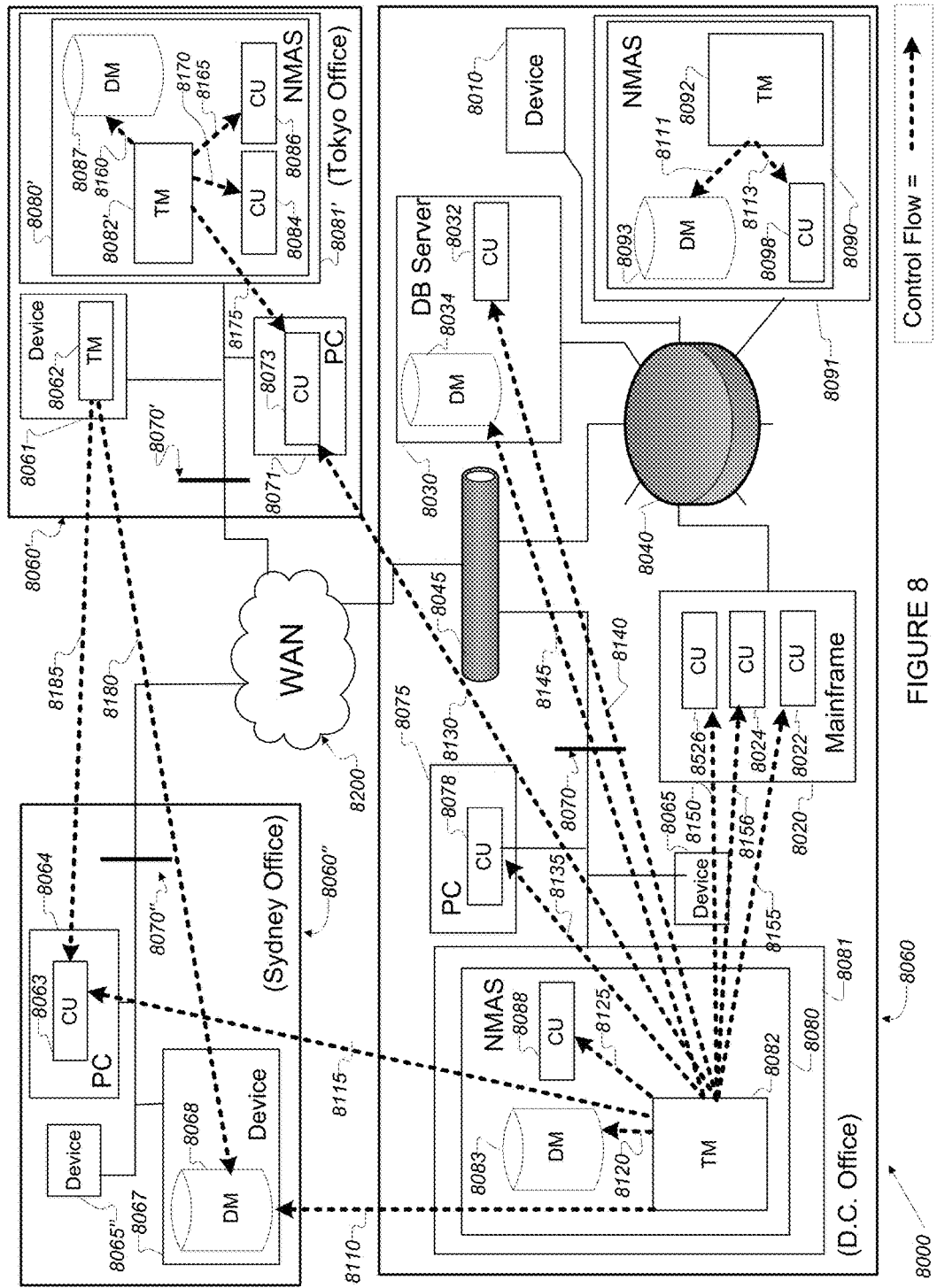

FIG. 8 depicts the network of FIG. 3, including exemplary control information flows between Task Managers and Collection Units in accordance with an exemplary embodiment of the illustrative technology herein.

Figure 9:
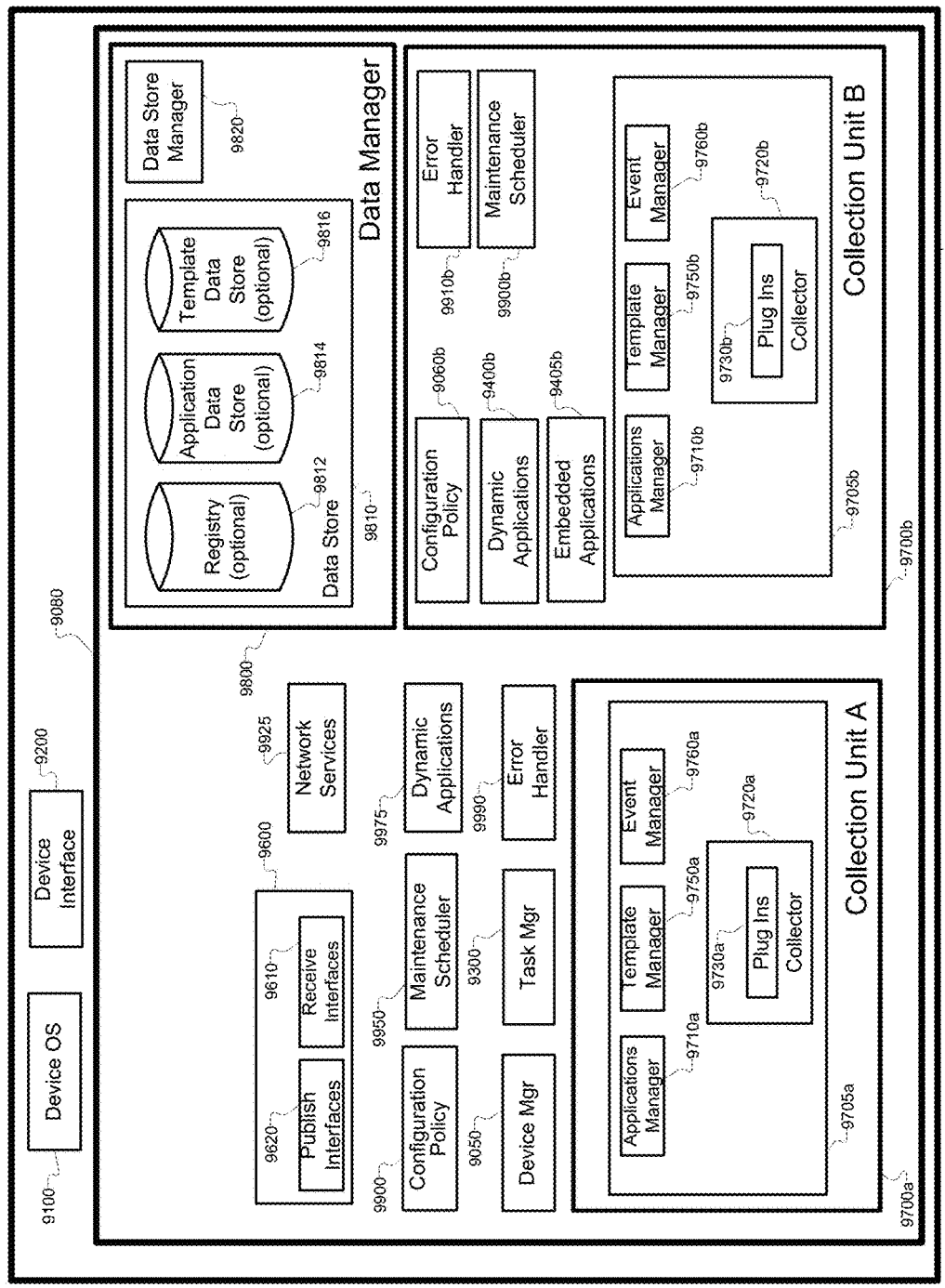

FIG. 9 depicts a schematic diagram of an NMD hosting some NMAS aspects in accordance with an exemplary embodiment of the illustrative technology herein.

Figure 10:
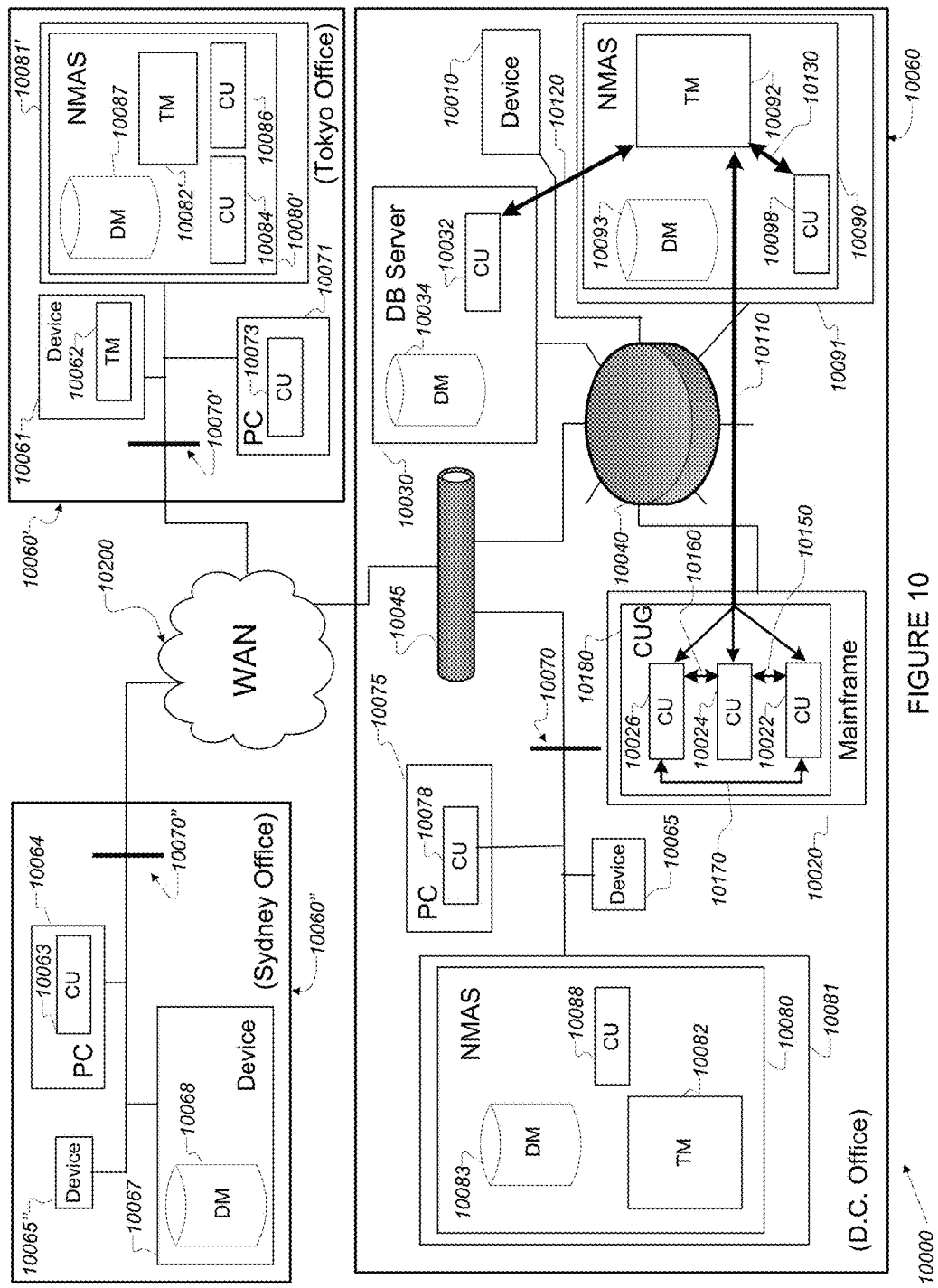

FIG. 10 depicts the network of FIG. 3, including some exemplary communication linkages between a Task Manager and some Collection Units, three of which are members of a Collection Unit Group in accordance with the exemplary illustrative technology herein.

Figure 11:
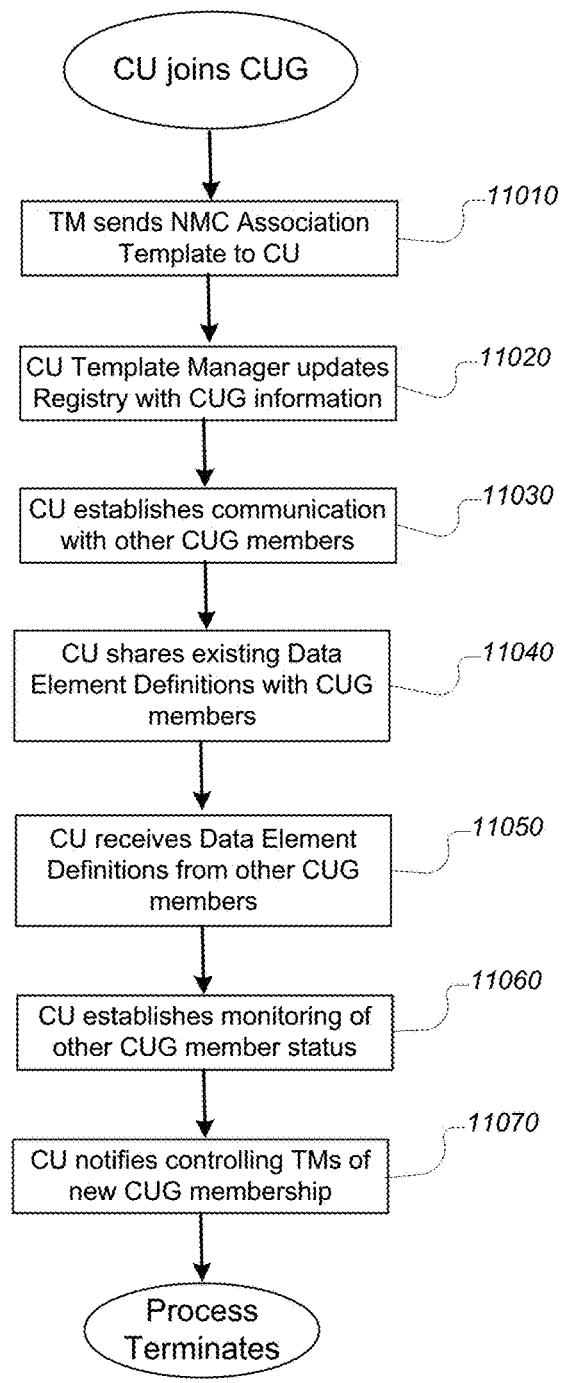

FIG. 11 comprises a flowchart describing the process of a CU joining a CUG in accordance with an exemplary embodiment of the illustrative technology herein.

Figure 12:
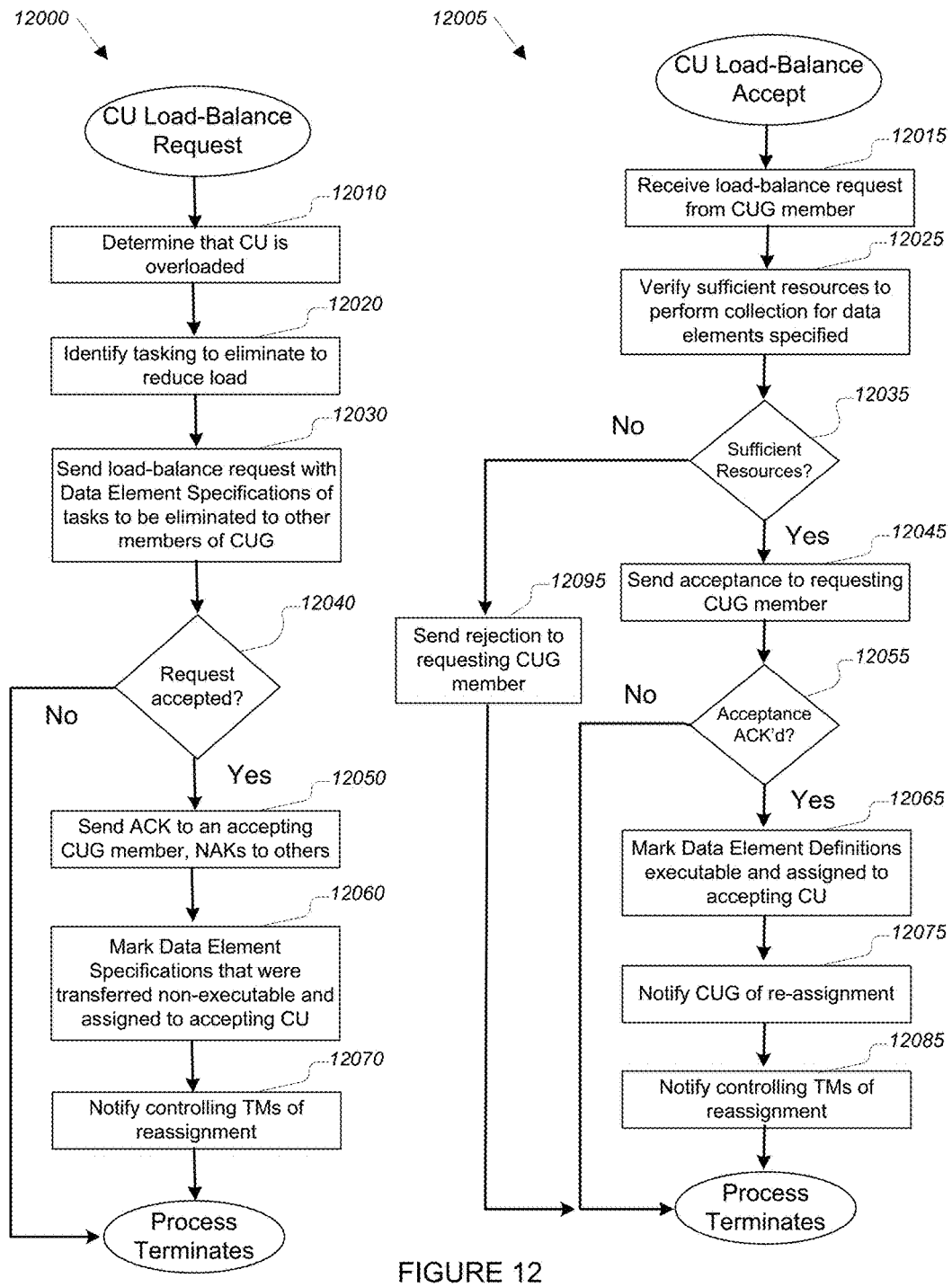

FIG. 12 comprises a pair of flowcharts that depict the steps performed by a CUG member requesting to load-balance with another CUG member, and the steps performed by a CUG member receiving the request in accordance with an exemplary embodiment of the illustrative technology herein.

Figure 13:
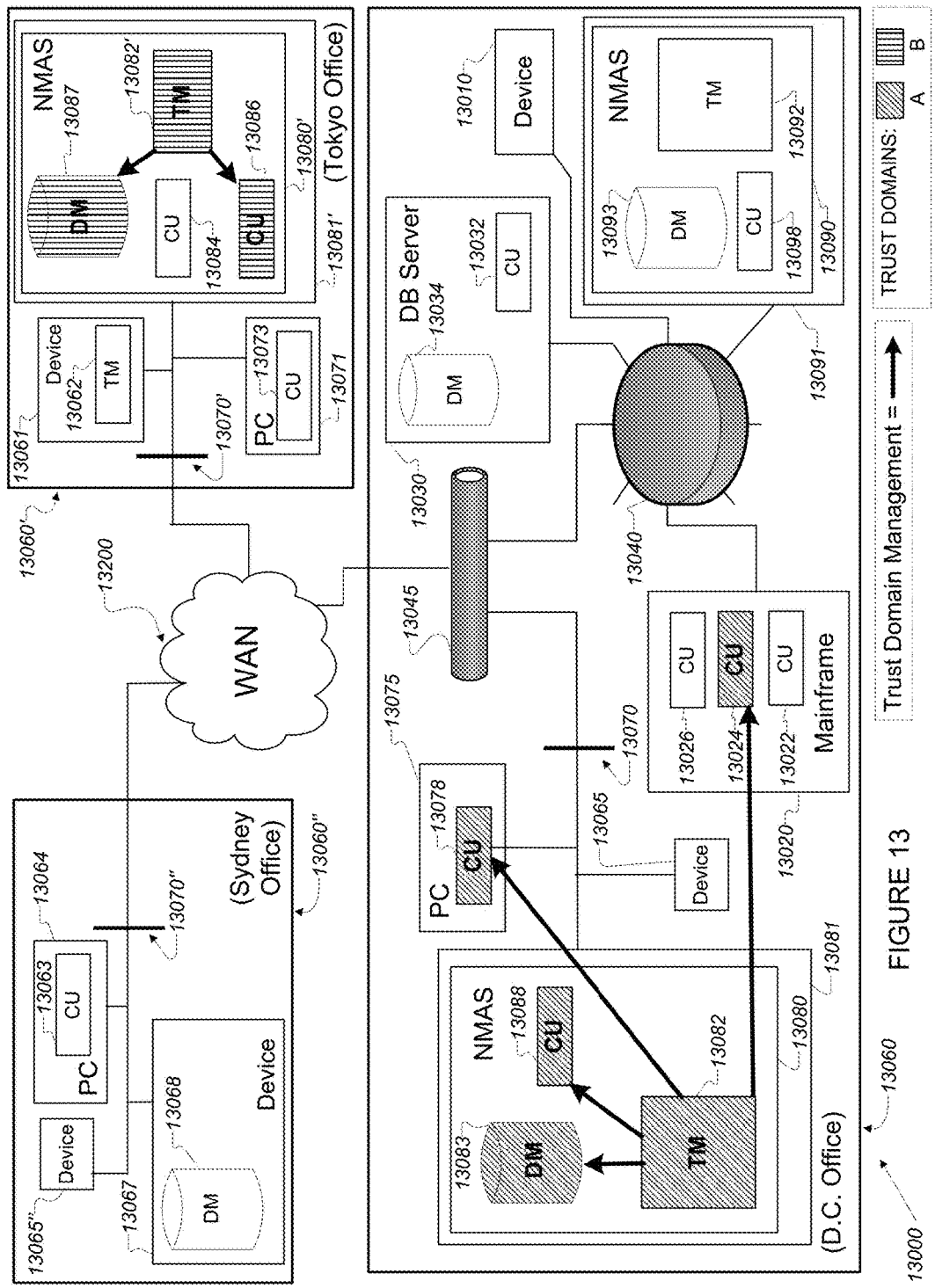

FIG. 13 depicts the network of FIG. 3, including two separate Trust Domains, each comprising a Task Manager and associated Collection Units and Data Managers in accordance with the exemplary illustrative technology herein.

Figure 14:
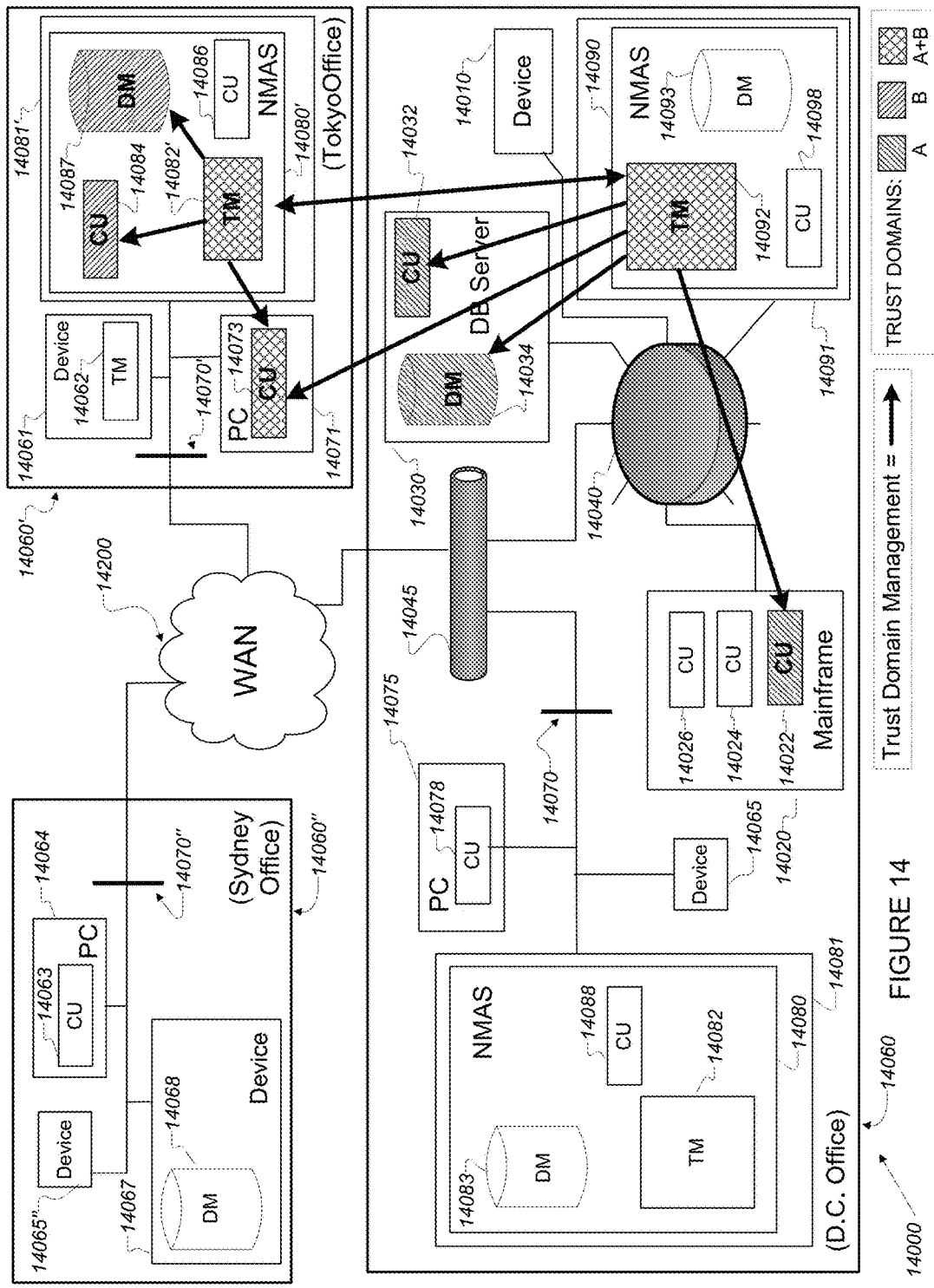

FIG. 14 depicts the network of FIG. 3, including two Trust Domains, each comprising a Task Manager and associated Collection Units, Data Managers and the data routing and control linkages between them, with the two Task Managers and one Collection Unit being members of both Trust Domains in accordance with one embodiment of the exemplary illustrative technology herein.

Figure 15:
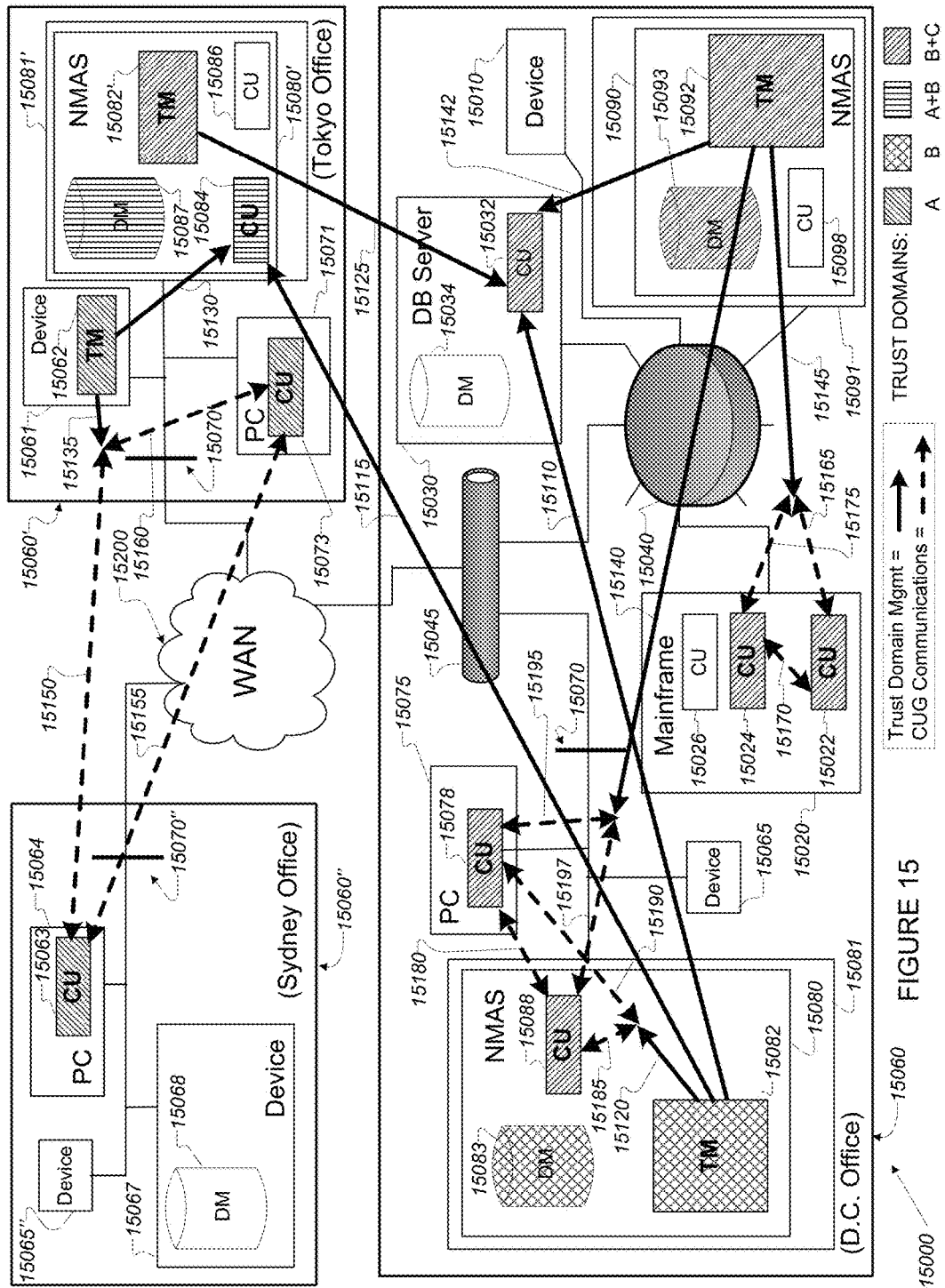

FIG. 15 depicts the network of FIG. 3, including three Trust Domains, each comprising a Task Manager, associated Collection Units and Data Managers and the data routing and control linkages between them, with various Trust Domain memberships being held by different components in accordance with one embodiment of the exemplary illustrative technology herein.

Figure 16:
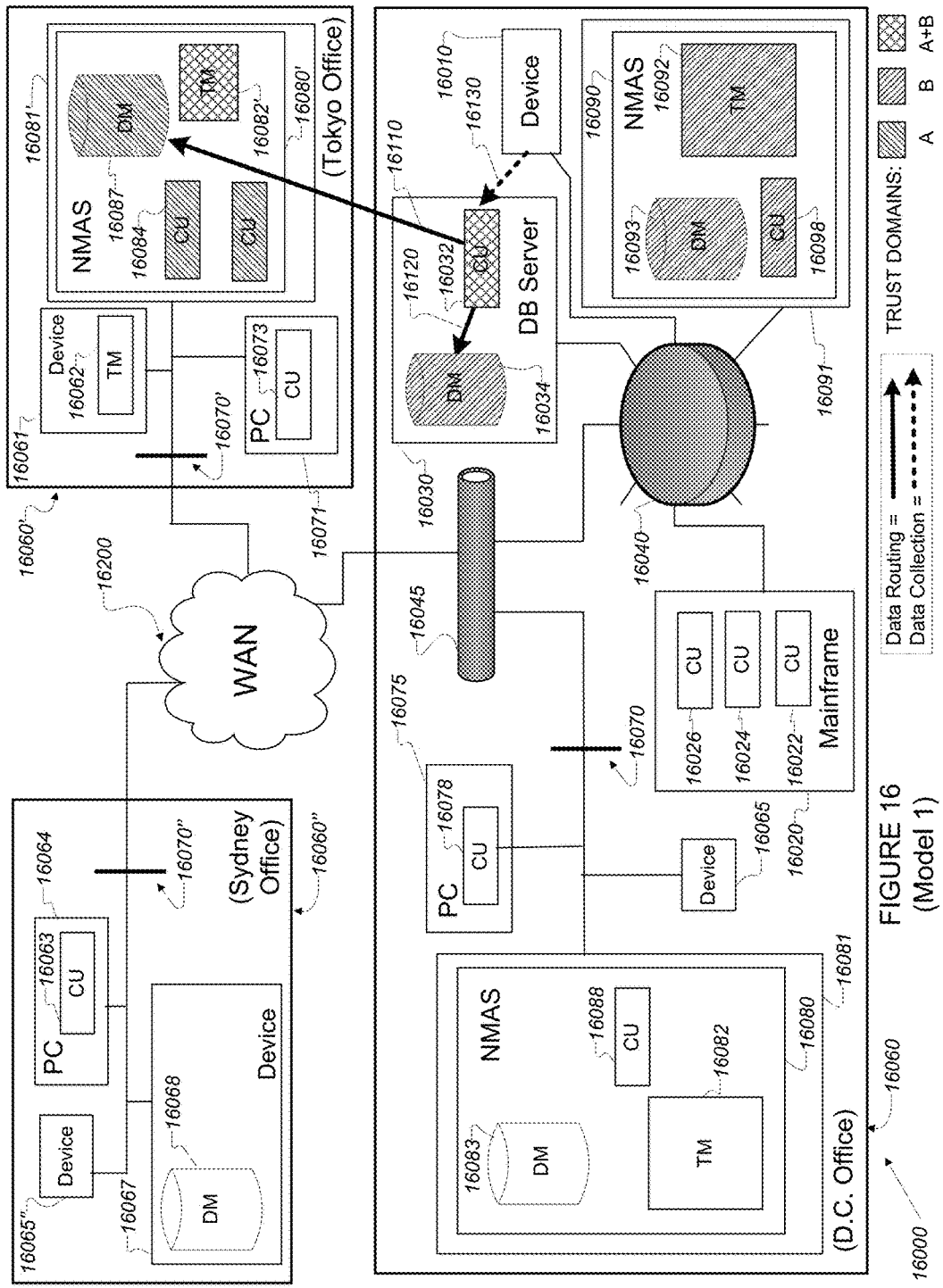

FIG. 16 depicts the network of FIG. 3, including two Trust Domains, each comprising a Task Manager and associated Collection Units and Data Managers and the data routing and control linkages between them, with a Collection Unit in one Trust Domain collecting data about a device and storing that data in two Data Managers, one belonging to each Trust Domain in accordance with one embodiment of the exemplary illustrative technology herein.

Figure 17:
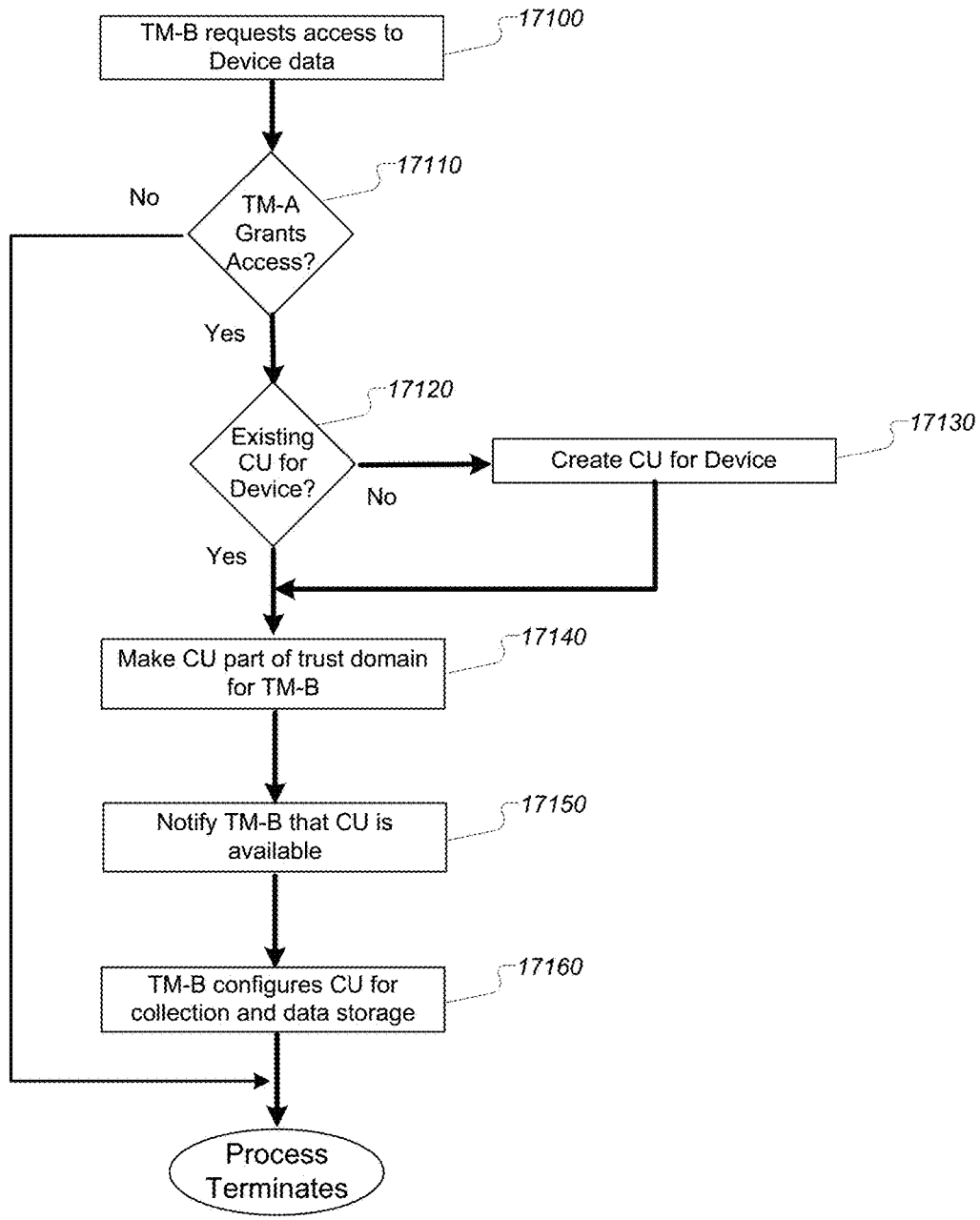

FIG. 17 is an exemplary flowchart illustrating one aspect of an exemplary process related to sharing control of Collection Units between Task Managers of different Trust Domains in accordance with one embodiment of the exemplary illustrative technology herein.

Figure 18:
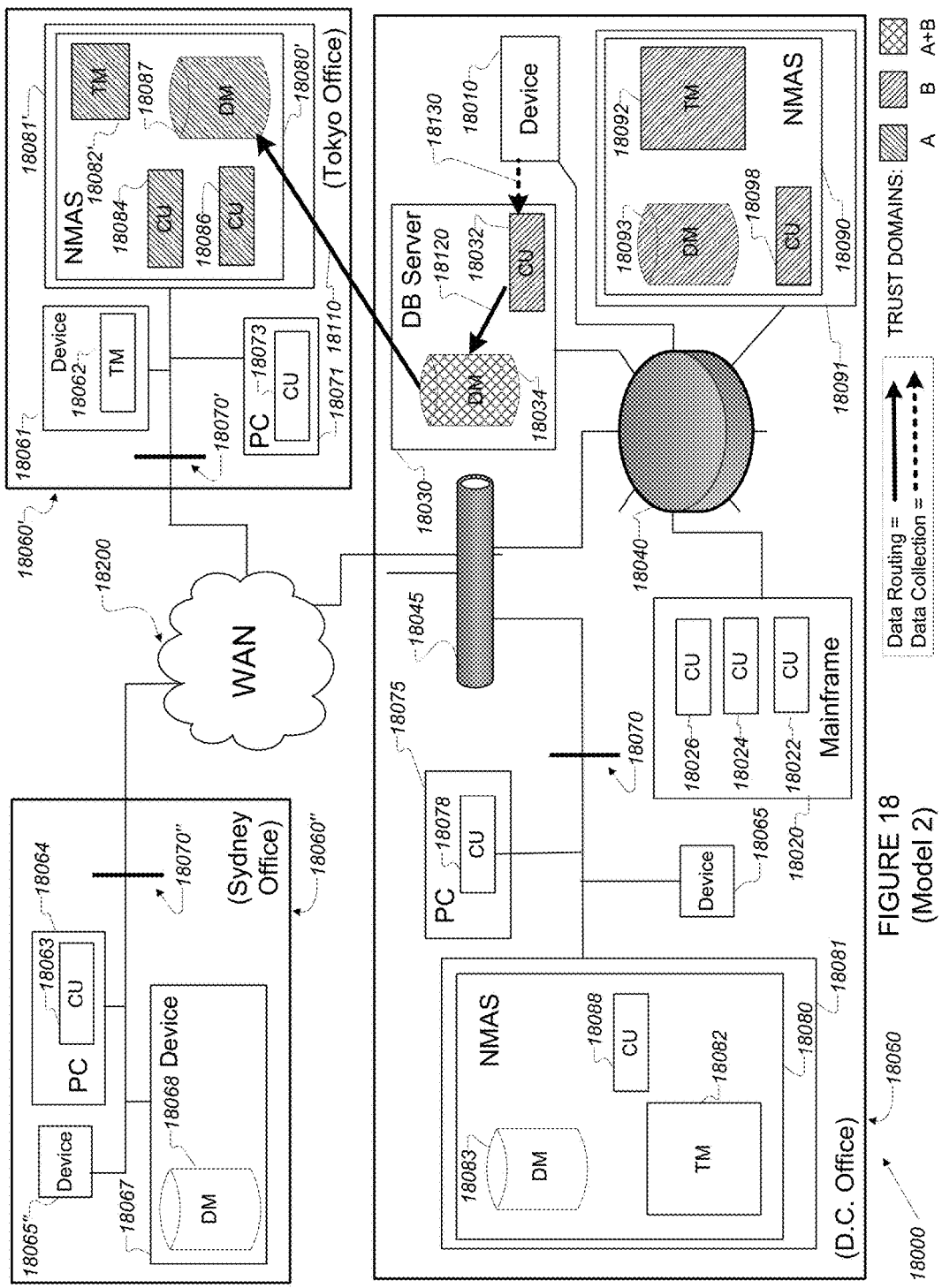

FIG. 18 depicts the network of FIG. 3, including two Trust Domains, each comprising a Task Manager and associated Collection Units and Data Managers and some exemplary data routing and control linkages between them, with a Data Manager in a first Trust Domain sharing collected data about a device with a Data Manager belonging to a second Trust Domain in accordance with one embodiment the exemplary illustrative technology herein.

Figure 19:
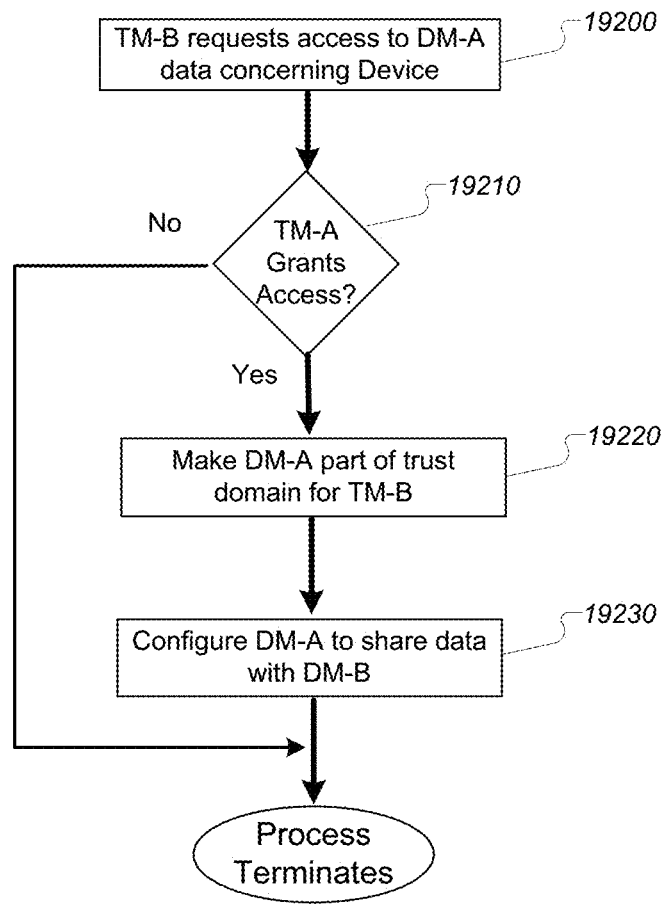

FIG. 19 is an exemplary flowchart illustrating one aspect of an exemplary process related to sharing access to Data Managers between different Trust Domains in accordance with one embodiment of the exemplary illustrative technology herein.

Figure 20:
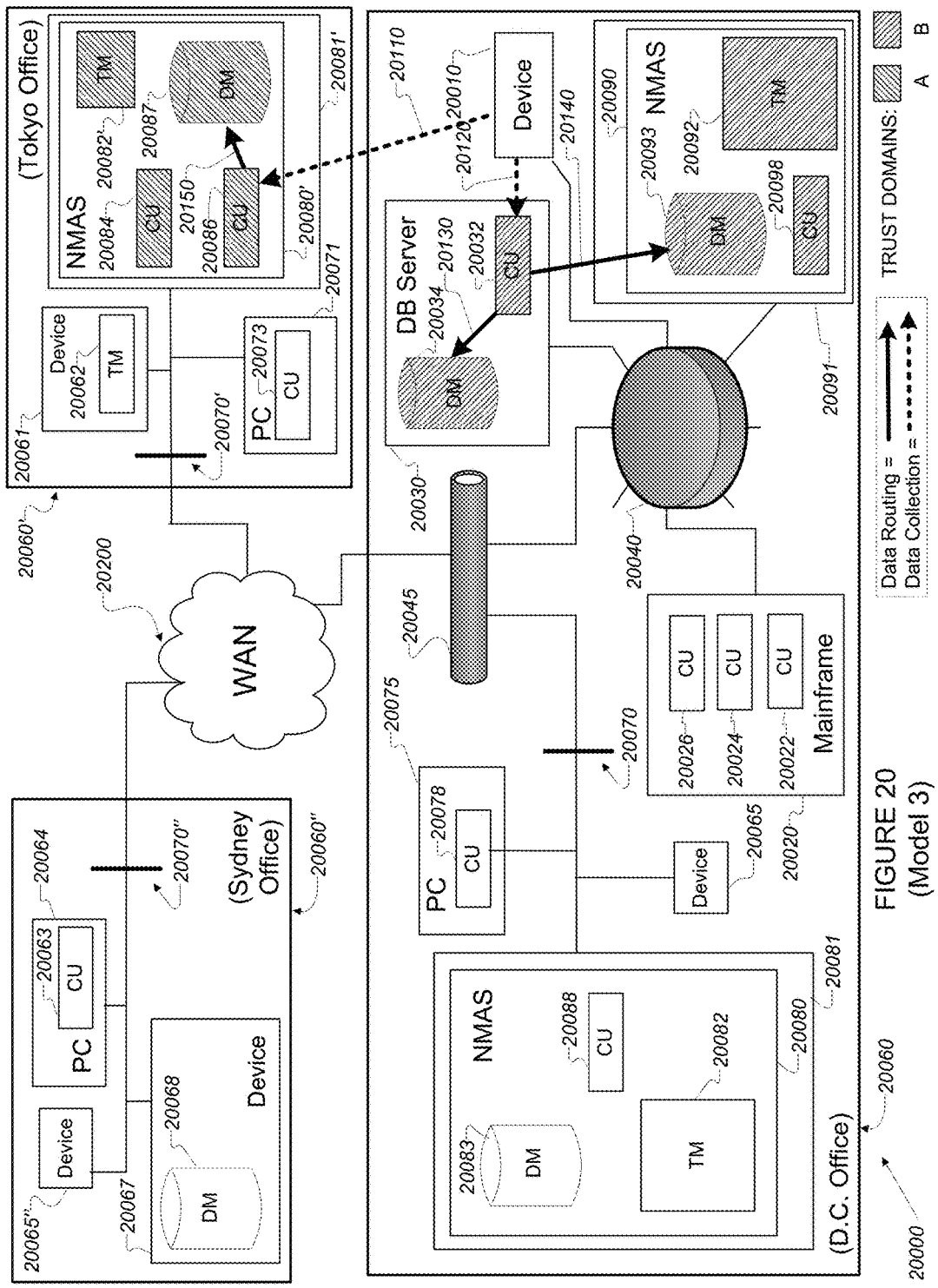

FIG. 20 depicts the network of FIG. 3, including two Trust Domains, each comprising a Task Manager and associated Collection Units and Data Managers and some exemplary data routing and control linkages between them, with Collection Units in each Trust Domain independently monitoring a device and storing collected data in Data Managers belonging to the respective Trust Domains in accordance with one embodiment of the exemplary illustrative technology herein.

Figure 21:
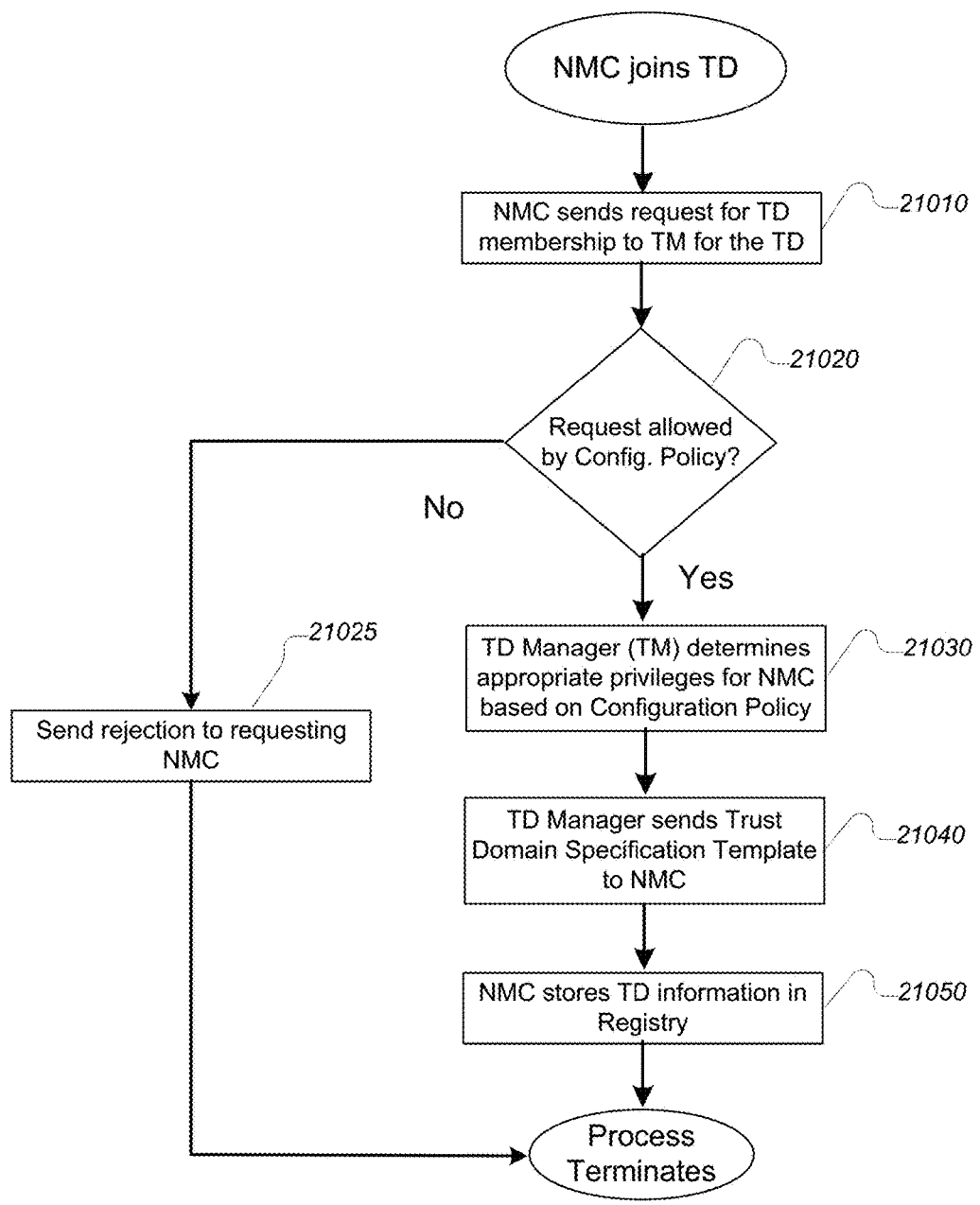

FIG. 21 comprises a flowchart describing the process of a Network Management Component joining a Trust Domain in accordance with an exemplary embodiment of the illustrative technology herein.

Figure 22:
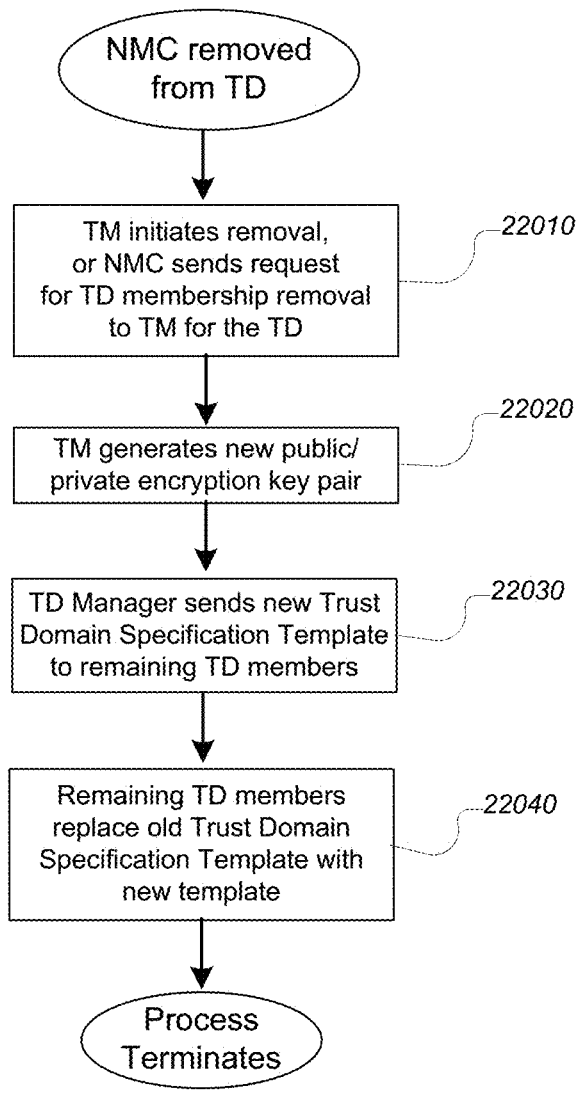

FIG. 22 comprises a flowchart describing the process of a Network Management Component being removed from a Trust Domain in accordance with an exemplary embodiment of the illustrative technology herein.

Figure 23:
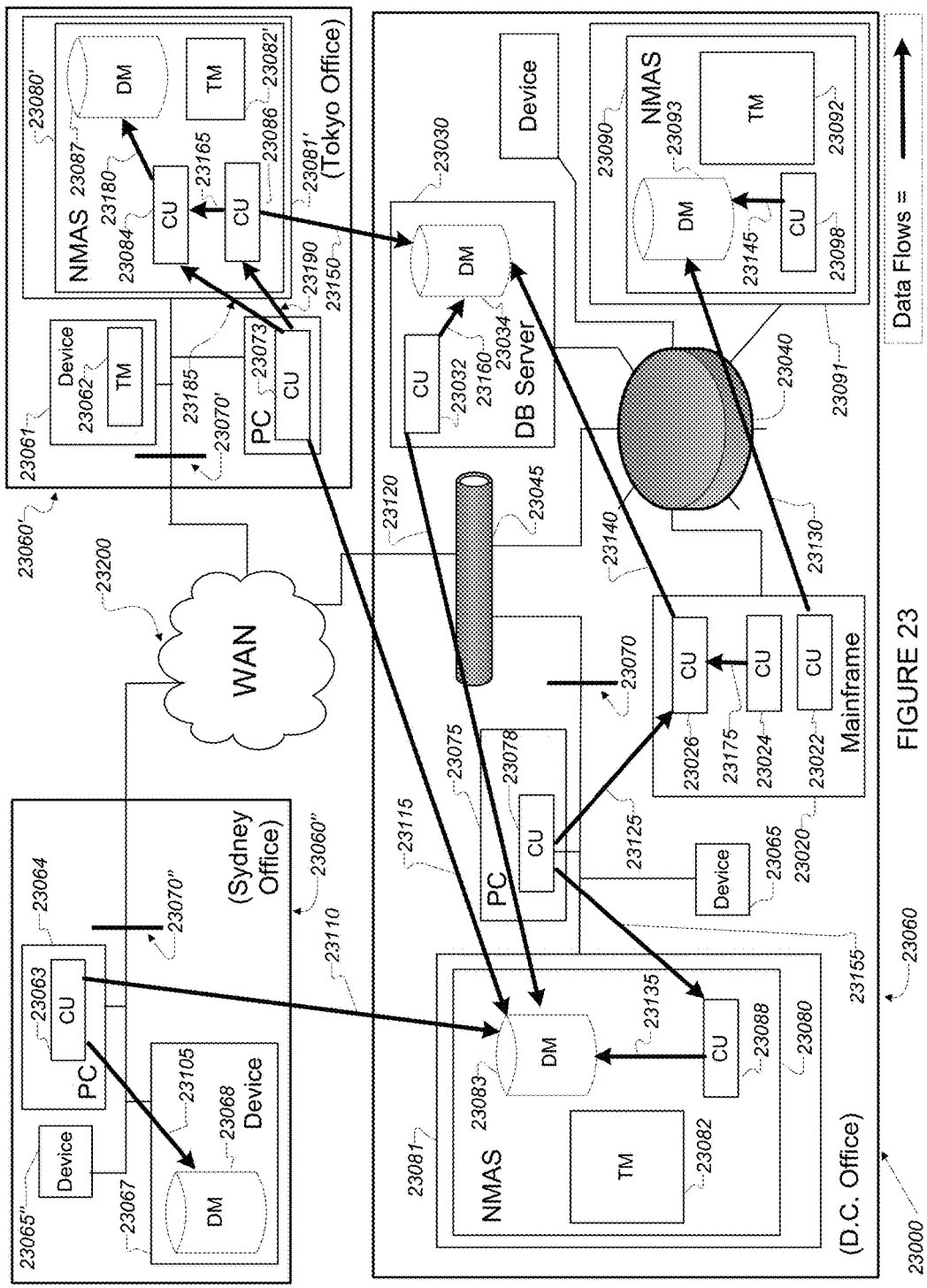

FIG. 23 depicts the network of FIG. 3, including data routing between Collection Units and Data Managers in accordance with an exemplary embodiment of the illustrative technology herein.

Figure 24:
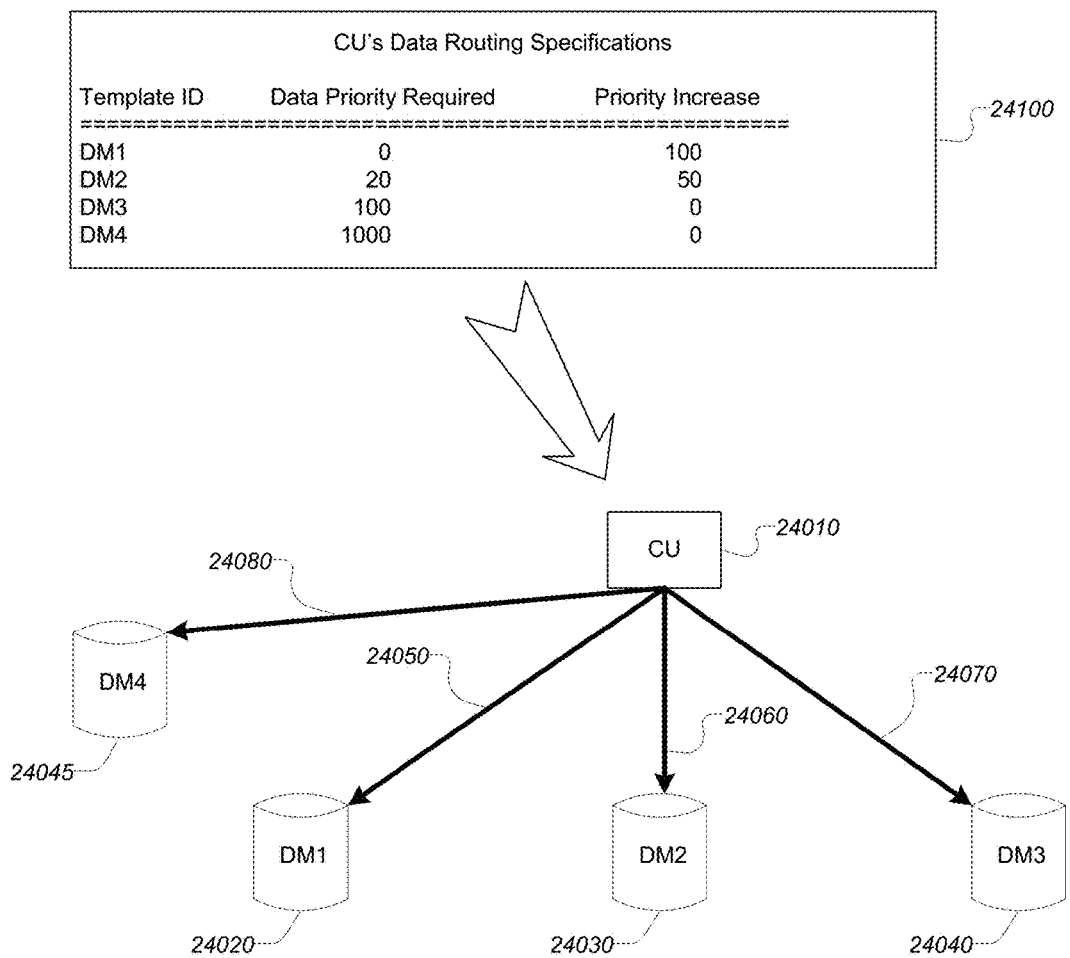

FIG. 24 is a schematic diagram depicting a Collection Unit and some of the elements of its Data Routing Specification Templates, as well as the four Data Managers to which it routes data in accordance with an exemplary embodiment of the illustrative technology herein.

Figure 25:
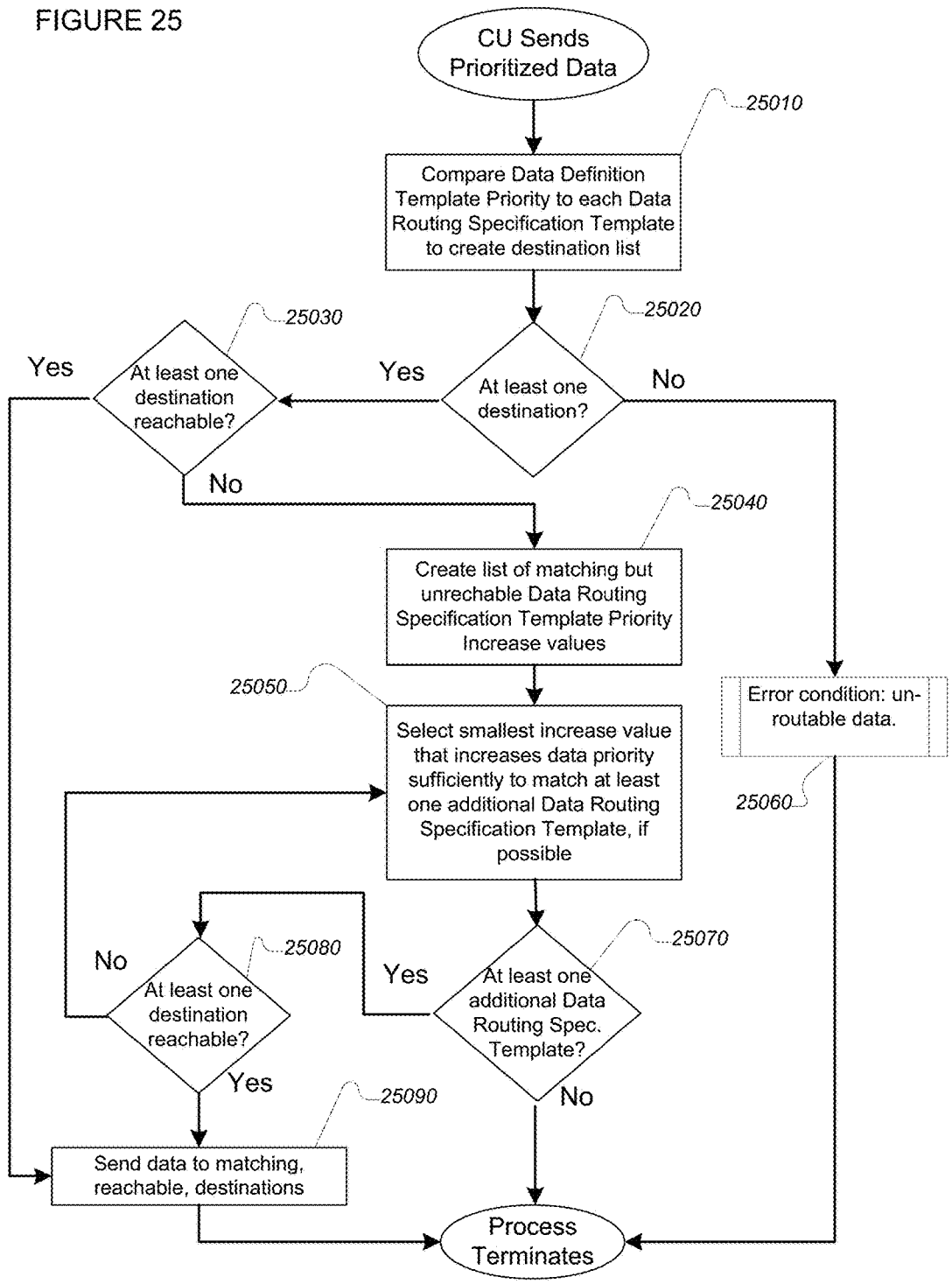

FIG. 25 comprises a process flow chart that depicts the processing involved in selecting destinations to transmit prioritized data to from a Collection Unit, with or without a temporary priority increase in accordance with an exemplary embodiment of the illustrative technology herein.

Figure 26:
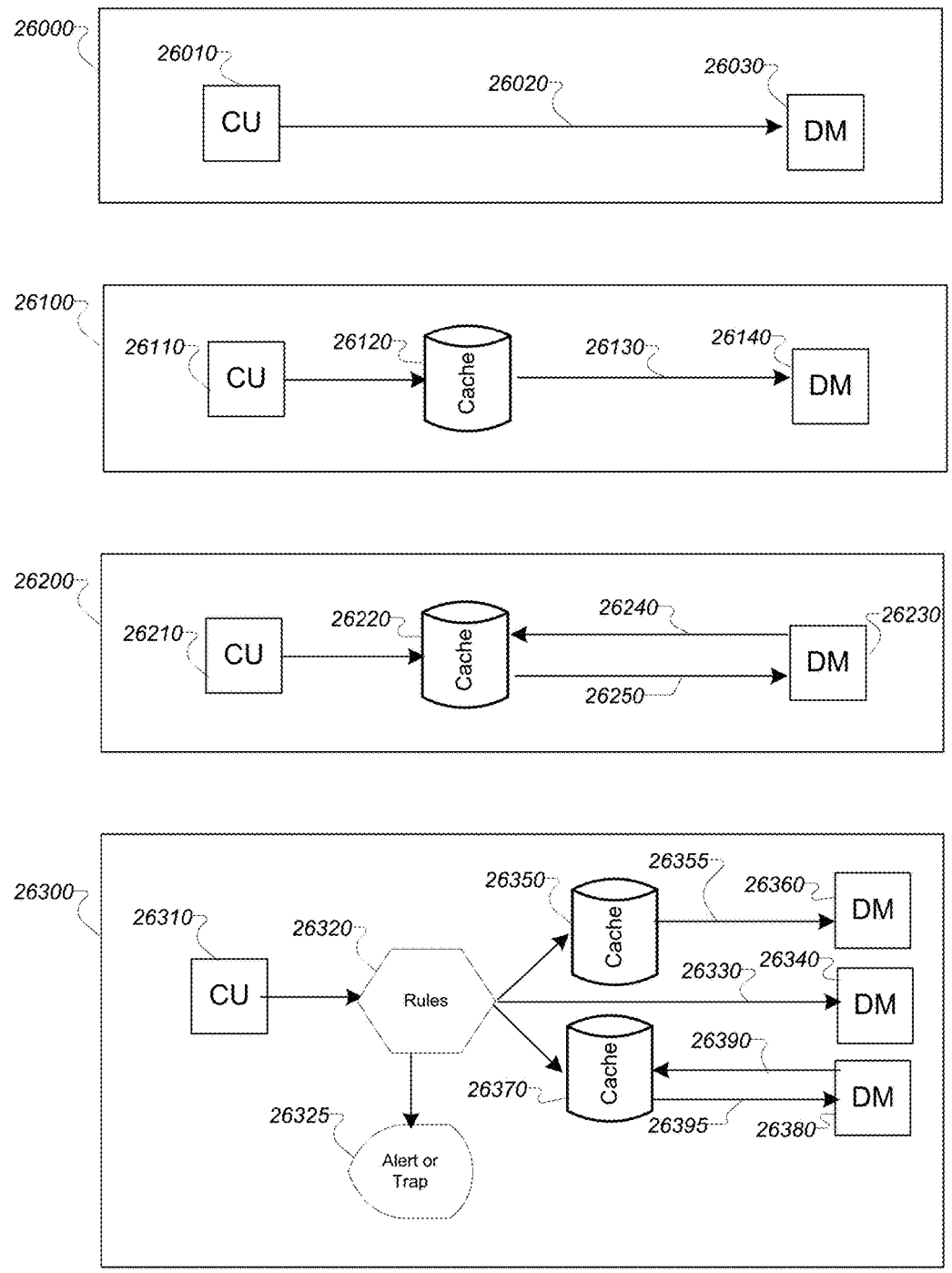

FIG. 26 depicts several exemplary methods for Collection Units to use for sending and/or caching of collected data in accordance with one exemplary embodiment in accordance with an exemplary embodiment of the illustrative technology herein.

Figure 27:
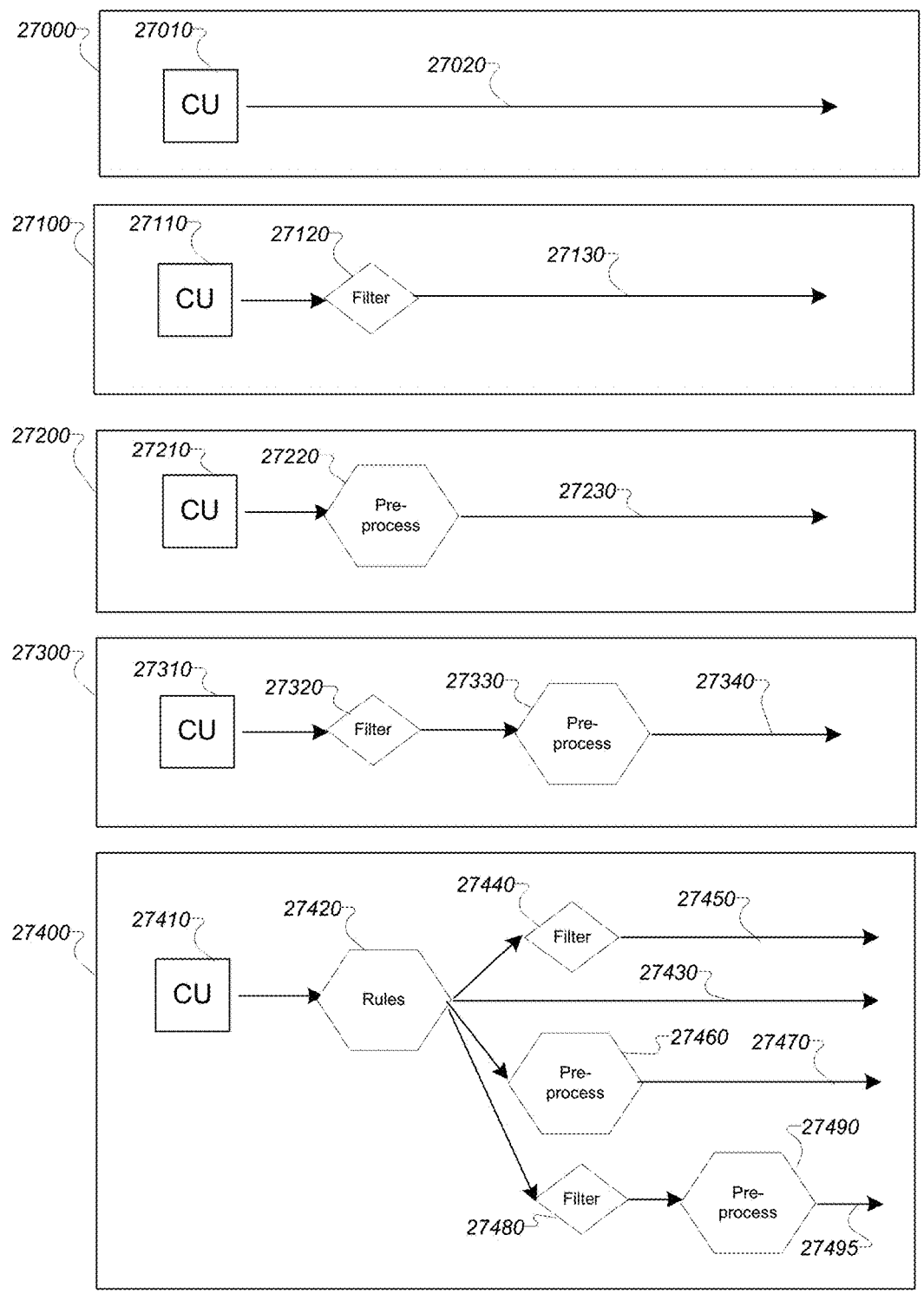

FIG. 27 depicts several exemplary methods by which Collection Units can filter and/or process collected data prior to sending and/or caching, in accordance with one exemplary embodiment herein.

5 DESCRIPTION OF SOME EXEMPLARY, NON-LIMITING EMBODIMENTS 5.1 Overview

The technology illustrated herein improves on the prior art NMDs by providing, in one aspect, methods, software, and systems that provide for alternative methods of collection and distribution of monitoring data, including the use of alternative data collection and information distribution topologies, deployment methods, trust models, dynamic monitoring configurations and lack of dependence on specific hardware devices. These novel technologies, described herein, are especially useful in managing networks having dynamic configurations, due to their capability to dynamically deploy management and data collection applications that automatically discover and identify network devices and systems, and which collect information from these network devices and systems. The novel technologies described herein also have the capability to alter their configurations, deployments and activities based on collected information about current network topology and traffic. Moreover, the novel technologies described herein provide for deploying components as a system of interacting agents that can function together in groups in distributed fashion as well as independently. These novel technologies further provide the ability to maintain a broad data collection capability even during periods of partial network outage or impairment, after a network has become segmented, whether intentionally or not, or in cases of unusual network loading, through an ability to dynamically instantiate monitoring and management components on pre-existing network devices as described herein. These novel technologies also permit monitoring and management components to be instantiated on gateway systems that bridge traditional and non-traditional networks, or in some exemplary embodiments, to be instantiated on components of non-traditional networks that have appropriate capabilities from traditional network instantiations acting through or from gateway systems as well as directly on said non-traditional network components.

In another aspect, embodiments of the technology illustrated herein comprise an exemplary architecture of inter-related network and device management applications that share information about the status of networks and the devices running thereon. Different network types, such as TCP/IP and SCADA, or different versions of a given network type, such as Internet Protocol (IP)v4 and IPv6, may require different network and device management application instances to collect similar data on each network type or version, but the relationships, patterns of functionality and data needs are similar. These interrelated network and device management applications dynamically collect information from devices present on the network and use the collected information to make network and device monitoring and management decisions. In some exemplary, illustrative, non-limiting embodiments, the collection and sharing of information is automatic. In another aspect, the technology illustrated herein includes the capability to manage its own configuration and functioning, within general parameters specified by its configuration, so as to adapt to changes in network topology, device connectivity, fluctuations in network traffic loading, and, in some exemplary embodiments, to proactively intervene in events such as Denial of Service (DoS) attacks, hardware failures, network connectivity losses, and other network and system outages for example by configuring routing hardware to block access from attacking sources, altering network topology through reconfiguration of routers, switches and other topology-controlling devices, or notifying system management or repair personnel of the problem through e-mail, pagers, Instant Messaging, or other communication means.

In some embodiments, the exemplary illustrative non-limiting technology herein provides prior art NMDs, or other devices, with extended capabilities resulting from the incorporation of additional software components, and/or the production of novel arrangements of existing software components so as to provide useful new capabilities and functions as described herein. The exemplary illustrative non-limiting software, systems and methods disclosed herein provide such "extended" capabilities are referred to herein as "Network Management Application Systems" (NMASs). In general, prior art NMDs comprise both hardware and software aspects, while according to one aspect of the exemplary illustrative non-limiting technology herein, NMASs may comprise only software aspects. In some exemplary embodiments, the prior art NMDs are in accordance with the disclosures of the above-referenced U.S. patent application Ser. Nos. 11/175,407 and 12/051,125. NMAS capabilities can be provided in conjunction with prior art NMDs, or separate from prior art NMDs. Some exemplary embodiments can make use of hardware devices, such as "dongles", Universal Serial Bus (USB) "flash drives" or other storage media, for purposes of license validation, transport of the software to or between systems, or for other purposes as are well understood by those with skill in the art. According to further aspects of the exemplary illustrative non-limiting technology herein, NMASs can make use of a variety of available hardware for their functioning, whether this comprises prior art NMDs, non- NMD devices, or both prior art NMDs and non-NMD devices. According to yet other aspects, NMASs can make use of virtual machine technologies for their functioning. According to still further aspects, NMASs may provide improved control and monitoring of network devices, increased flexibility in handling of data collected from monitored networks and systems, flexible trust domains that enable monitoring of a given network by entities having different levels of permitted access to the network and data concerning it, reduced network traffic load associated with said monitoring and control, permit more efficient and robust handling of collected information, and further can enable continued monitoring of networks despite network connectivity losses, performance degradation, or localized outages. In further aspects, NMASs may also instantiate collectors or other dynamically instantiated components on systems acting as gateways to non-traditional networks, or, through gateway systems in some exemplary embodiments, on components of non-traditional networks, such as workstations, device controllers or other appropriate systems. In some exemplary embodiments, NMASs have the capability to be installed directly on non-traditional networks and instantiate collectors or other dynamically instantiated components on aspects of the non-traditional network without a requirement that a gateway system connecting the non-traditional network to a traditional network be present. NMASs retain the functionality of prior art NMDs, such as the ability to automatically discover network devices and topology, to automatically configure for monitoring and management of the network in accordance with a defined configuration policy, and to use templates for specifying data collection and monitoring component behavior.

In a preferred embodiment, a software-only NMAS system can be rapidly and inexpensively duplicated, relocated or eliminated as network management needs or network topology changes. As noted above, the NMASs can be configured to work in a distributed manner, e.g., as a system of cooperating agents, or individually, or in some combination thereof. A preferred software only NMAS requires no physical space, additional power or connectivity, since it is instantiated on existing devices of a network. NMASs comprise additional functionality not present in prior art NMD devices, such as flexibly and dynamically deployable sub-systems for data collection and sharing, device management, and data storage that improve the ability to monitor and manage all parts of a network even when hostile activities, device failures or operator error causes unplanned changes in network topology or traffic load.

5.2 Exemplary System Architecture

The exemplary illustrative technology described herein comprises dynamically instantiated components, such as collection units (CUs), data managers (DMs), and task managers (TMs), pre-defined data objects used to coordinate and define the configuration and behavior of each of these, such as templates and template fragments, and useful arrangements of the dynamically instantiated components, such as Collection Unit Groups (CUGs) and Trust Domains (TDs). Each of these is described below.

The dynamically instantiated components described herein are exemplary in nature, and the functions described for each can be divided or combined into other arrangements in particular exemplary embodiments without loss of capability, as will be apparent to those with skill in the art. For example, a single component comprising some or all of the functionality of a CU and some or all of the functionality of a TM could be included in a particular exemplary embodiment. The description of dynamically instantiated components as individual components herein is done for clarity in describing the functionality, and should not be viewed as a limitation on implementation options.

5.2.1 The Exemplary Network and Components

Figure 1:
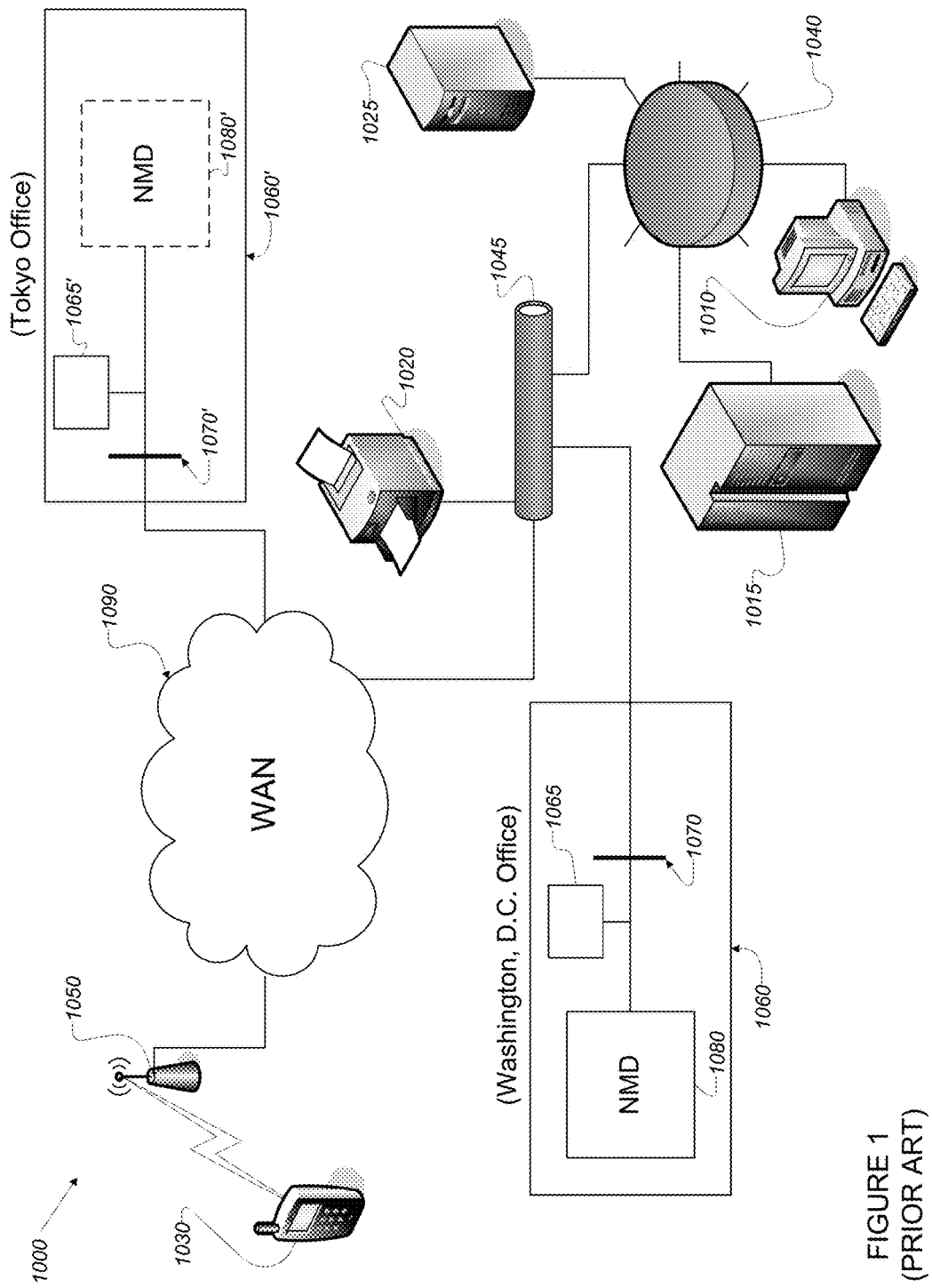
FIG. 1 depicts a schematic diagram of a network being managed in accordance with the prior art.
Figure 2:
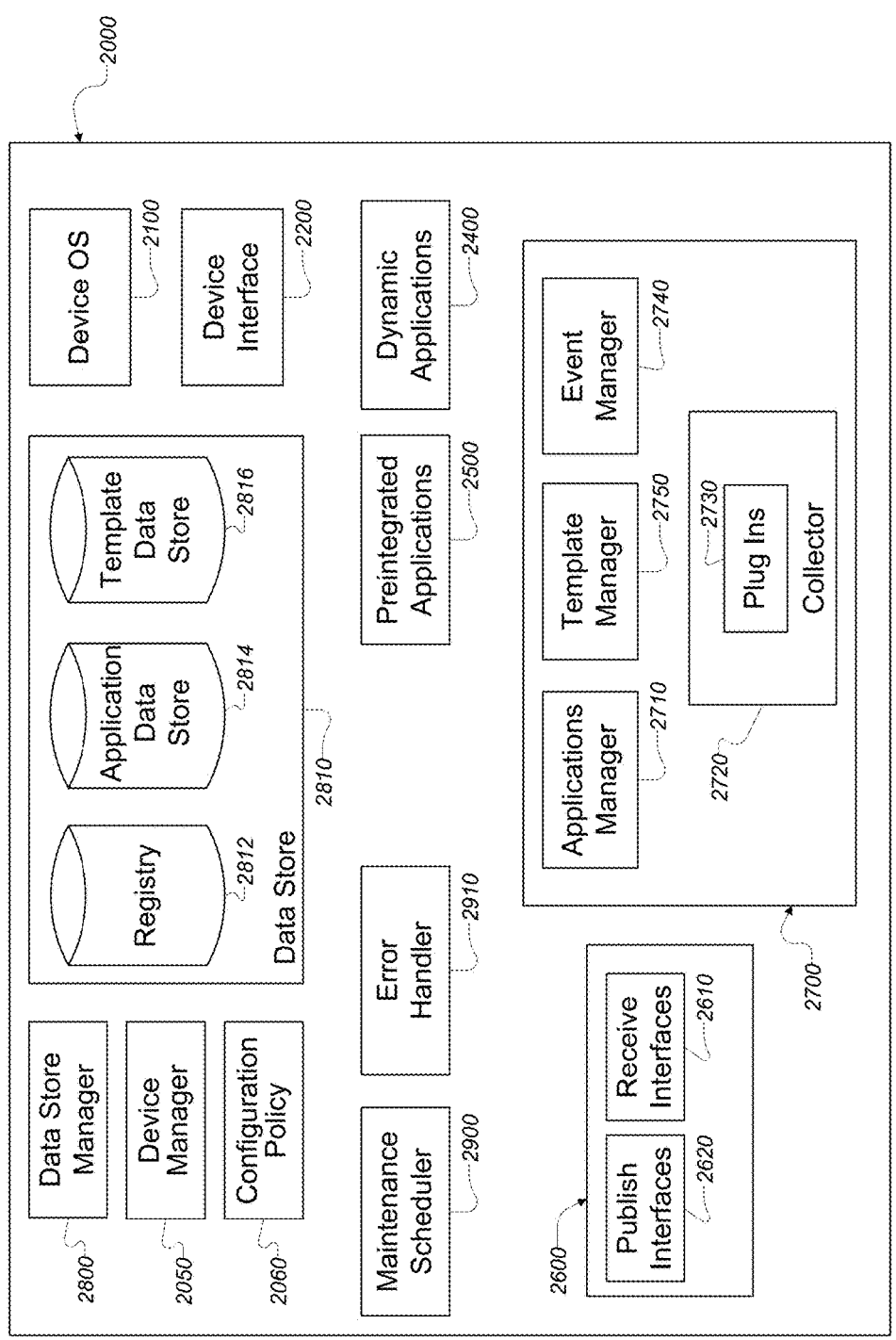
FIG. 2 depicts a schematic diagram of an NMD in accordance with the prior art.
Figure 3A:
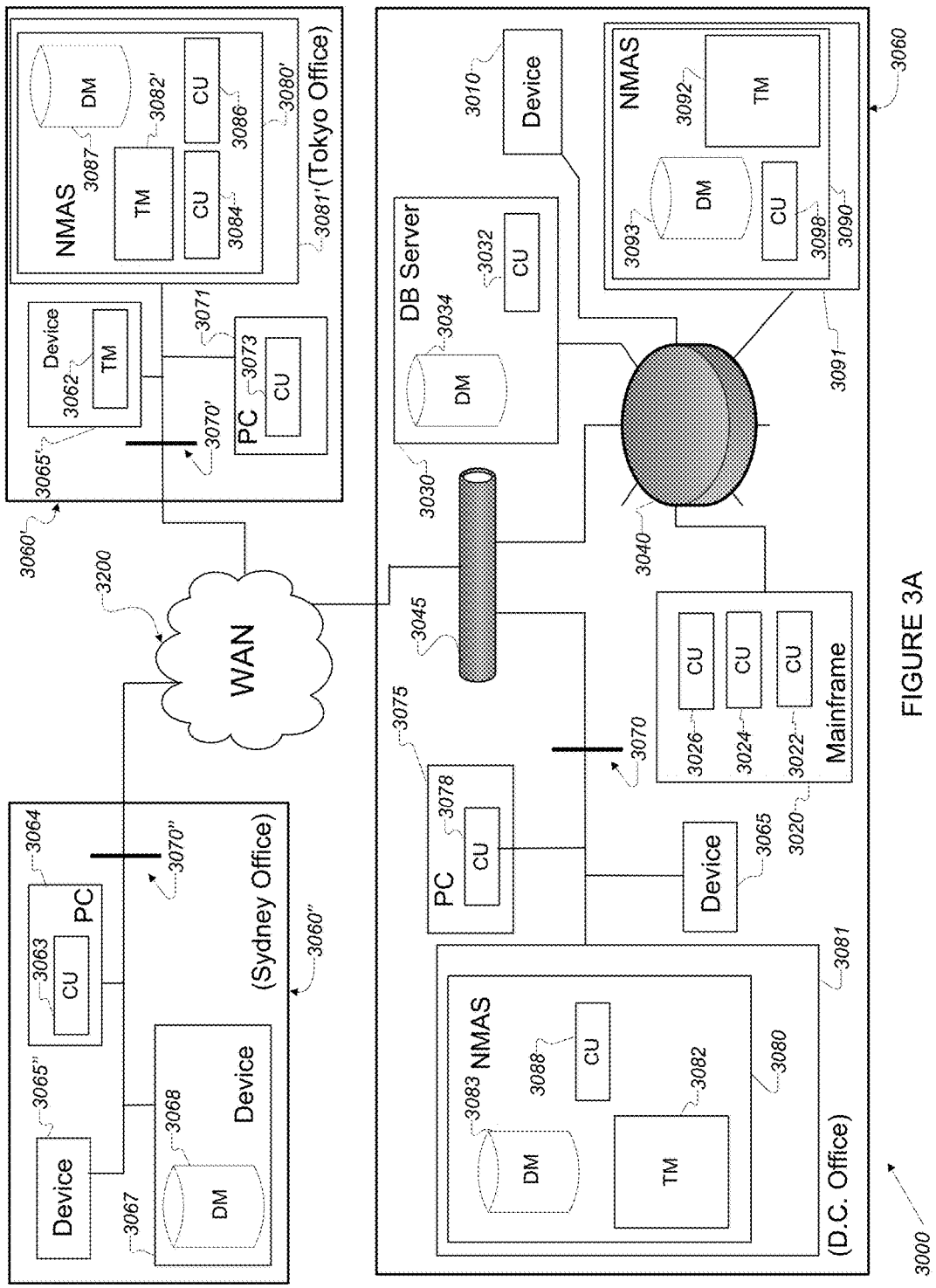
FIG. 3A depicts a schematic diagram of a network being managed in accordance with the exemplary illustrative non-limiting technology herein.

FIG. 3A illustrates an exemplary network (3000) in accordance with the technology described herein by way of a non-limiting example, as will be appreciated by one having skill in the art. The exemplary network (3000) includes a Wide Area Network (WAN) (3200), which connects (i.e. permits communication between) three sub-networks: a first subnet (3060) in Washington, D.C., a second subnet (3060') in Tokyo and a third subnet (3060") in Sydney. Each sub-network comprises one or more networked devices, such as personal computers (3064, 3071 & 3075), mainframe computers (3020), database servers (3030), and other networked devices of various sorts (3065, 3010, 3065', 3065" & 3067) and the network links that connect them. The networked devices can be connected with each other using any known technology, such as a ring network (3040), or an Ethernet (3045). Each subnet may also contain various network apparatus including cables, switches, routers, network servers, and workstations that are indicated only generally; and firewalls or other security mechanisms (3070, 3070' & 3070"). Each of these components is of conventional standard design and will be well understood by those having skill in the art.

According to one aspect, a plurality of task managers (TM) (3082, 3082', 3062, & 3092) are instantiated on various elements of the network (3000). In particular, first and second TM's (3082) and (3092) are included as part of a first NMAS instantiated on a first data processing system (3081) and a second NMAS instantiated on a second data processing system (3091) with each data processing system connected to the first subnet (3060) by a network connection. A third TM (3082') is included as part of a third NMAS instantiated on a third data processing system (3080') connected to the second subnet (3060'). A fourth TM (3062) is installed on a device (3065') connected to the second subnet (3060'). The TM's (3082, 3082', 3062, & 3092) are configured to manage the deployment and operation of one or more collection units (CU) (3063, 3073, 3084, 3086, 3088, 3078, 3026, 3024, 3022, 3032, & 3098) and/or one or more data managers (DM) (3068, 3087, 3083, 3034, & 3093), as well as the Network Management Application Systems (NMAS) (3080, 3080', & 3090) that are instantiated on appropriate existing data processing systems (3081, 3081', & 3091) connected to the network (3000). Components of the exemplary illustrative non-limiting technology herein, that can be statically or dynamically instantiated as unique entities having defined capabilities and functions, and that are separately configurable, are sometimes referred to herein as Network Management Components (NMCs). NMASs typically comprise a plurality of NMCs in a configuration-determined and needs-based arrangement. TMs, CUs, and DMs are examples of NMCs that can be instantiated on available networked devices as authorized and required.

In a first exemplary embodiment, each of the NMASs (3080, 3080', & 3090) is deployed as a collection of software components instantiated on a conventional data processing system (3081, 3081', 3091) such as a computer system of known manufacture that possesses the required resources (e.g. memory, storage, CPU, network connectivity, etc.) to support the NMAS software components. Example data processing systems include desktop and laptop computers running a variety of operating systems, wireless devices that may be only intermittently connected to the network, such as portable data terminals, PDAs, or vehicle-mounted devices, dedicated network infrastructure hardware devices such as routers, switches, and firewalls, and upon specialized network management devices (NMDs) as described above.

Devices used to host NMAS instances can be running any operating system that supports the features required to implement an NMAS instance (e.g. Linux, UNIX, Microsoft Windows, Apple OS-X, OpenVMS, Be-OS, or QNX). One or a plurality of NMAS instances can be instantiated on a given network, or even on a single device, at any given time, using any combination of hardware platforms and operating systems desired. An NMAS instance makes use of existing operating system services, device drivers or language support libraries to interact with device hardware, such as network interfaces, in some devices where said services, device drivers or language support libraries implement required functionality for use by applications such as NMASs or NMCs. In devices where such operating system services and language support libraries are not available, the NMASs or NMCs may implement their own device hardware interfaces. For example, a network management application may include and install a device driver supplied by a hardware manufacturer, or directly control device hardware through typical mechanisms such as memory-mapped hardware control registers or I/O bus commands. Even in devices that support operating system services or language libraries that implement hardware interface functionality, NMASs or NMCs can implement their own hardware interface capabilities, where this is not prohibited by operating system security or other restrictions, to improve speed, decrease device resource consumption, or implement additional capabilities. In a second exemplary, non-limiting embodiment, NMASs are deployed as collections of software components instantiated on instances of a virtual machine, such as VMWare, Xen, Microsoft Virtual Server, Sun xVM, or other virtualization and/or hypervisor-enabled system. In a third exemplary, non-limiting embodiment of the technology described herein, the NMAS is deployed as a system of cooperating software agents. Such agents can be implemented using standard agent technologies, such as open source Java Applets, the DARPA Agent Markup Language (DAML), the Java Agent Development (JADE) framework, or others. In a fourth exemplary, non-limiting, embodiment of the technology described herein, the NMAS may be deployed as a network appliance comprising disparate hardware, operating system, and NMAS software components.

The exemplary network depicted in FIG. 3A includes a plurality of NMCs instantiated on devices other than those hosting NMASs. NMCs shown include collection units (CU) (e.g. CU 3073, 3026, 3032), Data Managers (DM) (e.g. DM 3068 and DM 3034) and a TM (TM 3062). CU, DM and TM components can be instantiated on any existing data processing system of known manufacture having the required resources, including desktop and laptop computers running a variety of operating systems, such as Microsoft Windows, Unix, Linux, Apple OS-X, or others, servers and mainframes running Microsoft Windows, Unix, Linux, Solaris, OpenVMS, or other operating systems, wireless devices that may be only intermittently connected to the network, such as portable data terminals, Personal Digital Assistants (PDA)s, or any other wire or wireless device that include a network interface, or vehicle-mounted network capable devices, dedicated network hardware devices such as routers, switches, and firewalls, and upon specialized network management devices (NMDs) as described above. In some embodiments, these components operate as services (e.g. on Windows NT, XP, or Server), as daemons (e.g. on Linux, Unix), as embedded processes in a firewall or other network appliance (e.g. CU 3032), or in a similar mode of operation as determined by the capabilities and design of the hosting device and its operating system.

Devices used to host NMAS or NMC instances can be running any operating system that supports the features required to implement an NMAS or NMC respectively (e.g. Linux, UNIX, Microsoft Windows, Apple OS-X, OpenVMS, Be-OS, or QNX). A first device and a second device need not be running the same operating systems. NMAS or NMC instances, or their component parts, can be implemented using any appropriate common technology such as C++, Java, Python, Visual Basic, assembly language, or any combination of a plurality of technologies. Exemplary embodiments of NMASs and NMCs can be implemented using various technologies, and can support diverse combinations of the optional capabilities described herein. For example, a PC (3064) connected to the third subnet (3060") can be running Linux and hosting a CU (3063) written in Python that contains embedded applications useful in discovery and monitoring of a network device connected to the third subnet (3065"), while a PC (3071) connected to the second network node (3060') can be running Microsoft Windows and hosting a CU (3073) implemented using C++ and Visual Basic that contains no embedded applications and requests dynamic applications as needed for discovery and management of discovered devices. In like manner, the DM (3034) running on the a DB Server machine (3030) connected to the first subnet (3060) can be implemented in Ada and running under BSD Unix while the TM (3062) running on the networked device (3065') connected to the second subnet (3060') is written in Java and running under an operating system intended for embedded system use, such as the QNX operating system. In some embodiments, one or all devices can be running a plurality of different operating systems or a plurality of instances of the same operating system (e.g. through use of virtual machine technologies, such as VMware or on hardware capable of this, such as HP's Galaxy system for OpenVMS). Alternatively, all devices can be running the same operating system, and all NMAS or NMC instances, or their component parts, can be implemented using the same technology, with the same embedded applications present in each NMAS or NMC that supports them, such as CUs. Any combination of the same, or different, operating systems and implementation technologies can be used, as will be apparent to those having skill in the art.

In some embodiments an operating system is not required for at least some NMASs or NMCs and the NMASs or NMCs are configured to deal directly with the hardware of the device, or to run in a virtual machine or other execution environment, such as the Java Runtime Environment (JRE) that may or may not make use of an underlying operating system. In still other embodiments there can be some NMASs or NMCs that run over an operating system as described above, while others do not. The method of deployment of an NMAS or NMC on a device will vary with the capabilities of the device it is deployed upon, with some devices supporting automated remote installation and instantiation over the network, while others require manual installation, firmware changes, or physical installation of a transport medium, such as a Read Only Memory (ROM) chip or CD-ROM, to install and/or instantiate at least a part of an NMAS or NMC on the device. The functionality of an NMAS or NMC is not dependent on the method of implementation of its features, or the mode of installation of any part of it, except that dynamic deployment features of NMASs or NMCs can require initial manual installation of at least some software on some devices in some embodiments where automated installation and instantiation over the network is not supported by the device, as will be apparent to those with skill in the art. Such initially installed software can comprise some or all of the NMAS or NMC, means to support automated installation and instantiation of some or all of an NMAS or NMC over the network, or both.

Figure 3B:
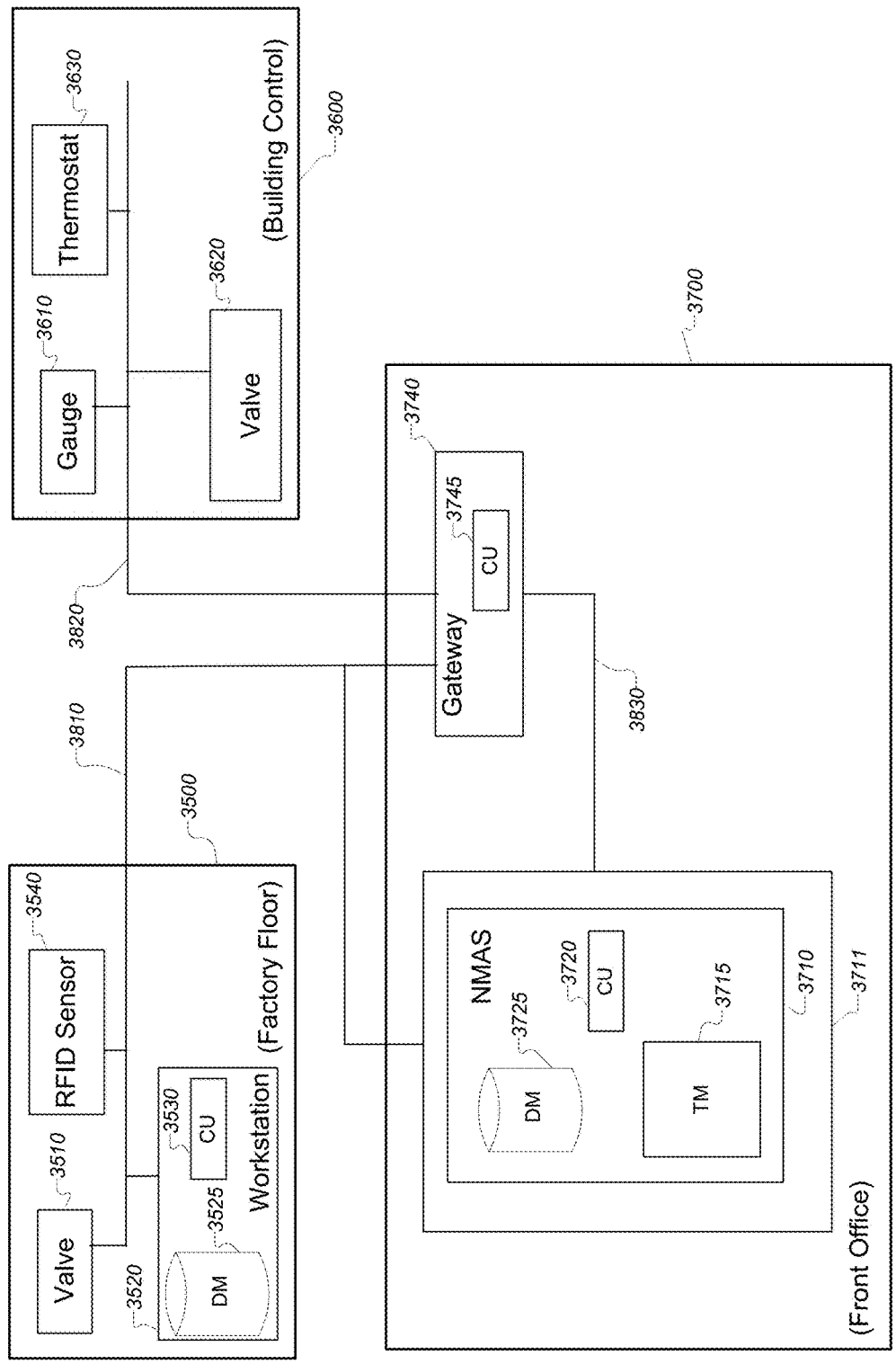
FIG. 3B depicts a schematic diagram of an enterprise configuration comprising a traditional network, a gateway system and two non-traditional networks.

As described in U.S. patent application Ser. No. 12/051,125, NMASs also can work with non-traditional (i.e. non-TCP/IP) networks by way of gateway systems, and in some embodiments the NMASs retain and extend this capability. FIG. 3B shows a simplified network configuration for an enterprise having a Front Office (3700), a Factory Floor (3500) and a Building Control system (3600). The Front Office (3700) comprises a traditional TCP/IP network (3830) connecting a device (3711) that hosts an NMAS (3710) to one or more non-traditional networks (3810 & 3820) both directly (3810) and by way of a Gateway device (3740). Some exemplary NMASs embodiments can have the capability to be instantiated on devices that connect directly to one or more non-traditional networks, one or more traditional networks, or a combination of one or more traditional and non-traditional networks. The depicted NMAS is an example of an NMAS that can be instantiated on a device connected to both a traditional and a non-traditional network. The Front Office network (3830) may connect other devices, as will be apparent to those with skill in the art, but these are not relevant to the current discussion and are not shown.

The exemplary Factory Floor (3500) devices comprise a network interfaced valve (3510), a network interfaced RFID sensor (3540), and a Workstation (3520), that are connected using a SCADA network (3810), such as FieldBus or IEEE1394. The SCADA network (3810) also connects the Gateway device (3740) and the device (3711) hosting the NMAS (3710) to the factory floor network (3810). As will be apparent to those with skill in the art, a plurality of many other types of devices are likely to be found in a factory floor SCADA network, and the devices depicted in FIG. 3B are only one illustrative representation for purposes of discussion.

The exemplary Building Control system (3600) comprises a SCADA network (3820), such as Building Operation and Control (BAC) protocols such as BACnet or LonTalk, which connect a gauge (3610), a Thermostat (3630), and a valve (3620) to the network (3820). As will be apparent to those with skill in the art, a plurality of devices of many types are likely to be present in a typical building control system, and the devices depicted in FIG. 3B are a minimal representation for purposes of example.

Each of the non-traditional networks (3810 & 3820) is connected to the gateway system (3740), and one of the non-traditional networks (3810) is also connected to the device (3711) hosting the NMAS (3710). In FIG. 3B a single gateway system is depicted, but as will be apparent to those with skill in the art, separate gateway systems could be implemented, one for each non-traditional network, or redundant gateway systems could be implemented on any or all non-traditional networks to increase reliability. The minimal implementation shown is sufficient for the current example however.

The NMAS of FIG. 3B (3710), supports a TM (3715), a DM (3725), and a CU (3720) as described more fully below. The NMAS (3710) is configured to instantiate a CU (3745) on the Gateway system (3740), and provide it with appropriate dynamic applications to permit it to make use of the Gateway system's facilities to access, monitor and/or control the devices connected to the non-traditional networks (3810) and (3820) that are connected to the Gateway system, such as the Gauge (3610) on the Building Control network, or the Valve (3510) on the Factory Floor network. Alternatively, in some exemplary embodiments, a CU (3720) instantiated on the NMAS (3710) device (3711) (or on another device) can use the Gateway system's (3740) facilities remotely to monitor and/or control the devices connected to the non-traditional networks that are connected to the Gateway system, such as the Valve (3620) on the Building Control network, or the RFID Sensor (3540) on the Factory Floor network. In still other exemplary embodiments, the NMAS (3710) can use the Gateway system's (3740) facilities, or a CU (3745) instantiated on the Gateway system, to instantiate a CU (3530), DM (3525), or other NMC directly on a non-traditional network device (3520), such as a workstation, Coordinate Measuring Machine (CMM), or other device having appropriate capabilities. NMASs that can be instantiated on devices directly connected to non-traditional networks, such as the NMAS (3710), can instantiate the NMCs (3525, 3530) on non-traditional network devices (3520) connected to the network (3810) without use of a Gateway system (3740) because the NMAS installed on the device (3710) is connected to the network (3810) independent of the gateway (3740).

NMCs instantiated on non-traditional network devices can support the same functionality as NMCs instantiated on traditional network devices. Due to the different protocols used by non-traditional networks, NMCs instantiated on non-traditional network devices will communicate with those on traditional networks by way of gateway devices, e.g., device 3740, that support access to both networks. NMCs instantiated on non-traditional networks can also communicate with each other on the non-traditional network, where the non-traditional network and its devices comprise the capability to support a required level of data communication. For example, the CU (3530) on the Factory Floor (3500) Workstation (3520), can be configured to store results in the DM (3525) running on the same workstation, or on another device on the factory floor network (3810) (not shown), or the CU (3530) can be configured to send data by way of the CU (3745) in the Gateway system (3740), to be stored on another DM, such as the DM (3725) instantiated in the NMAS (3710). By means of such routing and/or network communication local to the non-traditional network, NMCs instantiated on non-traditional networks can support all of the features described herein. Unless a distinction is made, use of the term "network" herein shall refer to traditional networks or non-traditional networks, or a hybrid network comprising both types, connected by way of gateway systems.

In some exemplary embodiments, NMASs, NMCs, dynamic applications and any other aspects that can be instantiated on various hardware devices may be supported only on particular hardware devices, with separate but equivalent implementations for each supported hardware device. In such exemplary embodiments, NMASs, NMCs, dynamic applications or other such components comprise or are associated with information identifying the device hardware they are compatible with (e.g. by particular file name attributes, file header information, or file name extensions). TMs, CUs or other NMCs that provide, forward or transfer such device-specific components between aspects maintain such identifying information, and transfer it with the device-specific components. NMCs or other components requesting device-specific components can specify the device for which the device-specific components are to be compatible as part of the request process. Alternatively, in other exemplary embodiments, some or all NMASs, NMCs, dynamic applications or other components are created or used in such a way that they are not device-specific and no such identifying information is required for those NMASs, NMCs, dynamic applications or other components that are not specific to particular hardware devices. This can be accomplished through the use of virtual machine technologies, such as Java or VMware, device-independent scripting languages such as Perl or Python, or by other means that will be well known by those having skill in the art. In some exemplary embodiments such device-independent NMASs, NMCs, dynamic applications or other components are associated with identifying information that indicates their device-independent nature.

Referring again to FIG. 3A, the WAN (3200) may connect still other additional subnets and devices (not shown) with the illustrated devices and subnets, as will be appreciated by those having skill in the art. Any network or any sub-network may be separated (i.e., made logically distinct) by additional network apparatus, such as firewalls, routers, and the like, that do not pass network management traffic. All physical or hardware components and devices described with respect to FIG. 3B are conventional and operate as understood by those with skill in the art.

5.2.2 NMAS Installation and Instantiation

To make use of existing devices for deployment of NMAS, NMC or other components, an exemplary embodiment comprises capabilities to transfer the required network management applications and data to existing networked devices, to install the required network management applications on the existing networked devices so as to permit instantiation of the required applications on the existing networked devices, and to instantiate the required network management applications on the existing networked devices.

Transfer of network management applications and data to existing networked devices can be accomplished by means such as network transfer using proprietary or standard network data transfer technologies (e.g. File Transfer Protocol (FTP), HyperText Transfer Protocol (HTTP), or Secure File Copy (SCP)), use of direct connections between devices (e.g. RS-232C serial connections, parallel data cables, USB connections, infrared or radio links or peer-to-peer technologies such as Bluetooth), or placing the applications on an appropriate data recording medium (e.g. CD, CD-R, CD-ROM, DVD, magnetic tape, floppy disk, optical disk, paper tape, USB memory stick, or punch cards) and using existing networked device capabilities to read the data recording medium into its program and data storage systems, or by other means as will be well known to those skilled in the art.

Methods for installation of applications on existing devices vary with the design of the device and associated software. Commands, scripts, programs, or other requirements specific to a particular device or software combination are preferably supplied by the NMAS installation capability. The required commands, scripts, programs or other requirements are determined in some exemplary implementations by choosing a particular exemplary implementation of an NMAS that is known to be compatible with a particular networked device or devices and the software operating thereon for manual installation, such as when initially installing an exemplary NMAS or NMC embodiment on a network by installing it on a device connected to that network device. In alternate exemplary embodiments, or when dynamically deploying instances of the NMAS or NMCs after initial installation, the NMAS is capable of using passive or active probing techniques as described below for device discovery to identify the device, its software and other required information so as to determine the appropriate commands, scripts, programs or other requirements to supply to the device so as to install a, NMAS, NMC or other NMAS component. In yet other alternate exemplary embodiments, the required information can be supplied to an NMAS instance by an operator, by previously created configuration data, by the method of invoking the NMAS, or by other means as will be known to those with skill in the art. The implementation of the foregoing will be familiar to those having ordinary skill in the art.

In some exemplary embodiments, when instantiated on an existing network device, the NMASs or NMCs determine the capabilities of the network device they are instantiated upon, determine appropriate constraints for their own operation so as not to adversely affect normal device operation, acquire any additional components required to make use of the networked device capabilities (e.g. device drivers, dynamic applications, templates, etc.) and to carry out their intended functions. Networked device capability determination comprises such things as identifying network communication interfaces and methods of using these, determining available computing resources (e.g. CPU power, program and data memory and storage, installed utility software, and available services such as database servers, batch processing systems, or capabilities for starting software automatically at system boot time), and calculating how much load can be placed on the device by the network management application activities without affecting normal device operation to too great an extent. In some exemplary embodiments, some or all of this information can be supplied by an NMAS from the information used for transfer, installation and instantiation of the network management application. In other exemplary embodiments the information is determined by the NMAS or NMC itself. Such operations will be familiar to those having ordinary skill in the art.

Some embodiments include the use of device-independent development systems, such as Java, for exemplary implementations of NMASs, NMCs or other components in meeting some of the requirements for compatibility with diverse existing devices. In other embodiments, such systems are not compatible with all existing devices, or even where existing device compatibility is not a factor the limitations of such device-independent systems in terms of functionality supported when dealing with device hardware, or the performance limitations of the development system itself, use other methods for at least a portion of the implementation of NMASs, NMCs or other components. For example, if a device supports instantiation of Java applications, and the Java implementation supports network access for purposes of establishing TCP/IP links to network services, the Java implementation might not support control of the device's network interface hardware in the manner necessary to place it into "promiscuous mode", where the interface accepts data packets intended for other devices as well as those intended for the device the interface is a part of. Using a network interface in promiscuous mode is preferred by some NMAS components in order to perform their functions, such as a dynamic application used to monitor traffic flow on a network segment the device is connected to. Since the example device's Java implementation does not support this, the NMAS component may use non-Java methods, such as device-specific interface software, to carry out this functionality. Even when a specific device-independent development system does not support all capabilities needed by an NMAS component, such systems can still be useful to implement other parts of the component. For example, a Java application can be used to determine information about a device, and then to request, transfer, install, and instantiate a non-Java network management application compatible with the device. The implementation of these operations will be familiar to those having ordinary skill in the art.

5.2.3 Permissions

NMCs are configured to operate cooperatively with other NMCs by providing a flexible system of permissions. This ensures that management commands are only accepted from NMC sources that have the authority to issue the commands, that NMCs are instantiated on devices permitted to host NMCs, that collected data is only transferred between NMCs authorized to accept it, and that the permission system does not limit such activities unnecessarily.

In an exemplary embodiment, Access Control Lists (ACLs) are used to specify permissions. An access control list is a list of permissions associated with a first entity, such as a networked device, operation, data type or other entity, and the ACL identifier or identifiers that must be associated with a second entity for it to exercise those permissions. Any entity associated with the required ACL identifier will be permitted the listed access to the device, allowed to perform the protected operation, collect, send or receive the protected data type, etc. A second entity is associated with one or more ACL identifiers to grant it permissions with respect to a first entity as defined by the first entity's ACL. An entity can have a plurality of ACLs defining a plurality of permissions and the ACL identifiers required to exercise each of them. An entity can be associated with a plurality of ACL identifiers. ACL use of this type is well understood by those having skill in the art.

ACLs can define permissions at arbitrary granularity. For example, an ACL can be used to control data collection from a device, from a specific address associated with a device, from a particular port on a device, from a specific application on a device, or from a specific application during specified time periods on particular device ports. Any entity that can be identified can be associated with an ACL, and other entities must be associated with the required ACL identifier to be granted the specified permissions to interact with the ACL-protected entity. In a first example, an ACL identifier associated with a TM must be listed in the ACL for a device, with permission to instantiate NMCs on the device, before it is permitted to instantiate an NMC on the device. In a second example, a CU must be associated with an ACL identifier listed in the ACL for a DM with permission to push data to the DM, in order to initiate sending of data to the DM. If the CU attempts this without such ACL permission being granted, the DM will refuse the data transfer.

ACLs can be used to specify permissions in whatever manner is required. For example, permission can be given to transfer some types of data, but not others (e.g. device up/down status, but not device bandwidth use), or to permit requests from specific NMCs, but not others. Permission to instantiate NMCs, stop NMCs, specify data routing between NMCs or any other configuration settings for NMCs, permission to query NMC status, etc. can all be controlled by ACLs. ACL restrictions are in addition to restrictions described herein based on Trust Domain (TD) membership. In some exemplary embodiments TD membership is implemented through use of ACLs.

A given ACL permission type can mean different things to different NMC types. For example, an ACL for "collect data" permission, when specified for a CU, permits the CU to collect data for potential sending to one or more DMs, while a "collect data" permission, when specified for a DM, permits the DM to poll CUs for cached data. The specific ACLs used by an exemplary embodiment, and the permissions each grants to the entities associated with the required ACL identifiers, are implementation-specific, and will be well understood by those having skill in the art.

5.2.4 Communication between NMCs

The distributed nature of NMC use requires that NMCs be able to communicate over the network. This requires that they have the requisite address information for other NMCs they need to communicate with. Provision of this information can be accomplished in a variety of ways. In some exemplary illustrative embodiments, TMs maintain NMC address information for all NMCs they instantiate, and provide this to their NMCs as required, whether by the NMC making an explicit request for the information or the information being provided to the NMC as part of the task request that caused the need for the communication, or by other means. In alternative exemplary embodiments, the ID information for an NMC incorporates the address information, or information useful for obtaining the address information, for communicating with that NMC. For example, the ID of an NMC can comprise the IP address of that NMC, the DNS name of the host of that NMC, or a Uniform Resource Identifier (URI) for that NMC. The specific nature of address information will vary with the type of network the NMCs exist on (IPv4, IPv6, SCADA, etc.). In some alternative embodiments, NMCs are addressed by name, by type, or by other characteristics, with communications carried by mobile agents (software/data constructs that have the capability to cause copies of themselves to be instantiated on other hosts) that move around the net searching for a matching NMC, and deliver the communication when a matching NMC is found. Such embodiments avoid the need for distribution of address information to other components, can simplify firewall issues, and reduce problems due to lost location update messages in embodiments where NMCs are also mobile. In embodiments using mobile agents for communication, the mobile agents can collect information about last-known NMC locations to improve communication speed and reduce bandwidth use on future communications with that NMC. In some of these embodiments the mobile agents can exchange NMC location information with each other for still greater efficiency improvement.

In some exemplary embodiments NMCs communicate by a "push" communication model, where a first NMC that has commands or data for a second NMC transfers the commands or data to the second NMC at a time and by a method chosen by the first NMC. In some other exemplary embodiments NMCs communicate by a "pull" communication model, where a second NMC contacts a first NMC at a time and by a method chosen by the second NMC to inquire for waiting commands or data, whereupon the first NMC transfers any waiting commands or data to the second NMC. In yet other exemplary embodiments NMCs communicate by a "cooperative push" communication model, where a first NMC contacts a second NMC at a time and by means chosen by the first NMC and the first NMC requests that the second NMC perform a "pull" type communication session with the first NMC, or with a third NMC. In still other exemplary embodiments any or all of these communication models can be used.

When there is a need to communicate with a plurality of NMCs using the same message data, and if the network in use supports it, a "broadcast" method can be used, where the message is sent once, and received by a plurality of NMCs, rather than being sent individually to each NMC. This method of communication is useful for communication between a TM and the CUs that form a CUG (as described below), for communication between a TM that manages a Trust Domain (TD) (described below) and the members of that TD for purposes such as changing the TD membership key data or making other TD-wide configuration changes. In some alternative embodiments using mobile agents for communication between NMASs and NMCs, the mobile agents search out a plurality of matching NMCs, rather than delivering to the first matching NMC and thus implement a form of limited broadcast communication. Even when broadcast methods are available, use is not mandated, and a plurality of individually addressed messages is permitted when this is determined to be proper by those having skill in the art.

5.2.5 Collection Units (CUs)

The exemplary, illustrative technology herein provides systems, software and methods for detecting, identifying, monitoring and/or controlling various devices connected to the network, as well as the communications between them. To permit more flexible monitoring and/or device control arrangements, and more rapid adjustments to data collection systems, some preferred exemplary embodiments include functionality in the form of a deployable "Collection Unit" (CU). Examples of suitable collection units are software application systems that can be instantiated on various existing networked devices and which perform similar device discovery, data collection and reporting functions as the "Collector" and "Classifier" found in U.S. patent application Ser. No. 11/175,407, and which have a similar ability to make use of Dynamic Applications and to be configured through the use of embedded, included, or dynamic templates. CUs can be of one type, or they can be of a plurality of types, each with differing implementations and capabilities; however, all CUs share certain base level functions and capabilities as described below. Due to their software nature, a plurality of CUs can be instantiated as required, on a single device or on a plurality of network-connected devices, wherever located, without a need to purchase additional hardware or relocate or reconnect existing devices or provide additional power or other resources. In some exemplary embodiments, the devices on which CUs are instantiated can be of a plurality of types, such as mainframe computers, desktop computers, routers, switches, firewalls, file servers, or any other device having appropriate facilities. In some exemplary embodiments, CUs can be instantiated on gateway systems that connect traditional networks to non-traditional networks, or, through such gateway systems on components of non-traditional networks that have appropriate capabilities and permissions. This capability permits rapid and easy expansion, redeployment, or reduction of monitoring and control capability as the needs of the network monitoring and control task change and can permit monitoring of network segments where installation of an NMAS is not practical or possible, such as where no appropriately capable device exists or is installable (e.g. in field locations with adverse environmental factors or lack of available power to support such a device).

Figure 4:
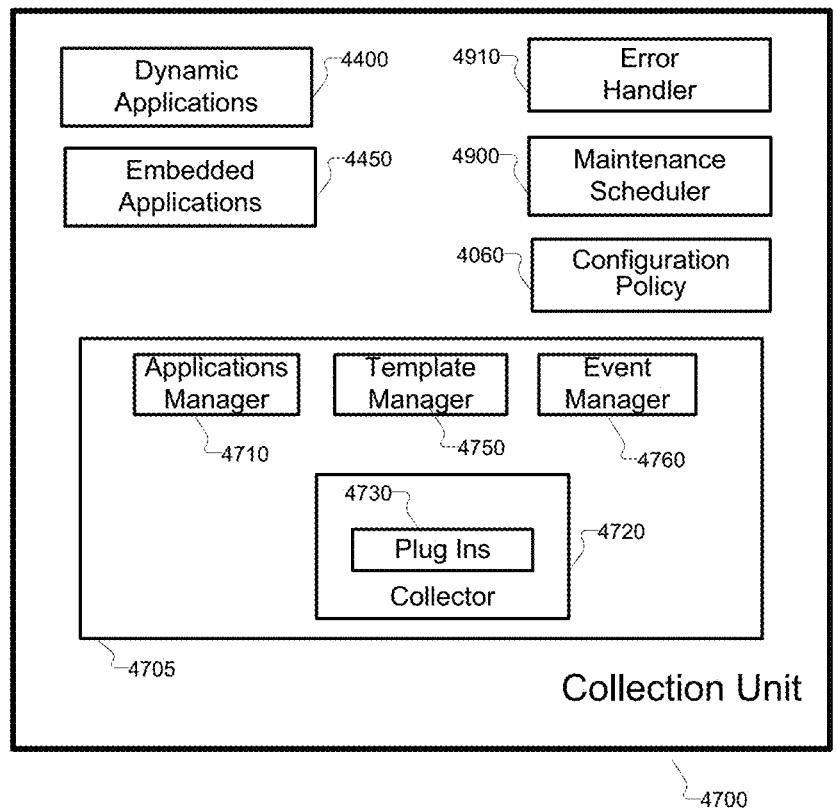
FIG. 4 depicts a schematic diagram of a flexibly-deployable Collection Unit (CU) in accordance with an exemplary embodiment of the illustrative technology herein.

FIG. 4 depicts a schematic of a CU (4700) configured to be dynamically instantiated on an appropriate network device, such as a Windows-based PC, a Linux-based PC, a Unix-based file server or mainframe, a router, or prior art NMD according to one aspect. The CU (4700) makes use of services and capabilities provided by a host device that it is instantiated on for communication, storage, and execution resources (i.e. CPU, memory, etc.). In some exemplary illustrative non-limiting implementations, one or more CU's is dynamically instantiated on one or more existing network devices in a manner that allows an existing or newly installed NMAS to extend its capabilities for monitoring and controlling a network or network portion. More specifically, in a preferred embodiment CU's are dynamically instantiated onto network devices connected to portions of a network or subnets that an NMAS operating on the network can not reach directly, such as beyond firewalls and on opposing sides of likely network break points such as on opposing sides of a router, or on other segments on opposing sides of a hub. Dynamically instantiating CU's onto potentially unreachable network devices provides the NMAS operating on the network an opportunity to maintain, monitor and control portions of a network that may become unreachable in the event of a planned or unplanned network segmentation event, such as might occur with a router failure or misconfiguration. The use of dynamically instantiated CU's improves the collection capabilities of the existing or newly installed network management systems since a CU that is segmented from other network management systems continues to collect and store data that can be subsequently retrieved by, or sent to, other network management systems when the network segmentation is eliminated and a network path between isolated CU's and other network management systems is restored.

Exemplary CUs can vary in specific design and capabilities, and the CU depicted in FIG. 4 is only one possible illustrative example of the typical components used. The CU depicted comprises a "Recognizer" (4705) which compresses a "Collector" (4720), including any "plug-ins" (4730) that may be associated with the collector (4720), an Applications Manager (4710), a Template Manager (4750), and an Event Manager (4760), as described in U.S. patent application Ser. No. 11/175,407. A CU additionally comprises other components substantially similar in purpose to those of the NMD, such as Dynamic Applications (4400), an Error Handler (4910), a Maintenance Scheduler (4900), and a Configuration Policy (4060).

A The CU (4700) may optionally include Embedded Applications (4450), which are functionally equivalent to Dynamic Applications (4400), but which are incorporated into the CU at the time it is created rather than being transferred dynamically as needed. Incorporating embedded applications into an instance of a CU improves efficiency by shortening the time required for an instance of a CU to begin monitoring and managing aspects of the network and its associated devices and by eliminating the network traffic required to request and transmit an equivalent dynamic application. It is sometimes possible to more efficiently implement an embedded application than to implement an equivalent dynamic application through code sharing and re-use with other aspects of a CU.

Dynamic (4400), or Embedded (4450), Applications associated with the CU (4700) are used to collect data from particular devices, sets of devices, types of device, particular protocols or sets of protocols, or other aspects of a network and the network devices connected to it that are monitored by the CU (4700). The CU (4700) is configured to discover and classify network devices and applications running on network devices, or collection of data concerning network devices or the applications running on those devices, using a variety of methods, standard protocols and data collecting techniques including any one of or combinations of the following active and passive data collection methods and others as may be required:

Ping (ICMP "echo request" or equivalent) of selected network addresses

ICMP, UDP and TCP packet reading ("packet sniffing")

SNMP v1, v2, and v3

DNS reverse lookup and "whois" database lookup

Scanning well-known ports to identify applications running on devices

Signature comparison of responses to operating system and application prompts

Lookup of MAC address data against known manufacturer equipment data

"Promiscuous Mode" collection and analysis of data packets addressed to other systems.

In addition, the CU (4700) may be configured to determine which of a Dynamic (4400) or Embedded (4450) Application is best suited for detection, monitoring or control of a given network device or application by initially collecting preliminary data about the network device or application and then using one or more rules that define relationships between the preliminary data collection results and the capabilities of Dynamic (4400) or Embedded (4450) Applications to select which application is most suitable for the network device or applications. Rules, which may be associated with the recognizer (4705) can comprise performing operations such as:

Numeric comparison of collected data elements or parts of data elements.

String comparison of collected data elements or parts of data elements.

String search and regular expression matching in collected data.

Combination of a plurality of rules using Boolean logic.

When collected preliminary data matches a rule or rule combination, the associated Dynamic (4400) or Embedded (4450) Application is considered valid for use with the network device or application the data was collected from. In addition to use for matching appropriate Dynamic (4400) or Embedded (4450) Applications with discovered devices or applications, the rules can also be used to control the instantiation of Dynamic (4400) or Embedded (4450) Applications. For example, a rule can specify that a given Dynamic (4400) or Embedded (4450) Application be instantiated only if a network device is running application "X", but not if application "X" is version "Y" or if application "Z" is running too. Such capability is useful for avoiding conflicts with normal network or device operations, with preserving security of data, and for permitting flexible specification of the Dynamic (4400) or Embedded (4450) Application to use and when and where to use it so that compatibility issues do not arise.

Dynamic (4400), or Embedded (4450), Applications associated with the CU (4700) may also be used to control particular devices, sets of devices, types of device, or other controllable aspects of a network and the devices connected to it that are to be controlled. In particular, the CU (4700) may be configured to alter configuration settings of a network device or application running on a network device that the CU is instantiated on by issuing commands to otherwise controlling the operation of the network device or application running on the network device. Examples of well known mechanisms and protocols that can be used for these purposes include, but are not limited to:

Distributed Managed Task Force (DMTF) standards such as:
CDM—Common Diagnostic Model;
DASH—Desktop and mobile Architecture for System Hardware;
SMASH—Systems Management Architecture for Server Hardware;
WBEM—Web-Based Enterprise Management;
CIM—Common Information Model;
CIM-XML—CIM-XML is a WBEM protocol that uses XML over HTTP to exchange Common Information Model (CIM) information;
CIM Web Services for Management;
DMI—Desktop Management Interface;
ASF—Alert Standard Format;
SMBIOS—Systems Management BIOS;
Network Applications such as:
Cisco Content Switch Module (CSM);
Cisco Application Control Engine (ACE);
Cisco ACE XML Gateway (AXG);

The CU (4700) may be instantiated one or more times on any appropriately capable network device without the need to instantiate a fully functional NMAS on the network device. Moreover, the recognizer (4705) is configured to discover capabilities and configurations of network devices it is instantiated upon, as described above, so that it can make use of device capabilities such as network interface hardware, data storage, CPU and other elements. Additionally, the CU (4700) includes elements that are configured to cache (and, in some exemplary implementations, scan results and digest) data collected by the CU on the hosting device, monitor its effects on the hosting device and adjust its activities to keep said effects from interfering with normal operation of the hosting device, and to carry out additional functionality, such as participation in Collection Unit Groups (CUGs) and Trust Domains (TDs), as described below.

The CU (4700) may further include elements configured to actively invoke functions of the host device, such as by invoking a status or configuration query and or to passively, monitor activity of the host device e.g. by monitoring network traffic, or both, in order to collect data about the host device. Moreover, the CU (4700) may include elements configured to actively or passively query other network devices reachable by the CU, e.g. in a local subnet, and to map the local subnet and determine the type, capability and status of the reachable network devices by either passively or actively monitoring the activity of the other devices. Additionally, the CU (4700) may be configured to store data collected thereby on the host device or in DM's operating on the host device or elsewhere on the network. Moreover, the CU (4700) can be configured to monitor all or a plurality of activities of the host and other reachable network devices, or to restrict monitoring to a subset of available devices or device types, a subset of available protocols, a subset of available addresses, or any combination of these or other subsets of available network data or components. The CU (4700) can auto-detect network devices and self-configure to monitor or control detected network devices through Dynamic Applications or Embedded Applications associated with the types of devices, protocols, or systems discovered. The CU (4700) can be reconfigured by templates sent from TMs or other control nodes operating on the same or other network devices to perform filtering, classification and tagging, annotation or other operations on data collected by the CU (4700) prior to saving or forwarding the data to a storage system such as a DM. The CU (4700) also can be configured by templates sent from TMs operating on other network devices not to collect specific data or types of data when that behavior is required. For example, the CU (4700) can be configured to ignore a specific device, device type, or a particular protocol or protocols when discovering or collecting data. More generally, the CU (4700) at least contains basic functionality, such as an ability to receive Dynamic Applications and use them for purposes such as data collection, classification of data and identification of devices, or for other purposes, and can contain optional functionality, such as enhanced data routing or processing capabilities. Optional CU capabilities can be incorporated into a given CU prior to instantiating it by embedding the capability into the CU or by dynamically configuring the CU after instantiation.

The dynamic nature of CU instantiation on diverse devices as described above permits rapid adjustment of the number and location of data collection points in a network without requiring acquisition, reconnection or relocation of hardware. The ability of CUs to continue data collection for some period of time in isolation from some or all other NMAS components permits continued monitoring of network segments that have become isolated due to hardware failures, configuration errors, or other causes. Data collected during such periods is cached by the CU and routed to appropriate data storage units after connectivity is restored, or deleted if the data has become outdated as defined by one or more flexible policy rules operating on the CU. CUs also can be assigned redundant collection tasks, to reduce loss of coverage if a particular CU is lost (e.g. when the device it is instantiated on shuts down, loses network connectivity or suffers data loss) or temporarily overloaded and cannot perform its monitoring tasks. Elimination of duplicate data is performed by the data manager (DM) components described below when duplication of data is not desired.

5.2.5.1 Auto-Discovery Process

As described in U.S. patent application Ser. No. 11/175, 407, CUs provide an auto-discovery mechanism through the combined operation of the Collector, the Recognizer, and the instantiation conditions portion of the application specifications. The CU (4700) provides templates for filtering data collection that are not available in conventional network management systems. The data filtering specified by templates may be configured to prevent the collection of some data types such as data for particular devices, device types, or services. The data filtering process may further filter data that has already been collected and discard and or not process, cache, or route filtered data to any DM. Data filtering can be performed by the Collector (4720), for instance, by specifying that it not monitor a particular network interface when the filtering affects all devices and services on a network segment connected to that interface, or only reading data that does not match a filtering template specification. In other embodiments, filtering can be effectively performed by the Recognizer (4700), using a Point of Management that specifies use of a "null" dynamic application, which simply discards any data it is given.

One exemplary auto-discovery process (5000) provided by the CU (4700) is depicted in FIG. 5. The exemplary auto-discovery process begins by checking to see if a Point of Management for the collected information matches any filter specification (5007) that would prohibit collection of data from the Point of Management (5005). If a filter specification match is found, a "null" application (one that merely discards any data given to it) is registered for the Point of Management (5015), and the process proceeds to a Registry check (5010). If a filter specification match is not found, the Recognizer (4705) checks the Registry check (5020) for existing known dynamic applications registered that match the Point of Management (5010). If the Registry check succeeds, a dynamic application (5030) associated with the Point of Management is instantiated and a predefined application (5040) is invoked which completes the procedure.

If the Registry check (5020) fails, the Recognizer (4705) checks the Configuration Policy (4060) to determine whether an auto-discovery (5050) should be performed. If the auto-discovery (5050) should not be performed, the process terminates. Otherwise, the Recognizer (4705) checks the Point of Management Description Template in the template manager (4750) to determine a discovery application (5060) to use. The Recognizer (4705) checks the Registry (5070) to determine if this application has already been instantiated. If the application has not been previously instantiated, the Recognizer calls the Application Manager (4710) to instantiate the application (5080) and the process terminates. Otherwise, The Recognizer calls the Application Manager (4710) to invoke the discovery application, passing in the information about the discovery (5090). The process then terminates.

Another exemplary auto-discovery process (6000) that may be provided by the CU (4700) is depicted in FIG. 6. The alternative exemplary auto-discovery process begins with the Recognizer (4705) performing a check of the Registry (6020) for existing known dynamic applications registered that match the Point of Management (6010). If the check (6020) succeeds, a dynamic application (6030) associated with the Point of Management is instantiated (6030) and the predefined application is invoked (6040).

If the Registry check (6020) fails, the Recognizer (4705) checks the Configuration Policy (4060) to determine whether auto-discovery (6050) should be performed. If auto-discovery should not be performed, the process terminates. If auto-discovery should be performed, the Recognizer checks the Configuration Policy (4060) to see if auto-discovery is permitted for the particular Point of Management (6055). If auto-discovery is not permitted for the Point of Management, the process terminates. If auto-discovery is permitted, the Recognizer checks the Point of Management Description Template in the template manager (4750) to determine the discovery application (6060) to use. The Recognizer checks in the Registry (6070) to determine if the application (6060) has already been instantiated. If the application (6060) has not been previously instantiated, the Recognizer calls the Application Manager to instantiate the application (6080) and the process terminates. Otherwise, The Recognizer calls the Application Manager to invoke the discovery application, passing in the information about the discovery (6090). The process then terminates.

In some exemplary embodiments of the CU (4700), the results of auto-discovery can result in one or more further CU's (4700) being instantiated on other network devices. Moreover the further CU's (4700) may include additional or different embedded applications than the CU (4700) depending on the auto-discovery results. For example, if a CU auto-discovery reveals that a network segment contains a DNS server, further CUs instantiated to monitor and control aspects of that network segment can be created with DNS monitoring and control applications embedded so that it is not necessary to discover the need for them and request these as dynamic applications. Likewise, if it is found that there is no requirement for a given embedded application, that embedded application can be omitted from further CU instantiations. By embedding applications with a high probability of being required, and omitting those with a low probability of being required, CU and TM resource consumption, network communication traffic, and the time required for a CU to assume monitoring and control duties is reduced, thus improving efficiency and effectiveness of the network management system as a whole.

When it is necessary to change the tasking of a CU, whether to require it to collect additional data, such as data about a specific device, service or application, or to prevent it from collecting data, such as data from a specific device, device type, service or type of service, or some combination of these or other tasks, a TM sends a Data Element Definition Template (described below) to the CU that describes the data elements that are to be collected, and optionally to define one or more dynamic applications to handle the collection, or alternatively, the data elements that should not be collected. As depicted in FIG. 7, the CU (4700) may receive a Data Element Definition Template (7110) from another NMC through the Template Manager (4750). The Template Manager (4750) first checks the CU's Registry (7020) to see if the CU is already collecting the data elements as required by the new template. If the check (7030) determines that the CU is not already collecting the required data elements, the Template Manager (4750) updates the Configuration Policy (4060) to require collection of the missing elements (7040), such as by causing the Collector to instantiate a plug-in, or to adjust the Data Elements collected by an existing plug-in. The Template Manager (4750) then causes the Collector (4720) or Application Manager (4710) to instantiate the required applications (e.g. a dynamic application) with the required parameters (7050). In some cases, the Application Manager (4710) may acquire a dynamic application from another NMC in order to allow the Collector (4720) to instantiate it. If the Data Element Definition Template does not include any negated data element specifications (7060), the process is complete. If the Data Element Definition Template includes negated data element specifications (7060), then the Template Manager updates the Configuration Policy (4060) to prohibit collection of the specified negated data element specifications (7070), and if any of the negated data element specifications are currently being collected (7075), performs an "update in place" for the applications that are doing such collection (7080). In some embodiments, all data elements associated with a specific dynamic application are covered by a negated data element specification, and the data element specification can reference a "NULL" dynamic application. If the CU is part of a "Collection Unit Group" (CUG) (7090), the CU forwards the new Data Element Definition Template to the other CUG members (7095) so that they have it available in case fail-over or load balancing requires them to take over performance of the task.

In some embodiments CUs are configured to send collected data to one or more DMs, to send data to a particular DM based on the nature of the data, the state of communication with another DM or DMs, or by rule sets which flexibly define how data is to be routed and stored. In other embodiments, CUs are configured to filter data based on rule sets that define the data to be ignored and/or the data to be collected. In still other embodiments, CUs are configured to perform processing operations on collected data to reduce the processing workload of other components of the network management system, such as DMs. In some embodiments, CUs cache data when connectivity with an appropriate DM is not available, or until a specified level of cache capacity remains, or until a DM requests that the data be transferred to the DM. In other embodiments, CUs are configured to perform compensating actions in the event that remaining cache capacity is reduced sufficiently or becomes exhausted, such as attempting to contact a DM for transfer of some or all of the data in the cache, contacting a DM to request that the DM request transfer of some or all of the data in the cache, contacting a Task Manager to request assignment of an alternate DM to transfer some or all cached data to, deletion of low priority data, or other actions as determined to be proper by those having skill in the art.

5.2.6 Data Managers (DMs)

Some embodiments of the exemplary, illustrative, technology herein comprise components responsible for the storage, retrieval, and maintenance of data collected by NMCs or other components of the system. These data storage components are referred to herein as "Data Managers" (DMs) and are dynamically instantiated on appropriate and available existing networked device resources, such as file servers, mainframe computers, dedicated database servers, desktop PCs, prior art NMDs, or others. DMs make use of the network communication and data storage capabilities of the network devices they are instantiated upon, or other storage capabilities usable by such devices (e.g. network virtual storage systems, RAID arrays, etc.), to request, accept, forward, store, safeguard, process, distribute, duplicate, and/or permit authorized access to collected data in a flexible manner. DMs can make use of one or more data storage technologies and systems that are available to the devices where they are instantiated, such as local or networked file systems, local or networked virtual storage systems, DBMS capabilities, mass storage systems and off-line backup systems to carry out their functions.

DM behavior is controlled by templates provided by controlling TMs or other authorized components. DMs are provided with Data Storage Definition Templates (described more fully below) to define their use configuration and behaviors with respect to data storage, and Data Routing Specification Templates (described more fully below) are used to define routing of data to or from DMs. Initial Data Storage Definition Templates are provided as part of the DM installation for use when the DM is instantiated. Additional or updated templates can be provided by a controlling TM or other authorized component as required after instantiation to alter the use of local or remote storage facilities, request data, or other operations.

The flexibility of exemplary embodiments as to data routing, data storage, and data sharing between components permits management of a network from a single location, regardless of how large or dispersed the network is, management from a plurality of locations, or for different aspects of network management to be performed by different users, or any combination of these. For example, the owner of a network can arrange to have all data collected about a network routed to DMs that are available to the owner for monitoring and control of the entire network, but arrange to have data collected about a particular device or devices, such as those provided by an Internet Service Provider (ISP), routed to DMs which are available to the ISP for use in monitoring and controlling the network's connection to the Internet. Such an arrangement permits the ISP to monitor its own equipment on the network, without permitting the ISP to monitor or control any other network devices, thus maintaining security and appropriate control for each party, while still permitting the ISP's presence on the network. In large data centers that can include devices maintained by a plurality of different contractors, such a capability is important, and not provided by typical prior art network monitoring systems. Details of the features providing this functionality are given below.

The dynamic nature of DM instantiation permits adjustment of the number and location of data storage points in a network without requiring acquisition, reconnection, or relocation of hardware. By locating DMs in network proximity to CUs, whether on the same devices or on different devices e.g. on the same subnet, and configuring those CUs to store collected data in those DMs, the ability of CUs to continue data collection in isolation from other aspects of the NMAS is enhanced. While some exemplary CUs are capable of caching data themselves, their storage capacities are typically more limited than those of DMs, and if the caches can not be flushed out to a DM, the CU's available cache space can become exhausted and impact data collection adversely. By positioning DMs on the same network segments as the CUs that send them data to store, the load on segment connection systems, such as routers, is reduced, and the bandwidth of other parts of the network are not affected.

5.2.7 Task Manager (TM)

In another aspect, Task Managers (TMs) provide for the specification of, configuration of, instantiation of, and management of zero or more Collection Units (CUs) and/or zero or more Data Managers (DMs). NMC management by TMs comprises, without limitation, the processes of software transfer, instantiation, configuration, removal, monitoring, and control of CU, DM, dynamic applications, and related network management technologies.

In some embodiments, TMs instantiate instances of NMCs, such as CUs and DMs, as required, using the resources of networked devices that the TM is authorized to use for these purposes. The Configuration Policy of the TM supplies authorization and other information required to make use of these resources. To instantiate NMCs on remote networks, a TM must be able to communicate with a device on the remote network without interference by any of the network components involved with routing, filtering, and blocking network traffic (such as routers, firewalls, switches, etc.). Such connectivity can be accomplished by way of specific permission settings in network devices that filter or block network traffic, use of Virtual Private Network setups, where separate network segments are made to appear to be connected, even though other networks are used to carry some or all of the traffic between them, by "tunneling" communications using systems such as Secure Shell (SSH), or by other means as are known to those with skill in the art.

In other embodiments, TMs remove NMCs as appropriate, and supply NMCs with template-based configuration data to control their behavior as well as providing any dynamic applications required to permit their proper functioning. Non-TM NMCs can be managed by a plurality of TMs, or by a single TM.

In still other embodiments, a TM is configured to implement load balancing between CUs to prevent a CU being overloaded or placing too many requirements on its host by controlling what devices or data a given CU instance is concerned with (i.e., filtering), or how it deals with collected data (processing, caching and/or routing). In some exemplary embodiments, a TM can divide a first template, creating a plurality of second templates that collectively describe the tasks specified by the first template, and assign the second templates to a plurality of NMCs. For example, if a template describes four information items that are to be collected, a TM could create four templates, each of which describes one of the required information items, and assign the four templates to four different CUs. This spreads the workload over the four CUs, limits data loss when a system hosting a particular CU shuts down or fails (assuming the CUs are hosted on different systems), and permits finer-grained load balancing. In some exemplary embodiments this TM functionality can be incorporated into a CU that acts as a "master" CU in a CUG, which permits the CUG to autonomously divide assigned templates between CUG members without involvement by a controlling TM. When appropriate, a TM can create additional CU instances for load balancing or to monitor parts of the network, which are not accessible to existing CU instances due to network segmentation, firewalls, protocol limitations, hardware limitations, or for other reasons. TMs can create, manage and dissolve Collection Unit Groups (CUGs) as appropriate to reduce network traffic overhead, provide CU failover and autonomous load balancing capabilities, as described more fully below. A TM can implement load balancing for DMs to prevent a DM from being overloaded or placing too many requirements on its host by controlling which CU instances send data to the DM, what type of information is sent (data routing) and how the data is transferred (e.g. CU initiated, or when polled for by a DM). When appropriate, a TM can create additional DM instances for load balancing or to serve the needs of CUs which cannot access existing DM instances due to network segmentation, firewalls, protocol limitations, hardware limitations, or for other reasons.

In yet other embodiments, TMs create and manage CUG memberships for the CUs they create or manage and also manage and control Trust Domains (TDs) that define and limit interactions between NMCs. CUGs and TDs are described more fully below.

5.2.8 Task Manager Control of Network Management Functions

FIG. 8 illustrates one exemplary non-limiting embodiment which depicts the above-described control of NMCs by TMs with respect to the network of FIG. 3A on which lines of control have been superimposed wherein each NMC is instantiated and controlled by one or more TMs (8082, 8092, 8062 & 8082'). As depicted in the FIG. 8, the first TM (8082) provides specification, configuration, and management of a plurality of CUs (8063, 8088, 8078, 8073, 8032, 8026, 8024 and 8022), as well as a plurality of DMs (8083, 8068 and 8034). The second TM (8082') provides for the specification, configuration, and management of CUs (8073, 8084 & 8086) as well as DM (8087). The first TM (8062) also provides for the specification, configuration, and management of CU (8063) and DM (8068). The second TM (8092) provides for the specification, configuration, and management of CU (8098) and DM (8093). The lines of control are depicted by the dashed lines (8110, 8115, 8125, 8135, 8130, 8145, 8140, 8150, 8156, 8155, 8120, 8111, 8113, 8165, 8170, 8175, 8180 & 8185). Note that some NMCs, such as the DM hosted by the File Server (8034) or the CU (8078) hosted on the PC (8075), are instantiated and controlled by a single TM (8082), while other NMCs, such as the CU (8073) hosted on the PC (8071) or the DM (8060) hosted on the Device (8067) are initially configured and instantiated by a single TM, e.g. the first TM (8082), but are dynamically configured and managed by a plurality of TMs; (8082 & 8082') for the CU (8073), and TM's (8082 & 8062) for the DM (8068). Other devices and components depicted include a firewall (8070"), Devices (8065" & 8067) and a PC (8064) on the subnet (8060"), a Device (8061), firewall (8070'), PC (8071), DM (8160) and NMAS (8080') on the subnet (8060') instantiated on an existing device (8081'), and NMASs (8080 & 8090) instantiated on existing devices (8081 & 8091), Mainframe (8020), Devices (8065, & 8010), PC (8075), firewall (8070), Ethernet (8045), Token Ring (8040) and DB Server (8030) in the D.C. Office (8060).

By instantiating CUs on all network segments, a TM can permit continued collection of data should the network segments be disconnected unintentionally, such as by loss of connectivity between the Sydney Office, subnet (8060"), and the WAN (8200), which prevents monitoring by NMASs (8080, 8090 & 8080'). The CU (8063) on the subnet (8063) can cache data until connectivity is re-established, or can be configured to route data to a local DM (8068), either by default, or as a fallback routing when other DMs are not reachable.

Decisions regarding where NMCs should be instantiated can involve a number of factors. These include, but are not limited to, the available and permitted devices (including virtual machines) for hosting NMCs, the available resources on those devices (e.g. CPU time, memory, non-volatile storage, network connectivity), and the network topology. When network topology is known, whether by configuration or by discovery, segments that would become isolated by failure of network infrastructure components, such as routers, switches, or hubs, can be identified, and NMCs instantiated on those segments so as to maintain data collection and management should the network segment become unreachable. When existing NMCs are becoming overloaded, additional NMCs can be instantiated, and tasks re-apportioned to balance the workload between them. In some embodiments, manual configuration settings can specify where NMCs are to be instantiated, and, optionally, the tasks they are to be assigned. For example, the configuration of a TM can specify that it is to instantiate a CU on device "X" that is to be tasked with discovering devices in address range "Y" through "Z". Exemplary embodiments can employ any of these methods or any combination of these methods, or others as are known to those with skill in the art.

In some embodiments, CUs and DMs are monitored by one or more TMs for workload, connectivity, or other aspects that relate to their ability to function at an acceptable Quality of Service (QoS) level. TMs can instantiate additional CUs or DMs; remove unneeded CUs or DMs; create, alter, or remove CUG relationships between CUs; adjust CU tasking; alter data routing from CUs to DMs; or take other actions so as to maintain workloads at a level that permits the CUs and DMs to function at an acceptable QoS level. NMCs are also monitored to detect when connectivity is lost so that the reason for this can be determined. If it can be determined that other devices on the same segment as the NMC host are still reachable (e.g. through use of a "ping"), but the device hosting the NMC can not be reached, it is likely that the NMC host has been lost, whether by a device failure, device shutdown, disconnection from the network, or other cause. If other devices on the network segment with the NMC host cannot be reached either, it is likely that the network segment has become isolated from the network. If devices on other network segments cannot be reached, it is possible that the network segment where the monitoring is being done has become isolated. Once a failure is detected by one NMC, other NMCs can be enlisted to assist with collection of data, such as by performing ping operations from different points in the network to create a reachability diagram and so map the new failure-created network topology. Determination of the point of failure is useful not only to permit instantiation or re-configuration of NMCs to maintain operations despite the failure, but also to record and report the failure so as to assist with repair operations.

According to additional aspects of the exemplary illustrative non-limiting technology herein, CUs report devices and protocols discovered to TMs as specified by the configuration of the CU, whether the configuration was embedded in the CU prior to instantiation, or dynamically installed in the CU after instantiation through distribution of one or more Data Element Definition templates. According to further aspects TMs configure CUs to monitor or manage discovered devices or protocols by use of templates. Alternatively, TMs can configure CUs not to monitor or manage discovered devices or protocols by use of templates. Templates received by CUs can cause CUs to request transfer of dynamic applications from TMs that are useful for detecting, identifying, monitoring, or managing devices or protocols, or for processing the data collected from these.

In some embodiments, the NMC workload can be managed by the NMC itself, and in other embodiments, the NMC workload is managed by other NMAS components, such as TMs, using various performance metrics. Examples of possible metrics for this purpose include, but are not limited to:

- An NMC is late in performing a scheduled task, such as a DM polling a CU for cached data (i.e., "running late").
- An NMC is not clearing cache as quickly as it is being filled over a period of time (i.e., "running behind").
- An NMC is not running tasks as assigned.
- The rate of data being collected exceeds a predetermined level.
- An NMC resource usage, such as CPU, memory, or cache space, exceeds limits set by the Configuration Policy.

In some embodiments, NMCs with excessive workloads can respond automatically by "load shedding," which comprises an orderly reduction in workload, according to rules defined in the NMC's Configuration Policy. Possible methods of load shedding can include, but are not limited to:

- Notify a controlling TM that workload is excessive. The TM can respond by reassigning or removing tasks, creating additional NMCs to share the task load, or by other means.
- CUs in a CUG can pass the task to another CUG member that is less heavily loaded.
- Low priority monitoring tasks can be delayed or stopped. Controlling or issuing TMs are notified of this so that the tasks not being carried out can be reassigned or changed in priority if required.
- Polling and auto-discovery tasks can be delayed to limit the amount of response information collected and processed. Controlling or issuing TMs are notified of this so that the tasks being delayed can be reassigned or changed in priority if required.

5.2.9 Exemplary Network Management Application System (NMAS)

One exemplary, illustrative, non-limiting embodiment of an NMAS is depicted in FIG. 9. The NMAS of FIG. 9 (9080) is instantiated on an existing network device (9081) comprising a Device Operating System (9100) and Device Interface (9200). The existing device (9081) also comprises additional components and hardware (not shown). The NMAS (9080) comprises a number of components which are substantially similar to NMD elements, such as, Device Manager (9050), Interfaces (9600) such as Publish Interfaces (9620) and Receive Interfaces (9610), a Maintenance Scheduler (9950), Dynamic Applications (9975), Configuration Policy (9900) and an Error Handler (9990) that are not described further herein. The Network Services (9925) component comprises optional "pre-integrated applications" that implement various network services such as DNS, LDAP, and others. In addition, according to one aspect, the NMAS (9080) of FIG. 9 comprises dynamically deployable components. These dynamically deployable components can comprise one or more instances of a "Collection Unit" (CU) (9700a & 9700b), one or more instances of a "Data Manager" (DM) (9800), and one or more instances of a Task Manager (TM) (9300). A DM (9800) comprises a Data Store Manager (9820), and Data Store (9810) made up of an optional Registry (9812), optional Application Data Store (9814), and Template Data Store (9816). These components of a Data Manager are described in U.S. patent application Ser. No. 11/175,407.

Dynamically deployable components, such as CUs, can be of a common type, or they can be of disparate types, as shown by the different configurations of the two CUs (9700a & 9700b) in the exemplary NMAS depicted. CU A (9700a) comprises a Recognizer (9705b) with its Applications Manager (9710a), Template Manager (9750a) and Event Manager (9760a), and a Collector (9720a) with its Plug-Ins (9730a). This instance of a CU makes use of NMAS facilities, such as the Maintenance Scheduler (9950), Dynamic Applications (9975), or other capabilities as needed to carry out its tasks and is deployed on existing devices in conjunction with an instance of an NMAS so that these capabilities are available to it. CU B (9700b) comprises the same capabilities as CU A (9700a), such as a Recognizer (9705b) with Applications Manager (9710b), Template Manager (9750b), and Event Manager (9760b), and a Collector (9720b) with Plug-Ins (9730b), but also comprises additional capabilities such as a Configuration Policy (9060b), Dynamic Applications (9400b), Embedded Applications (9405b), Error Handler (9910b), and Maintenance Scheduler (9900b) that permit it to operate in isolation from an NMAS instance. While FIG. 9 depicts CU B (9700b) as part of an NMAS instantiation (9080), CU B (9700b) could also be instantiated on the host device (9081) on its own without an NMAS (9080). In some exemplary embodiments, a CU instantiated on a device that is not hosting an NMAS can make use of local operating system facilities, such as on a Linux or Unix-based existing device, the cron job scheduler, rather than implement its own parallel capabilities. Such facility sharing reduces the resource consumption of the CU on the host device and maximizes the number of devices capable of hosting a CU. The situation is similar for NMASs and for other types of NMC, such as DMs or TMs which can make use of local device capabilities or provide their own, as deemed proper by those having skill in the art.

Unlike prior art NMDs, where hardware was of known design and software was configured to make use of it as part of the construction of the NMD, NMASs and NMCs configured can be instantiated on a variety of devices and therefore include capabilities to discover and then to make use of a host's available interfaces, data storage facilities, and other resources. In some embodiments this is accomplished implicitly through support provided by the implementation system used to create the NMAS and NMCs, for example the various standard Java system interface (e.g. java.lang.management) and other classes. In other embodiments this is accomplished explicitly through probing the host device's capabilities using standard system calls, applications and other capabilities of the OS the NMAS or NMC instance is designed to be compatible with. For example, on a Unix or Linux OS, an NMD may initiate a "netstat" command to identify network interface devices, the local host's IP address, and other relevant information, and the "df" command to identify file system devices and the capacities and space availability for each. Device capable of hosting an NMAS or NMC typically have capabilities for determining the information required by an NMAS or NMC and can be used by the NMAS or NMC for this purpose.

In some embodiments, NMASs instantiate one or more CUs, one or more DMs, and one or more TM's with the number of CUs, DMs and TMs instantiated at any given time being variable with the configuration and needs of the NMAS. The instantiation of a plurality of CUs, DMs, and TMs on a single network device provides for additional segregation of network traffic, finer grained management and data collection by the NMAS, and, potentially, other benefits, such as improved or more flexible security capabilities or ability to make more efficient use of hosts with a plurality of processors.

In other embodiments, NMASs interact with NMCs instantiated on other network devices, whether the NMCs were instantiated by a first NMAS, by disparate NMASs, manually installed and/or configured, or installed and configured using a third party management system. Creation and management of the trust relationships required for such shared interaction is described below.

5.2.10 Templates

In some exemplary illustrative embodiments, initial and dynamic configuration of CUs, CUGs, DMs and TDs is performed through the use of templates. Templates are uniquely identified, independent structures that are used to define one or more aspects of the operation of an NMAS, TM, CU, CUG, or DM. In more specific embodiments, the templates are configured with extensions and alterations that provide new functionality. For example, additional template types and extensions defined below are used for configuring TD and CUG membership, specifying CU configuration with respect to data collection, filtering, processing, storage, and data routing to DMs, specifying DM configuration with respect to data acceptance, replication, storage, and access, and for other purposes as may be required. Description of these additional template types and extensions appears below.

Templates may be, without limitation:
Defined within an NMC instance;
Stored within an NMC instance;
Imported from or exported to an NMC instance in a "normal" form;
Converted to a non-"normal" form for more efficient use, transfer or storage;
Stored independently of NMC instances;
Shared between NMC instances, either manually or automatically;
Manually or automatically constructed;
Sealed for integrity.

In some exemplary embodiments, each template element is a discrete data item or a collection of data items. A template fragment is a collection of template elements that have a common purpose and may be independently identified. A template fragment often meets the requirements of a template described above, although there is no requirement for a template fragment to meet all template requirements.

In some exemplary embodiments, policies define how an NMAS or NMC is configured or operates. For example, a Configuration Policy defines which NMCs may be hosted by specific host devices, which network devices may be used to host NMAS or dynamic NMCs, and what NMCs each may host along with any restrictions, authorizations, or other information relevant to such hosting. Policies are encoded as instantiations of templates. Policy templates are pieces of a defined policy that have been abstracted so they may be shared between NMASs, NMCs or the dynamic applications they use. A default policy template is one that is used if a specific policy is not specified.

In at least one exemplary, illustrative, non-limiting embodiment, templates are described using an XML-based "normal" form. One of skill in the art will understand that templates may be described using alternative data representations. An XML-based "normal" form is a well-defined format that facilitates the exchange of templates between NMAS and NMC instances. However, XML has significant overhead costs and is not always compatible with configurations and storage methods required for specific applications. In these cases, a template may be translated to a native format more conducive to its intended use, as will be well understood by those having skill in the art. While in normal form, XML-based standards, such as those listed below, can be used to describe various aspects of the template's representation. Other standards or proprietary formats may be used when a template is stored in other than normal form.

| Template Structure | Standard |
| --- | --- |
| Basic template structure | XML, as defined within this document and its appendices |
| Digital Signatures, Digests, etc | WS-Signature standard. |
| Conditional expressions | XQuery standard |
| External references, including service, template, schema, and other definitions | URI |

Templates and template fragments can be stored, transmitted, and represented in many forms, including: flat files, delimited files, tag-value pairs, binary formats, LDAP, and NMC internal representations. For example, a template representation of a DNS server configuration may be defined by the operator using the XML "normal" form, or exported and shared between NMAS or NMC instances in this form, and converted to a flat file suitable for configuring the Unix Bind application when stored in a CU instance responsible for configuring a DNS Bind server application. Similarly, this template may be stored within an LDAP-style directory compatible with Microsoft Active Directory when the DNS server being managed is hosted on a Microsoft Windows Server.

5.2.10.1 Template Prioritization

In some exemplary embodiments, templates may include a Priority template element, provided to support prioritization of templates. The Priority template element specifies a priority for the template, with templates having higher priorities superseding templates with lower priorities when these templates conflict, e.g., when carrying out the processing required by a first template would require ignoring and not fully carrying out the processing required by a second template. For example, a low priority template specifying that a CU is to collect all examples of TCP/IP traffic can conflict with a higher priority template that specifies not to collect any traffic from a specific device when that device generates TCP/IP traffic. A CU receiving both of these templates would limit performance of the lower priority template's processing requirements such that the higher priority template is obeyed and collect all TCP/IP traffic except that from the specified device. In some embodiments, lower priority templates are not ignored due to conflicts with higher priority templates; all templates are followed to the extent possible without failing to abide by the requirements of higher priority templates. In situations where templates do not conflict, template priorities are irrelevant. For example, a template requiring a CU to collect all TCP/IP "telnet" application data does not conflict with a template requiring a CU to ignore ICMP "echo" request or response data. In some embodiments, conflicting templates with identical priority values require intervention (e.g., operator intervention). Until such intervention is accomplished, various exemplary embodiments deal with the problem in diverse ways, such as ignoring all such conflicting templates, arbitrarily selecting conflicting templates to ignore until the conflict is resolved, choosing to ignore the most recently created templates in favor of older templates, choosing to ignore older templates in favor of more recent templates, or by other means as determined to be appropriate by those having skill in the art.

5.2.10.2 Template Referencing

In some exemplary embodiments, templates that are uniquely identified can be referenced by other templates. In addition, templates can reference NMCs, NMASs, executable code or scripts, images, web services, and other external systems, data and applications. In one exemplary, illustrative, non-limiting embodiment, this is accomplished using "Uniform Resource Identifiers" (URIs), as defined by the World Wide Web Consortium (W3C) standards organization. URI format and semantics are defined in the RFC 2396 standards document. Briefly, a URI defines a protocol part and a reference part. The protocol part defines the method or manner by which the reference is to be made. An NMAS or NMC provides for the extension of the protocol part and the association of protocol parts with specific handlers using a Configuration Policy.

In one example, a template data query scheme according to one aspect provides a substantially unified mechanism for specifying a reference to a desired component, whether NMAS, NMC, code, data, or another template. Under the URI protocol extension model, any of the conventions used in the various application deployment models may be used to specify the reference. The NMAS reference specification section of a template identifies the calling convention and any required information.

For example, a template may specify a specific NMAS instance as:

NMAS:://1.2.3.4/;TYPE=NMAS;PROCESS_ID=765; LISTEN_PORT=7700

Where 1.2.3.4 is the network address of the host the NMAS instance is instantiated on.

Furthermore, a template can specify an NMC executing on its own as, for example,:

NMC://5.6.7.0/;TYPE=CU;PROCESS_ID=98765;LISTEN_PORT=7700

A device, such as a network router, can be specified as, for example,:

DEVICE://7.6.5.4/;TYPE=router; MANUFACTURER="RouterMaker, Inc.";MODEL=xyz

A template is not limited in how it can specify a specific component and parameters as long as this specification can be encoded in a form that is understood by all components making use of the template, such as a URI in an exemplary embodiment. This method of specification can be extended using a Configuration Policy.

5.2.10.3 Template Elements

Examples of some common template elements are described below and used in additional exemplary template descriptions herein.

| Element | Description |
| --- | --- |
| Template Type Indicator | Indicator of the type of a given template (a TTI) |
| Template Indicator | Indicator of start or end of template specification |
| Template Reference | Reference to another template |
| Template Separator | Indicator of an internal template division point |
| Template Name | Descriptive name of a template |
| Template ID | Unique machine readable ID (a TID) |
| Template Version ID | Descriptive version of template (e.g. 1.3) |
| Authenticity Specification | Authenticity specification, in XML. For example, an XML Signature. |
| Template Priority | Priority Value (e.g. "high"/"low", an integer, etc.) |

-continued

| Element | Description |
|---|---|
| Processing Element Specification | Specification of the device, device type, NMC, NMC type, or other entity specification that is assigned, or permitted, to process the template |

In some embodiments, a Template Type Indicator (TTI) identifies the type of a given template, such as a Data Element Definition Template, an Application Code Definition Template, or a Trust Domain Specification Template. In other exemplary embodiments, TTIs comprise integer values, with specific integer values being associated with each type of template, for example, a TTI for a Trust Domain Specification Template can be '1', a Data Element Definition Template can be '2', etc. In other exemplary embodiments, TTIs comprise character strings, with a different character string assigned to each template type, such as the name of the template (e.g. "Trust Domain Specification Template", "Data Element Definition Template", etc.). In yet other exemplary embodiments TTIs comprise a combination of integers and character strings, XML specifications, or other specifications unique to each type of template as determined to be proper by those having ordinary skill in the art.

In one exemplary embodiment, a Template Indicator defines the start or end of a template specification. A Template Indicator is a unique tag and may not have any data associated with it. It may have an optional attribute called "descr" that contains a text description of the template contents. For example, the attribute can be defined as depicted in the example below:

<TEMPLATE descr="working template created on 1/1/02">

In some embodiments, a Template Reference references an instance of another template, either by Template ID or a combination of Template Name and Template Version ID. In one exemplary, illustrative, non-limiting embodiment, optional parameters, (e.g., an internal flag within the reference) determine how the reference is interpreted, how version ID's are managed, and the action(s) to take if the template reference cannot be satisfied. In a further exemplary, illustrative, non-limiting embodiment, a Template Reference can be represented by a fully or partially specified URI, a relational database row ID, an LDAP organization unit, a Document Object Indicator (DOI), or any other method determined to be proper by those having skill in the art.

In some template embodiments, a Template Separator is used when the boundary of a logical section of a template must be indicated. For example, if a template comprises a plurality of item groups, use of a Template Separator can make parsing of the individual item groups from the template as a whole, a simpler task. In another example, if a first template can optionally be broken down into a plurality of second templates, such as when assigning a plurality of tasks to a CUG and the tasks must be allocated to two or more CUs within the CUG, Template Separators can be used to indicate where the first template can properly be divided.

In some embodiments, a Template Name is a descriptive name for a template. An example of a suitable template name is a name that is descriptive of the template or its intended use, e.g., the Template Name can be "Microsoft Windows Server 2003" or "Data Routing for collected TCP/IP data."

In some embodiments, a Template ID is a unique ID used to uniquely identify a template and to permit automated references to a particular template. An example of a useful template ID is one that uniquely identifies a specific template or template instance.

In some embodiments, a Template Version ID is a descriptive name for describing the version of the template. It is used to distinguish between multiple copies of templates with the same Template Name. In some exemplary embodiments Template Version IDs are sequential values so that temporal sequencing of a plurality of template copies with the same Template Name can be determined.

In some embodiments, templates can comprise an Authenticity Specification. An Authenticity Specification is used to specify one or more of the following: the ID of the entity that constructed the template (such as by provision of a unique name and/or a reference to the NMAS, NMC or other entity), TD Authorization Credentials (as described elsewhere herein) proving current membership in an appropriate trust domain, and sufficient information to permit validation of the template as intact and unmodified in transit, such as a checksum, MD5 signature or equivalent of the template, encrypted with the private key of the entity that constructed the template to prevent alteration of the validation information by any other entity. In alternative exemplary embodiments, an Authenticity Specification comprises a reference to at least one of a set of authentication methods that are known to the receiving NMAS, NMC or other entity. Such known authentication methods can comprise just assuming that the template is authentic, contacting the named entity and requesting confirmation that the template was sent by that entity, or any other method known to those with skill in the art.

Some embodiments a template may include a Template Priority. A Template Priority element is a machine-usable description of the relative priority of the template with respect to other templates for use when resolving template conflicts, as previously described. In an exemplary embodiment, a Template Priority is an integer, with higher values equating to higher priorities, and lower values equating to lower priorities. In an alternate embodiment, a Template Priority is one of a set of symbolic representations of priority values (such as "high", "medium" or "low") having values relative to each other that are understood and usable by the exemplary embodiment's components.

In some exemplary embodiments, a Processing Element Specification (PES) is used to indicate one or more devices, NMCs, or other entities, or any combination of these, which are assigned, or permitted, to process the template. If a PES specifies a single entity, only that entity is permitted to process the template. If a plurality of entities is specified, the template can be processed by any one, and only one, of them at a given time. Under some circumstances a template comprising a Processing Element Specification that specifies a plurality of entities can be processed by a plurality of entities over time. In some embodiments the PES is an ACL.

5.2.10.4 Template Fragments

Template fragments can be described by a template fragment name. The fragment name is not an element of the template; rather it is a shorthand description used to describe the contents and use of the template fragment. As such, the template fragment concept is dynamically extensible to include additional types not described in this document as additional applications are defined and deployed on or by the NMAS. Below are some exemplary template fragments.

| Template Fragment Name | Description |
| --- | --- |
| Classification Signature | Defines a device classification specification to be used by a CU |
| Data Element Definition | Defines information to be collected by a CU |
| Data Definition | Defines information collected by a CU |
| Application Code | Defines application code to be executed |
| Policy | Defines information that specifies how a NMAS or NMC should operate. Also used to specify the expected or required configuration of devices, services, and applications managed by an NMAS or NMC. |
| Access Credentials | Defines access credentials |
| Data Routing Specification | Defines how collected data is to be handled and where it is to be stored |
| Data Storage Definition | Defines how a DM is to accept, manage, share, and protect its data |
| Trust Domain Specification | Defines TD membership and/or privileges within a TD |
| NMC Association Template | Defines an association between two or more NMCs (e.g. a CUG) |

Classification Signature, Policy, and Access Credential templates are described in U.S. patent application Ser. No. 11/175,407.

A Data Element Definition is used by a TM to name and/or describe data elements that are to be collected from devices, applications, and services under management by CUs. Data Element Definitions are fragments of Data Element Definition Templates, as described below.

A Data Definition provides a mechanism for representing data collected by a CU. Data Definitions are fragments of Data Definition Templates, as described below.

An Application Code Definition specifies the applications code (component or application) to be used, but does not actually provide the component. An Application Code Definition is a fragment of an Application Code Definition Template, as described below.

A Policy defines information that specifies how a NMAS or NMC should operate. A Policy is also used to specify the expected or required configuration of devices, services, and applications managed by an NMAS or NMC. The format and content of Policy elements are implementation-specific, but typically will use XML to specify the required information.

Access Credentials specify credentials, such as ACL Identifiers, associated with a template in a verifiable form, such as being encrypted by the private key of an issuing authority.

The Data Routing Specification provides a mechanism for representing how data collected by a CU is to be sent to one or more DMs. Data Routing Specifications are fragments of Data Routing Specification Templates, as described below.

The Data Storage Definition provides a mechanism for defining how a DM is to manage data acceptance, storage, sharing and protection of the data sent to it by CUs. A Data Storage Definition is a fragment of a Data Storage Definition Template, as described below.

A Trust Domain Specification provides a mechanism for defining trust relationships between NMCs to allow them to operate with each other in a secure manner. A Trust Domain Specifications is a fragment of a Trust Domain Specification Template, as described below.

An NMC Association describes an association between specific instantiations of NMCs. An NMC Association is a fragment of an NMC Association Template, as described below.

5.2.10.5 Data Element Definition Template

A Data Element Definition Template defines information used to name the data elements that should be collected from devices, applications, and services under management. In exemplary embodiments this template is configured with more robust data element definitions such as the ability to specify that data should not be collected from a particular device, a type of device, a type of service, or a particular server. This is useful for limiting workload on collectors, reducing network traffic involved with transferring collected data and the dynamic applications that collect it, and supporting the distribution of required data collection activities across a plurality of data collectors. In one exemplary, illustrative, non-limiting embodiment, a Data Element Definition Template is structured as an XML document that conforms to the XML schema provided by a "Point of Management Template." An XML attribute, such as "NOT", is used to negate the sense of a specification field that describes a data element. For example, the Data Element Definition Template can define that Telnet session data should be collected as follows:

Address=*, port=23 Telnet server port on any device

And that data should not be collected as follows:

Address=1.2.3.4, port=23, NOT Ignore telnet server on device with address 1.2.3.4

When processing Data Element Definition Templates for purposes of determining whether a particular collected data element matches the template, negated elements are processed first. If a negated data element matches, the template is considered to not match the collected data. For example, using the data elements described above, if a collected data element was associated with port 23 at address 1.2.3.4, the collected data element would match the negated Data Element Specification template item, and so the Data Element Specification template would not match the collected data element.

If the collected data element was destined for port 23 at any other device address, such as 2.2.2.2, the negated data element would not match, and remaining items in the Data Element Definition Template would be compared, such as the non-negated item that specifies any address, shown above. Because the non-negated element specifies port 23 on any machine, it would match, and the Data Element Definition Template would match the collected data in this case.

Negated elements also can make use of "wildcard" descriptions, such as:

Address=*, port=23, NOT Ignore telnet server on all devices

An example Data Element Definition Template comprises the elements listed below:

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authenticity Specification | Information for verifying authenticity of the template |
| Assigned To | CU currently assigned to collect the specified data elements |
| Priority | Priority Assigned to this template |
| Data Element Specification | A tag-only XML document that names the data elements to be collected and/or not collected. |

The Assigned To element specifies a reference or unique identifier, or both, for the CU that is to collect the specified data elements. In some alternate embodiments the Assigned To element can specify a plurality of CUs each of which is to collect the specified data elements.

The Data Element Specification content is implementation dependent, and installation dependent. The open-ended nature of XML documents permit specification of any required data items that might be of interest to an NMAS. For example, device status, network traffic load or content, the load being placed on the host device by the NMC, the current date and time determined from the host device's clock, or information about the NMC itself, such as software version, locally stored dynamic application list, available data cache space and current utilization, or any other data that can be collected by the NMC or by dynamic or embedded applications available to it. This capability is used in some exemplary embodiments to enable TMs to monitor the status of the NMCs they manage.

5.2.10.6 Data Definition Template

In some embodiments, a Data Definition Template provides a mechanism for representing data collected by a CU. In one exemplary embodiment, the form selected is XML that conforms to a schema provided by a "Point of Management Template." An example Data Definition Template comprises the elements depicted below.

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authenticity Specification | Information for verifying authenticity of the template |
| Priority | Priority assigned to the collected data |
| Data | Data |

The Data element defines the stored information. In one exemplary, illustrative, non-limiting embodiment, it is an XML structure, with collected data expressed as the values associated with specific element tags. In some exemplary embodiments values are encoded so as to be transportable and usable between devices with different architectures (e.g. varying in byte or word size, character encoding, bit order, etc.) using means well understood by those having skill in the art.

In some cases, a Data Definition Template is called a Forensics Template. A Forensics Template is the name for the data collected by a Collector, that can not be processed, when packaged into a portable data structure for sharing between NMC instances. Such data may be shared in support of automated collection, forwarding, and classification of previously unrecognized information, and the subsequent reduction of this information to a classification signature template, and optionally for production of dynamic applications that can process the data, to permit recognition and processing of such data if it is encountered again. In this way the capabilities of NMASs to deal with protocols, devices and applications are extended as technology changes over time and new devices, protocols and applications are discovered on monitored networks.

5.2.10.7 Application Code Definition Template

In some embodiments, an Application Code Definition Template specifies particular application code (component or application). The template contains a component reference or the actual application or component.

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authenticity Specification | Information for verifying authenticity of the template |
| Component Reference | Component reference |
| Component | Actual component |

The Component Reference element specifies the component to be used, but does not actually provide the component. A Component Reference may include execution subsystem specification (e.g. Java 1.4RE).

The Component element contains the component to be used. One particular component that can be specified when necessary is the "Null" component. The Null component is used when the Application Code being defined should perform no processing. Exemplary embodiments implement Application Code that performs no useful processing and specify such code as the Component element. Alternative exemplary embodiments define a unique Component Reference value that is known to the Applications Manager, Template Manager, and other aspects as indicating that no component or application should be invoked.

5.2.10.8 Data Routing Specification Template

In some embodiments, a Data Routing Specification Template describes where data is to be sent, allows data to be routed differently based on data priority or characteristics, provides information useful for "fallback" processing when preferred destinations are not reachable and includes authentication materials that may be necessary to access storage locations, such as database systems or file servers.

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authenticity Specification | Information for verifying authenticity of the template |
| Route To Reference | reference to the DM to store data to, or CU to route data through |
| Authorization Credential | Optional authorization credential for access to DM or CU |
| Data Priority Required | Priority level required in Data Definition Template for this Routing Template to be used |
| Priority Increase | Amount of temporary priority increase to assign |
| Data Characteristics | Specification of data characteristics, such as type, source, protocol, collection time, or other, required to match template |

The Route To Reference element specifies a reference to the NMC to send data to for storage or forwarding. In some exemplary embodiments this can comprise a URI useful for establishing a connection to the destination NMC. In other exemplary embodiments this can comprise a TCP/IP address and port number, a routing table entry specification, a relational database row ID, and NMC identifier usable by a mobile agent for identification of one or more NMCs, an LDAP access specification, or other method for specifying an NMC and the information required to communicate with it as will be well understood by those having skill in the art.

An optional Authorization Credential element provides authentication materials required to access the referenced destination NMC. These can comprise Trust Domain keys, passwords, encrypted access keys, ACL identifiers, or any other materials required that effect authorization of an NMC, such as a SAML assertion, digital certificate, Kerberos ticket, or Public Key Infrastructure (PKI) method involving a trusted Certificate Authority (CA).

An optional Data Priority Required element specifies the minimum priority level required of a Data Definition Template Priority element for this Data Routing Specification Template to be a match for use in routing the given Data Definition Template. This permits implementation of "failover" configurations, where data is preferentially routed in a first configuration, but where data can be routed in one or more second configurations when the data has sufficient priority. Additional description of this mechanism is provided below.

An optional Priority Increase element included in the Route To Reference specifies a temporary priority increase that can be given to a Data Definition Template when all matching Data Routing Specification Templates for the Data Definition Template specify destinations that are not reachable. This permits implementation of "failover" configurations, where data is preferentially routed in a first configuration, but where data can be routed in one or more second configurations when the first configuration becomes unusable for any reason. Additional description of this mechanism is provided below.

An optional Data Characteristics element specifies characteristics, such as type, source, protocol, collection time, or other characteristics that a Data Definition Template may need to match to be routed using a given Data Routing Specification Template.

5.2.10.9 Data Storage Definition Template

In some embodiments, the Data Storage Definition Template describes the configuration of Data Manager instances, such as data structures, optional conversion specifications to convert from a previous version of the data store, and authentication information. Data Storage Definition Templates are used by Data Managers to define, at least in part, their data store management activities.

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authenticity Specification | Information for verifying authenticity of the template |
| Data Storage Definition | URI that describes the data store |
| Authorization Credential | Optional authorization credential for access to data store |
| Creation Application | Link to the NMC application that creates the data store. Generally, a link to the appropriate data store manager. |
| Update Application | Link to the NMC application that updates the data store to the newest version. Generally, a link to the appropriate data store manager. |
| Update Specification | Specification to use in order to update the data store to a new version. |
| Delete Application | Link to the NMC application that deletes the data store and the data contained therein. Generally, a link to the appropriate data store manager. |

In one exemplary embodiment, a Data Storage Definition element is encoded as a URI. Note that a URI provides mechanisms for defining protocol, network machine path, directory path, and optional parameters. The Data Storage Definition may thus describe specifications to any arbitrary storage system, which includes storage mechanisms such as:

Shared Directory structures (e.g. LDAP);
MIBs;
Databases;
Logging systems;
Storage services (SOAP-based);
Network Virtual Storage Systems;
SCADA network machine paths The Authorization Credential describes the credential to be used to access the data store. These can comprise Trust Domain keys, passwords, encrypted access keys, or any other materials required that effect authorization of an NMC, such as a SAML assertion, digital certificate, or Kerberos ticket.

The Creation, Update, and Delete Application definitions are references to applications that perform at least one management function of a specific data store. Typically, these are defined as references to a data store manager application that manipulates the specific type of data store desired. The Update Specification element is a translation specification that is used by the application referenced in the Update Application element to migrate the data from a first data store to a second data store. The Update Application and Update Specification are used when a data store must be updated and previously stored data retained.

5.2.10.10 Trust Domain Specification Template

According to one aspect, a Trust Domain Specification Template provides a mechanism for defining trust relationships between NMCs to allow them to operate with each other in a secure manner. Trust Domain Specification Templates are implemented in a form that can be transferred from an NMC acting as a Trust Domain Manager, to disparate NMCs in its Trust Domain. Information from Trust Domain Specification Templates is used by NMCs to validate Trust Domain membership and associated privilege levels, without requiring reference to the issuing TM. This enables NMCs to interact, such as in CUGs, when access to a TM is not possible, such as after an unplanned network segmentation event.

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authenticity Specification | Information for verifying authenticity of the template |
| Trust Domain ID | Unique machine readable TD ID |
| Issuing TM | Reference to the TM that issued the Trust Domain Specification Template |
| TM Public Key | The public encryption key of the issuing TM |
| TD Authorization Credential | Authorization credential for access to the TD |
| Privilege Specification | Description of what TD Authorization Credential permits |

The Trust Domain ID is a unique machine-readable identifier used to identify the particular Trust Domain that the template applies to. When NMCs belong to a plurality of Trust Domains, this provides a simple way to label information and activities related to particular Trust Domains.

The Issuing TM is a reference to the Task Manager that is acting as Trust Domain Manager for the Trust Domain the template relates to. The reference permits communication with the TM as required to update, cancel, or perform other activities related to Trust Domain management, such as requesting membership in the TD.

In some exemplary embodiments, Trust Domains use a form of public key cryptography, such as that used by the SSH protocol, for signing certain information to allow the source and validity of the information to be determined without requiring access to the TM that controls the TD. The TM Public Key is the encryption key required to decrypt data that has been encrypted with the TM's private key. If a block of encrypted data can be correctly decrypted using the TM Public Key, it is taken as proof that the TM produced the data block and all members of the TD can trust the decrypted contents, because only the TM has access to the TM's private key value. The TM Public Key is provided to each member of the TD as part of the Trust Domain Specification Template that grants them membership in the TD, so each member of the TD has the ability to validate that data originated with the TM of the TD.

TMs in some exemplary embodiments can generate new public/private key pairs and issue new Trust Domain Specification Templates to current members of the TD. This can be done periodically, whenever an NMC leaves a TD, at the request of an operator, or for any other reason as determined to be proper by those having skill in the art. In some exemplary embodiments, the new Trust Domain Specification Templates can be completely or partially encrypted using the previous TM private key to allow NMCs to verify that the new template originated with their TD's TM. In other exemplary embodiments the TM sends a request for each NMC to contact the issuing TM for their TD to request a new Trust Domain Specification Template. Such requests can, in some alternative embodiments, comprise a public key associated with the NMC. Encryption of the returned Trust Domain Specification Template with the NMCs public key assures that only the NMC can decrypt and use the Trust Domain Specification Template, since only the NMC will possess the private key needed to perform the decryption. These two methods of ensuring that the Trust Domain Specification Template is from a valid source can be combined, or other methods can be used, as determined by those having skill in the art. Similar capabilities can be implemented using shared key encryption systems.

A TD Authorization Credential is a TM private-key encrypted representation of a reference to the NMC combined with the Privilege Specification. The NMC reference and Privilege Specification are combined using a method known to all NMCs, such as concatenation, or in exemplary embodiments where both values are structured as XML; both values can be included as child elements of a common root element. Those with skill in the art will be aware of other appropriate methods. The combined NMC reference and Privilege Specification are encrypted using the TM's private key, and the result is stored in the template as the TD Authorization Credential. If the TM Public Key can be used to correctly decrypt the TD Authorization Credential, and the result matches a combination of the NMC reference and the Privilege Specification, then the Privilege Specification is valid for the referenced NMC, and provides specification of what privileges the NMC has within the TD.

When an NMC is making requests of other TD members, inclusion of the TD Authorization Credential template fragment in the request, provides proof of membership in the TD as well as specification of the privileges the requesting NMC possesses within the TD. A TD Authorization Credential template fragment can, in some exemplary embodiments, be encoded as a digital certificate.

In some exemplary embodiments, the Privilege Specification is a list of ACL Identifiers. In alternative embodiments, the Privilege Specification specifies one or more privilege categories, such as "high", "medium" or "low" that are understood to be associated with permission to perform or request certain operations. In yet other alternative embodiments, a Privilege Specification is a software object, function, or other programmatic device that is useful to determine authorization to perform or request specific operations.

5.2.10.11 NMC Association Template

In some embodiments, NMC Association Templates describe an association between two or more NMCs, with information necessary for the NMCs to communicate, share information, assist each other in performing their tasks in a semi-autonomous fashion, and permit other NMCs to manage or work with the association in various ways. NMC Association templates are used to define CUG membership for CUs in a CUG, and to provide necessary information about the CUs in the CUG to all CUG members and to all managing TMs.

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authenticity Specification | Information for verifying authenticity of the template |
| Authorization Credential | Optional authorization credential for access to data store |
| Association ID | Unique machine readable ID for an association of NMCs |
| Association Membership | References to all association member NMCs |
| Association Authentication | Authentication information to enable association members to recognize each other |

The Association ID element comprises a unique, machine-readable identification value for a particular association of NMCs. It is used to refer to a particular association when specifying behavior of all association members, claiming membership in an association, using a mobile agent to communicate with one or more members of an association, or otherwise needing a reference to the association.

The Association Membership element comprises a list of NMC references. Each member of the association is referenced by one or more elements of the list. The list is useful for establishing contact between members of the association.

The Association Authentication element comprises authentication credentials useful for permitting a first association member to prove to a second or disparate association member that it is a current member of the association. When an association member is removed from an association for any reason, the Association Authentication element of the NMC Association Template for each association member is updated to prevent prior members of the association from acting as association members. In some alternative embodiments, an Association Authentication element may comprise an expiration time, after which the Association Authentication element is not considered valid by members of the association. This enables temporary associations to be formed and to have them dissolved even if there is no access to a TM at the time the association is to end.

5.2.10.12 Request-Response Template

In some embodiments, Request-Response Templates describe a request made by a first NMC of a second NMC, and are used by the second NMC to return the results of the request to the first NMC. There is no limitation on the nature of such requests, other than that the description of the request must be understood by both the first and the second NMC, and the second NMC must be equipped to respond appropriately, or have the ability to acquire an ability to respond appropriately, such as by use of a dynamic application. The Request-Response Template is used to communicate status, request behavior changes, share information or applications, coordinate transfer of tasks between CUs in a CUG, request dynamic applications, and permit interaction between NMASs and NMCs as required.

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authenticity Specification | Information for verifying authenticity of the template |
| Priority | Priority of the request |
| Request ID | Requestor-assigned unique ID for the request |
| Request/Response | Request Description or Response Description |

The Request ID element is used by the requestor to associate a given request with the response template when it arrives back from the entity that performed the request. The entity servicing the request transfers the Request ID from the request template into the response template before sending the response.

The Request/Response element defines the request in a request template, and the response in a response template. In one exemplary, illustrative, non-limiting embodiment, it is an XML structure, with the request or response expressed as the values associated with specific element tags. In some exemplary embodiments values are encoded so as to be transportable and usable between devices with different architectures (e.g. varying in byte or word size, character encoding, bit order, etc.) using means well understood by those having skill in the art.

5.2.11 Collection Unit Groups (CUGs)

In some exemplary embodiments, CUs can be organized by TMs into semi-autonomous association groups referred to as "Collection Unit Groups" (CUGs). Members of a CUG can be co-located on a single device, or located on disparate devices anywhere on a network, or both, provided there is means for the CUG members to communicate with each other. In some exemplary embodiments, a single TM can create, monitor, or manage a plurality of CUGs. In some exemplary embodiments, a single CUG can be monitored or managed by a plurality of TMs. A CU can be a member of one or more CUGs at any particular time, and can be removed from a CUG or added to another CUG at any time, be a member of any number of CUGs over time, or of a given CUG a plurality of times.

In some exemplary embodiments, CUs in a CUG share tasks between CUG members so as to balance resource usage (e.g. memory, CPU time, or communication bandwidth) between them and make more efficient and less disruptive use of available device and network resources. This is termed "load balancing" herein. The tasks that are assigned to the CUG as a whole are monitored and managed by one or more TMs, and in many ways a CUG can be viewed as a single distributed CU. In some exemplary embodiments initial task assignment is made to a particular CU within a CUG, not to the CUG as an entity. The assigned CU can then perform the task, or transfer it to another CUG member. In alternative embodiments, tasks are assigned to the CUG with the template specifying the task being sent to one or more CUG members. CUG members then decide between themselves which CU is to perform the task.

In some exemplary embodiments, member CUs within a CUG monitor each other for connectivity and continued existence using one or more methods (e.g. detecting message traffic to a DM, TM or CU, process status checking when instantiated on the same device, "heartbeat" message exchange between CUs in a CUG, requesting status updates from each other, etc.). In some exemplary embodiments, CUs in a CUG can re-assign ("failover") the tasks of a CU that becomes unavailable, such as happens when the CU loses network connectivity or the device it is instantiated upon shuts down. In some exemplary embodiments, this failover is accomplished using the CUG load balancing capability by treating all tasks assigned to a lost CU as having been requested for load balance transfer. The remaining CUs in the CUG then use the load balancing mechanism to determine which CU will take over each task.

In some scenarios, the failover capability of CUGs can be invoked even though the "failed" CUs in question are still operating normally, such as when a network becomes segmented with one or more CUs that are members of a CUG being located in diverse network segments. In such a scenario the CUs in each isolated segment continue to function, but are not able to communicate with the CUs located on segments isolated from their segment. This lack of communication can, in some exemplary embodiments, result in a failover event where the CUs on a first segment re-allocate the tasks assigned to the CUs on a second segment, and the CUs on a second segment re-allocate the tasks assigned to the CUs on a first segment. Similar patterns of behavior result when a plurality of segments are created, such as when a network hub fails and isolates all of the network segments connected through it. The failover methods described herein result in all tasks being performed by one CU or another, despite the segmentation event. In some cases where failover occurs even though the isolated CU(s) continue to operate (such as in a network segmentation situation) there may be tasks that will be performed by a plurality of CUs, and duplicate data will then be collected. The duplicate data can be handled by normal DM processing, as described elsewhere herein, and does not pose a problem. At worst there will be a plurality of copies of the data, which is preferable in most cases to failing to collect the data.

When CUG members have had their tasks failed-over to other CUG members, and then re-establish communication with the other members of the CUG, such as when their host reboots, the network segmentation issue is corrected, the CU is reinstantiated, etc., re-allocation of tasks can be performed. In some exemplary embodiments, this is done automatically by each CU in the CUG that took over a task as part of failover simply ceasing to perform that task and recording it as being performed once again by the originally tasked CU. In alternative exemplary embodiments, the CU that took over the task as part of failover processing contacts the originally tasked CU and a load-balancing process is followed to decide which CU is to continue performing the task. This can be necessary in scenarios where the loss of connectivity was brief enough that the originally tasked CU did not recognize the loss of connectivity (such as when using periodic "heartbeat" messages to monitor CU status, and the loss of connectivity happens between the heartbeat checks of one CU, but during the heartbeat check of another). Such load balancing communication can, in some exemplary embodiments be done on a task-by-task basis, while other alternate exemplary embodiments deal with coordination of all involved tasks in a single load balancing operation. In still other alternate embodiments, re-allocation is dealt with by performing a load-balancing operation within the CUG as a whole on each task that was failed-over.

In some exemplary embodiments, re-integration of a CUG after one or more events have resulted in the tasks of one or more CUs being failed-over is not performed immediately upon contact being re-established. In some exemplary embodiments the re-allocation of tasks in a CUG can involve significant resource consumption, and it is desirable to minimize this, especially when the problem that resulted in the failover event is intermittent and continues for some time before being corrected. If one or more CUG members were isolated once by a network segmentation, or lost due to a host failing, etc. it is possible that the event could repeat, and in such scenarios it is better from the standpoint of resource consumption (e.g. CPU, network bandwidth consumption, etc.) not to re-allocate tasks within the CUG immediately, but to wait to see if connectivity will remain intact first. The more time that passes without a repeat of the failover event, the more likely it becomes that the problem has been corrected, and the lower the average resource cost for re-allocating tasks within the CUG. For this reason, some exemplary CUG embodiments calculate a reliability score for each CUG member, and do not re-allocate failed-over tasks to a CUG member until the reliability score for that member reaches a threshold value. Reliability scores are implementation-specific, but could be, for example, a function of the time since the last event that caused a CU's tasks to be failed-over, the number of failover events within a specified period of time, the average length of time that a CU has remained in contact with other CUG members in a specified period of time, or a combination of these or other factors.

In some exemplary embodiments, CUs in a CUG share tasks and configuration data with each other. This enables TMs to send such information to any member of a CUG (or, in some exemplary embodiments, to a designated "master" CUG member that acts as a communication gateway and/or coordinator for the CUG) and have it replicated to each member, without TM sending it to each of them separately, or using a broadcast method to send to all CUG members at once. In some exemplary embodiments, when an assigned collection task, as represented by a Data Element Definition Template, is passed between CUG members, the TM that issued the task is informed of the change to permit it to keep track of which CUs are performing specific tasks. This information is useful when deciding which CU to assign future tasks to. In alternative embodiments the assigning TM is not informed of the task transfer in order to minimize network bandwidth use and load on the TM. Creation of CUGs and the resulting load balancing and task failover between them minimizes load imbalance between members without any requirement for external or manual task reassignment. Such automatic load balancing can reduce the workload of TMs and in some instances reduce associated network traffic otherwise required to convey redeployment or reconfiguration commands from TMs to CUs.

In other exemplary embodiments, CUs within a CUG share dynamic applications. When a first CU in a CUG receives, whether by request to a TM or by other means, a dynamic application, it can forward a copy of that dynamic application to one or more second CUs within the CUG. Alternatively, in still other exemplary embodiments, a first CU receiving a dynamic application can send a notification of this event to one or more second CUG members. The CUG member(s) receiving such notification can, if their available resources permit and the usefulness of the dynamic application warrants it, request that the dynamic application be forwarded to them by the first CU. Such forwarded dynamic applications can be put to use immediately, stored for possible later use (such as when a task assigned to the first CU that involves use of the dynamic application is transferred to a second CU), and/or transferred, or offered, to one or more third CUs in the CUG. Such sharing of dynamic applications within a CUG reduces work load for TMs, reduces bandwidth for network segments between the CUG members and TMs, and reduces task startup delay when a task is transferred between CUG members, since the CU taking over the task will not have to request the dynamic application from a TM, but may already have the dynamic application stored or running.

In some exemplary embodiments, task management within a CUG is done cooperatively in a peer-to-peer manner. CUG members communicate with each other to decide which CU is to perform a given task, and no individual CU acts as coordinator. One method of implementing such a system involves each CU "bidding" for a given task, and if it has the highest bid, it assumes the task and the other CUs in the CUG do not. A "bid" can be calculated in various ways. For example, a bid can be a function of the current task loading of the CU making the bid (e.g. the lower the task loading, the higher the bid), a function of the resources available to the CU (e.g. the greater the resource level, such as CPU, bandwidth, etc. the higher the bid), or any other appropriate factors as determined by those having skill in the art, or a combination of any of these. A CU that is incapable of performing a given task, for example one that has no connectivity to a network segment or device that is to be monitored, does not bid for that task. If no CU bids for a task, the TM issuing the task is informed by use of a Request-Response Template, or in alternative embodiments, by other means, and notify a human operator, make a log entry, put off performance of the task, create additional CUs, or by other means as determined to be appropriate by those having skill in the art. A CUG comprising a single CU will automatically assign all tasks to that CU. A CUG comprising a plurality of CUs uses the bidding method to determine which CU performs each task assigned to any of them.

In alternative exemplary embodiments, one or more CUs in a CUG are chosen to be "masters", and are responsible for assignment of tasks to the CUs in the CUG, whether initial assignment, load balancing re-assignment, or fail-over re-assignment. In some exemplary embodiments such master CUs can be of a different type than other CUs, while in still other exemplary embodiments the CUs are of similar types, and merely perform different roles. In exemplary embodiments where master CUs are of specialized types, assignment of the master CU role is performed implicitly by the TM when it instantiates such CUs. In exemplary embodiments where the CUs are of similar types, but perform different roles, the master CUs can be assigned to that role by a TM in some exemplary embodiments, or in alternative embodiments, can be determined by the CUs in the CUG in a manner similar to that described above for bidding on task assignments. In such embodiments, a CU winning a bid for master takes on that role and those not winning do not. It is possible in some exemplary embodiments to have a plurality of master CUs in a CUG and in such embodiments the master CUs are responsible for coordinating task assignment between themselves. In exemplary embodiments having CUs of similar types and using a master CU arrangement, a TM can assign one or more CUs to be masters instead of using a bidding system, or to override a bidding system where this is appropriate.

In some exemplary embodiments, a subset of CUs within a CUG can be tasked with discovery of devices, protocols or applications, with the remaining CUs in the CUG refraining from performing discovery activities. This can be done to reduce redundant discovery activities, permit discovery to be performed on host systems best suited for the task, or for other reasons. A CU performing discovery activities in such exemplary embodiments can be the "master" CU in a CUG, or a CU or CUs different from the "master" CU or CUs.

One embodiment illustrating such communication is shown in FIG. 10, which depicts the network of FIG. 3A superimposed with lines of communication and control (10110, 10120 & 10130) between a TM (10092) and two individual CUs (10032 & 10098) and three other CUs (10026, 10024, & 10022) that have been grouped together to form a CUG (10180), the CUs within the CUG communicate with each other using their own lines of communication (10150, 10160 & 10170). The TM (10092) can send templates representing tasks, data routing or other configuration or work to any CU in the CUG (10026, 10024 or 10022) over a network communication pathway (10110) and the receiving CU'(s) may relay the templates to the other CUG members (10150, 10160 & 10170). Templates that apply only to a subset of the CUG members, such as NMC Association Templates defining CUG membership configuration, can be sent directly to the CU(s) they apply to, or through another CU in the CUG, which forwards them but otherwise ignores them. This permits the TM (10092) to configure a plurality of CUs with a single transmission, which can reduce network bandwidth required by the network management system.

5.2.11.1 CUG Formation

In some embodiments, CUGs are formed when a TM sends an NMC Association Template to one or to a plurality of CUs. The NMC Association Template specifies the CUG group ID, identifies the CUs in the group, and provides required connection and authentication information to enable CUG members to interact with each other. FIG. 11 is a flowchart depicting one example of a process that occurs when a first CU receives an NMC Association Template that makes it a member of a CUG (11010). Information from the NMC Association Template is added to the first CU's Registry for future reference (11020). The next step is for the first CU to establish communication with the disparate CUs having membership in the CUG (11030) using information in the NMC Association Template to locate, connect to and authenticate with each disparate CU.

When a new CUG is being formed, the disparate CUs perform the same processing steps as the first CU. In some exemplary embodiments, each CU in the CUG establishes a connection, which can result in a plurality of connections between each pair of CUs in the CUG. In other exemplary embodiments, the first connection established between a pair of CUs, whether established by a first CU or a second CU, satisfies the connection requirement between those CUs, and the other CU of the pair attempts no additional connections.

When a first CU is being added to an existing CUG, the first CU establishes connections with each of the disparate CUs in the CUG. The first CU next provides its existing Data Element Definitions to the disparate CUs of the CUG (11040). These Data Element Definitions are marked as non-executable and do not cause the disparate CUs to begin collection of the data elements described. Each of the disparate CUs provides its own Data Element Definitions to the first CU as well (11050), also marked as non-executable. The sharing of these Data Element Definitions is to enable the task of collecting the specified data elements to be transferred from a first CU to one or more disparate CUs as part of load-balancing or fail-over within the CUG, should that become necessary, without a requirement for a TM to provide the Data Element Definition Templates to the CU(s) accepting the tasking. The provided data element definitions become executable by one or more CUs at such time as there is transfer of the tasking due to load balancing or fail-over. The first CU then establishes monitoring of the disparate CUs in the CUG (11060). The disparate CUs in the CUG will also establish monitoring of the first CU (not shown). Monitoring is for detection of loss of CUs, such as occurs when the device the CU is instantiated upon shuts down or loses connectivity to the network for any reason. Monitoring can be periodic, as through a monitoring dynamic application being scheduled to be run when desired by the Maintenance Scheduler, or continuous, as through active probing or sensing of the disparate CU using a "heartbeat" method as understood by those having skill in the art. The first CU then notifies all controlling TMs, the one that sent the NMC Association Template and any others exercising control over the CU, of the new CUG membership (11070), after which the process of joining the CUG is complete.

5.2.11.2 CUG Load-Balancing

CUs, like other NMCs, use the resources of the hosting device they are instantiated upon. These resources are limited, and in most cases the NMCs should not use host resources to the extent that other processing being done by the host is adversely affected. When an NMC is tasked such that its use of host resources exceeds a configured or calculated limit intended to prevent adverse impact on other host processing, the NMC is said to be "overloaded". Most NMCs deal with overloading by informing a controlling TM, and waiting for the TM to reassign tasking to reduce the NMC's load. In some exemplary embodiments, CUs that are part of a CUG have an alternative, and preferred, method they can employ to reduce their use of host resources: CUG Load Balancing.

In some exemplary embodiments, when a CU in a CUG becomes overloaded by the collection, pre-processing or other tasks it is performing, it attempts to transfer some tasks to other CUs in the CUG to reduce its workload. This is referred to herein as "load-balancing," because the effect of each CU shifting tasks to another CUG member that is more lightly loaded results in the total workload of the CUG being balanced between the member CUs in a manner proportional to their abilities to perform it. This balancing of workload between members of a CUG does not require management by a TM, or even a current communication link between the CUG members and a TM. The CUG handles the shifting of tasking in an autonomous fashion. In some exemplary embodiments TMs are notified as soon as possible after the CU task transfer has been completed. In alternate embodiments, TMs are not notified of the change in task location.

FIG. 12 depicts a pair of flowcharts that describe the steps performed by a first CUG member requesting to reduce its workload by a load-balancing request (12000) to a second CUG member and the steps performed by a second CUG member upon receiving the load-balancing request (12005), according to one embodiment. The requesting first CU determines that it is overloaded, and that load balancing is the preferred method of reducing workload in the step (12010). It next identifies some portion of its tasking, represented by Data Element Definition Templates (or equivalent internal representations of these), that is resulting in the overload condition in the step (12020). The specific task items chosen depend upon a plurality of factors, such as the resource(s) that the CU is overusing (e.g. CPU time, memory, I/O bandwidth, cache space, etc.) and which Data Element Definition Template(s) assigned to the requesting CU are having the greatest impact on the resource(s). The requesting CU then sends a load-balance request in the step (12030) to all members of the CUG, specifying the Data Element Specification Templates it wants to transfer responsibility for. It then waits for other CUG members to accept or reject the request. If the request is rejected in the step (12040) by all CUG members, the process terminates. The first CU can attempt to reduce workload by other means, such as informing a controlling TM that it is overloaded (the TM can remove some tasking and assign it to a non-CUG member CU, create additional CUs, add additional CUs to the CUG, etc.), or temporarily deferring low priority collection tasks. If the request is accepted in the step (12040) by one or more CUG member CUs, the requesting CU selects one of the accepting responders to send an affirmative acknowledgement to and sends negative acknowledgements to all others in the step (12050). The method of selecting a CUG member to accept from those responding with willingness to accept the tasking is implementation dependent and can be as simple as choosing the first acceptance response that arrives, or can involve more complex processes, such as round-robin selections over time, use of load factor figures supplied by each responder, a "bidding" system as described previously herein, or other methods as considered appropriate by those having skill in the art. Once the accepting second CU has been notified in the step (12050), the requesting first CU marks the Data Element Specifications as non-executable and assigned to the accepting second CU in the step (12060). In some exemplary embodiments, the requesting first CU may have to perform an "Update In Place" operation to cause its Collector plug-ins to recognize the change in tasking, as described herein. In some exemplary embodiments, the requesting first CU then notifies its controlling TM(s) of the re-assignment of the tasking in the step (12070).

Continuing with FIG. 12, the processing that takes place on members of the CUG that receive the request sent by the requesting first CU in the step (12030) comprises the following steps. The load-balance request is first received by one or more second CUs in the step (12015). The current workload, and available resource levels, of each receiving second CU is evaluated by those receiving second CUs in the step (12025). If the second CUs are found to be insufficient to support additional workload (12035), or if a receiving second CU does not have capability, in terms of network connections or otherwise, to perform the required data element collections, the receiving second CU sends a negative acceptance to the requesting first CU in the step (12095) and the process is complete for that second CU. If the workload, available resources, and capability to perform the required data element collections appear sufficient to support the additional tasking in the step (12035), the receiving second CU sends an acceptance to the requesting first CU in the step (12045) and waits for an acknowledgement or a negative acknowledgement from the requesting first CU. If the requesting first CU sends back a negative acknowledgement in the step (12055), the process is complete for that second CU. If the requesting first CU sends back an affirmative acknowledgement in the step (12055), the receiving second CU marks the data element specifications as executable and assigned to itself in the step (12065). In some exemplary embodiments, the second CU may be required to perform an "Update In Place" operation to cause its Collector plug-ins to recognize the change in tasking. The receiving second CU then notifies all CUG members of the reassignment of the tasking in the step (12075) so they can update their own registries with this information. The information is useful in determining the tasking that must be re-assigned should the receiving second CU be lost for any reason. The final step in some alternative embodiments is the receiving second CU notifying its controlling TMs of the reassignment of the tasking in the step (12085), after which the process is complete for that CU.

5.2.12 Trust Domains (TDs)

The exemplary, illustrative technologies described herein further provides systems, software, and methods for the management of trust relationships between its various component parts so as to permit a flexible arrangement of these components for the collection and safe sharing of data in a controlled manner, as well as the secure and flexible management of the systems and software. In one embodiment, components with established trust relationships are referred to as sharing a "Trust Domain" (TD). In a more specific embodiment, TD membership is independent of the origin, location or use of a component. In other embodiments, components can be added to a TD, removed from a TD, belong to a single TD, to a plurality of TDs at once, or to a single TD at a time but a plurality of TDs during its existence. Those having ordinary skill in the art will appreciate that the physical location or network address of a component has no bearing on the TD(s) it can belong to, provided that there is, or was at the time the component was made a part of a TD, a network connection, whether continuous or intermittent, between the component and the TM(s) that manage the TD(s) it belongs to. In some exemplary embodiments, the physical location or network address of a component can be used as a factor in determining which TDs it is permitted to be a member of. This is useful in cases where the component can collect sensitive data and permitting such data to be stored outside of a limited set of hosts is not permitted by policy. Configuring NMASs and NMCs instantiated on those hosts as a separate TD aids in controlling handling and access to such data.

In some exemplary embodiments, membership in a given TD is proven by use of a TD Authorization Credential, as described above. These are provided to TD members as part of a Trust Domain Specification Template. When an NMC is a member of a plurality of TDs, it will possess TD Authorization Credentials for each TD of which it is a member.

In some exemplary embodiments, trust domains comprise sets of permissions associated with various entities that allow or prohibit requests made by a first entity to a second entity from being fulfilled. Within a given TD, entities can possess or not possess permissions to make requests of other entities. Entities that are not within a given TD possess no permissions to make requests of entities that are within that TD and any requests that are made are ignored or rejected and may also be logged in some exemplary embodiments. TMs configure initial TD memberships and permissions for the dynamic NMCs that they instantiate, or which they share a TD with and have permission to configure TD membership for. Initial TD memberships and permissions for TMs are specified by Configuration Policies. Each TM is automatically a member of a TD that includes at least itself. NMCs on a network can share a TD or be members of separate TDs. An NMC can be a member of a single TD or a plurality of TDs. NMCs on disparate networks can be members of the same TD.

In some exemplary embodiments, trust relationships within a Trust Domain are absolute, with any component in the TD having full control over any other component in the TD. Alternatively, in other exemplary embodiments, trust relationships within a TD can be variable or relative, with different permissions being defined for various components and interactions. For example, an NMC in a TD can have the right to request that data be collected about a particular device, but not have the right to request that the resulting data be routed to a particular DM, or to alter the TD membership or rights of any component, or to request that data about a different device be collected.

FIG. 13 depicts one embodiment in which the network of FIG. 3A includes two TDs: Trust Domain A, which is comprised of a single TM (13082), a single DM (13083), and three CUs (13088, 13078 & 13024) and Trust Domain B, which is comprised of a single TM (13082'), a single DM (13087), and one CU (13086). The two TDs, A and B, are disjoint, which prevents either TM (13082 & 13082') from controlling, configuring, or removing the CUs or DM of the other. The NMCs that belong to the TD's A and B may be able to share network connectivity, see the same network traffic, and collect the same data, but they cannot access each other's DMs nor have any control over each other's configuration or activities. If either TM creates a CUG, the CUs of one TD cannot be members of a CUG in the other TD. All members of a CUG must share at least one TD.

FIG. 14 depicts an embodiment in which the network of FIG. 3A includes two TDs: Trust Domain A, which is comprised of a single TM (14092), a single DM (14034), and two CUs (14022 & 14032) and Trust Domain B, which is comprised of a single TM (14082'), a single DM (14087), and two CUs (14084 & 14073). The two TMs of the two TDs, A and B, each has membership in the other's TD as well as its own TD. In addition, one CU (14073) is a member of both TDs.

In some exemplary embodiments, membership in both TDs gives both TMs (14092 & 14082') equal control over the NMCs in both TD A (14034, 14022 & 14032) and TD B (14087, 14084 & 14073). In other exemplary embodiments, permissions derived from membership in a TD can be limited in various ways by the TM granting membership in the TD. For example, the TM of TD A (14092) may have granted permission to the TM of TD B (14082') for access to the DM of TD A (14034) for purposes of storing data, but not granted any other permissions, such as permission to change the TD membership of the DM of TD A (14034) or to interact in any way with the CUs of TD A (14022 & 14032), such as by assigning collection tasks, defining data routing, or forming CUGs. Because CU (14073) is a member of both TDs, in some exemplary embodiments it could be included in CUGs in either TD, store data in the DMs of either TD (14034 or 14087), route data indirectly through the CUs of either TD (14022, 14032, 14084 or 14073), and in all other ways perform as a member of either TD. In other exemplary embodiments, CU (14073)'s privileges to function in these ways can be limited as configured by either of the TMs that have permission to so configure CU (14073).

FIG. 15 depicts one embodiment in which the network of FIG. 3A includes three TDs: Trust Domain A, Trust Domain B, and Trust Domain C. TD A comprises a TM (15062), a DM (15087) and three CUs (15063, 15073 & 15084). TD B comprises three TMs (15082, 15092 & 15082'), three DMs (15083, 15087 & 15093), and six CUs (15088, 15078, 15084, 15032, 15024 & 15022). TD C comprises two TMs (15092 & 15082'), a DM (15093), and five CUs (15088, 15078, 15024, 15022 & 15032). Some CUs are members of more than one TD. CUs (15088, 15078, 15024, and 15022) are members of both TD B and TD C. CU (15084) is a member of both TD A and TD B. Two TMs are members of multiple TDs. TM (15092) is a member of both TD B and TD C, and TM (15082') is a member of both TD B and TD C. Some DMs are members of more than one TD. DM (15087) is a member of TD A and TD B. DM (15093) is a member of TDB and TD C. The dashed lines (15150, 15155, 15160, 15165, 15170, 15175, 15180, 15185, 15190, 15195 & 15197) indicate intra-CUG communication connections, used to coordinate activities between CUG members. Solid lines (15110, 15115, 15120, 15125, 15130, 15135, 15140, 15142 & 15145) indicate where control and reporting flows exist between TMs (15062, 15082, 15092 & 15082') and the various CUs and CUGs that each manages. For example, the TM of Trust Domain A/B (15062) has control over its own CUG (15063 & 15073), which no other TM can control, as well as its own CU (15084), which can also be controlled by the TM of TD B (15082), which it shares a TD with. Likewise, one of the CUs of TD B (15032) can be controlled by both the TM that instantiated it (15082) and the TMs of Trust Domain C (15082' & 15092), which it has been configured to share a TD with.

In embodiments where a plurality of TMs have control over a given NMC, it is possible that the NMC can receive conflicting commands. For example, a CU can be given a request to discover devices in a particular address range, and be given another request to ignore devices in the same or overlapping address range. In some exemplary embodiments, the NMC resolves such conflicts by granting priority to the TM that instantiated it, and ignoring or rejecting the conflicting commands from other TMs. In other exemplary embodiments, the NMC resolves the conflict by granting priority to the TM making the most recent request, and ignoring, rejecting, or overriding prior requests. In still other exemplary embodiments, a TM having the requisite permissions to configure the behavior of the NMC can specify the priority order to use in resolving such conflicts. Such priority order specification can name TMs individually, or specify them by ACL identifiers, or in any other way determined to be appropriate by those having skill in the art.

As can be seen with the trust relationships between TD B and TD C, the same type of TD membership plurality also can apply to CUGs (15024/15022 & 15088/15078). All members of a CUG must share at least one TD membership to permit tasks and data routing to be exchanged between them. If this rule were not followed, with only some members of a CUG in a first TD belong to a second TD, and the TM of the second TD assigned a data collection task to the CUs of the first TD having dual TD membership, that task could be exchanged with a CU in the first TD's CUG that does not hold dual TD membership, thus allowing the second TM to configure CUs in the first TD that are not members of the second TM's TD, which is not allowed. For example, if CU (15024) was not a member of TD B and was only a member of TD C, and TM (152082), which is in TD B, assigned a data collection task to CU (15022), which is in both TD B and TD C, and CU (15022) exchanged that task with CU (15024) (they are in a the same CUG), then CU (152024) would be performing a task assigned by a TM (15082) that is not in any TD that CU (15024) is a member of, which violates the rules of TDs.

In some embodiments, when an NMC belongs to a plurality of TDs, the TM(s) of a first TD that the NMC belongs to can configure the NMC to collect, store, or share data, giving the NMCs of the second TD access to that data. In some exemplary embodiments, membership in the TD must be accompanied by appropriate privilege settings (such as by ACL Identifiers) to permit such a configuration. In some network configurations such data sharing can allow the NMCs of the second TD to obtain data that would otherwise not be available. For example, in FIG. 16, the network of FIG. 3A includes two Trust Domains: TD A, comprised of one TM (16082'), one DM (16087), and three CUs (16084, 16086 & 16032) and TD B, comprised of two TMs (16082' & 16092), two DMs (16034 & 16093), and two CUs (16032 & 16098). Note that CU (16032) and TM (16082') are members of both TDs. There is also a device (16010) that is visible to CU (1603)2, but not visible to the other CU of TD B (16098).

Prior to CU (16032) being made a member of TD A, the NMCs of TD A have no way to access data collected (16034) from Device (16010), because that device is not visible to the Tokyo Office LAN (16060'). Once CU (16032) is made a member of TD A as well as TD B, it can be configured to route data (16110) collected from Device (16010) to the DM of TD A (16087) as well as routing data (16120) to a DM of TD B (16034), then NMCs of both TDs have access to the data from Device (16010). This form of sharing CUs across TD boundaries is referred to herein as "Model 1".

FIG. 17 is a flow chart that describes one embodiment of a procedure used to establish a Model 1 CU sharing arrangement. The process begins when the TM of TD B (TM-B) sends a Request-Response Template to the TM of TD A (TM-A) requesting access to a CU collecting data for the device of interest in step (17100). Based on the Configuration Policy of TM-A, the request can be denied, which ends the process, or it can be granted in step (17110). If it is granted, TM-A looks for a CU that is collecting data from the device in step (17120). If there is no such CU, TM-A either tasks an existing CU to do so, or instantiates a new CU to collect data from the device in step (17130). The CU is configured to be a member of TD B in step (17140), and TM-B is notified that the CU is available to it by returning an appropriate Request-Response Template in the step (17150). TM-B then configures the CU to collect and store the required data for TD B in step (17160) and the process is complete. In an alternative exemplary embodiment, TM-A can configure the CU to collect the required data and store it in a DM that TD B has access to, or has specified in its request, if such DM is also a member of the TD of TM-A and TM-A has any permissions required to do so.

FIG. 18 depicts an embodiment in which the network of FIG. 3A includes two TDs: TD A, comprising a TM (18082') two CUs (18084 & 18086) and two DMs (18087 & 18034), and TD B, comprising a TM (18092), two CUs (18098 & 18032) and two DMs (18093 & 18034). There also is a device (18010), which is visible to CU (18032), but not visible to the CUs of TD B (18084 & 18086). If DM (18034), where CU (18032) is storing the data it collects from device (18010), is made a member of TD A as well as TD B, it can be configured to replicate the data collected from the device (18010) in DM (18087), where it can be accessed by other NMCs of TD A. Alternatively, NMCs of TD A can access DM (18034) directly due to their shared TD membership. Likewise, if DM (18087) is made a member of TD B as well as TD A, it can request replication of the data collected from the device (18010) and other NMCs of TD A then can access the data from DM (18087). In this scenario the other NMCs of TD A would not be able to access DM (18034) because they would not share a TD membership; however, the NMCs of TD B could access DM (18087) due to their shared TD membership. In some exemplary embodiments, such sharing and access can be limited by a requirement for specific privileges in addition to shared TD membership. This form of sharing DMs across TD boundaries is referred to herein as "Model 2."

FIG. 19 describes one embodiment of a procedure used to establish a Model 2 sharing arrangement. The process begins when the TM of Trust Domain B (TM-B) sends a request to the TM of Trust Domain A (TM-A) asking for access to a DM that is storing data for the device of interest in step (19200). Based on the Configuration Policy of TM-A, the request can be denied, which ends the process, or it can be granted in step (19210). If it is granted, TM-A looks for a DM that is storing data from the device and the DM is configured to be a member of Trust Domain B in step (19220), and the DM is configured to share data with DMs of Trust Domain B in step (19230) and the process is complete.

FIG. 20 depicts one embodiment in which the network of FIG. 3A includes two TDs: TD A, comprising a TM (20082') two CUs (20084 & 20086) and a DM (20087), and TD B, comprising a TM (20092), two CUs (20098 & 20032) and two DMs (20093 & 20034). There is also a device (20010), which is visible to CU (20086) of TD A, and also visible to CU (20032) of TD B. None of the NMCs of either TD share membership in the other TD. Both CUs (20032 & 20086) collect data from the device (20010) and store it in their respective DMs (20093 & 20087). This form of separate data collection without sharing across TD boundaries is referred to herein as "Model 3."

In some exemplary embodiments, when an NMC is made a part of a TD, it is given a Trust Domain Specification Template by the controlling TM of the TD. The Trust Domain Specification Template provides the several pieces of information, as described above, which are useful for permitting trusted interactions within the TD without requiring communication with the TM to provide validation of each interaction. For NMCs instantiated by a TM, the Trust Domain Specification Template can be provided as an embedded or included template so that the NMC has at least one TD membership. Additional TD memberships can be provided as embedded or included templates or can be dynamically provided at any time by a TM with an appropriate privilege specification and TD membership.

In other exemplary embodiments, in addition to being made a member of a TD by a TM, an NMC also can request membership in a TD. As depicted in the flowchart of FIG. 21, one embodiment of such a process begins with the NMC sending a request for TD membership (in the form of a Request-Response Template) to the TM that controls the TD in the step (21010). The TM checks the Configuration Policy to determine whether TD membership should be granted in step (21020). The decision can be automatic based on the content of the Configuration Policy, which may list permitted devices, device types, address ranges, or other specifications, or it can be manual, with a human operator being queried for permission. If access is not granted in step (21020), a rejection is sent to the requesting NMC in step (21025) and the process is complete. If access is granted in step (21020), the TM determines the appropriate privileges to grant in step (21030) based on the Configuration Policy, operator input, or both, and sends a Trust Domain Specification Template containing the TD credentials and other information to the requesting NMC in step (21040). The requesting NMC stores the template information in its Registry in step (21050) and the process is complete.

In some embodiments, NMCs can leave, or be removed from, TDs as well as join them. FIG. 22 comprises a flow chart depicting one example of such a process for removing an NMC from a TD in an exemplary embodiment. In some embodiments, the TM initiates removal of one or more NMCs (e.g. at operator request, based on Configuration Policy settings, or for other reasons), and in other scenarios the NMC can request removal from the TD in the step (22010). Regardless of the reason for removal, the method of removal involves the remaining members of the TD being issued an updated Trust Domain Specification Template, based on a new encryption key, so the next step in the process is for the TM to generate a new public/private encryption key pair in step (22020). The TM then generates new Trust Domain Specification Templates containing the new public key value and sends these to the remaining NMCs in step (22030). The remaining NMCs replace their old Trust Domain Specification Template information with information from the new templates in the step (22040) and the process is complete. NMCs that were removed do not receive new Trust Domain Specification Templates, and so do not have credentials that validate with the new public keys issued to the remaining NMCs, and so are effectively barred from participation in the TD. In alternative embodiments, the update of the Trust Domain Specification templates can involve the TM notifying remaining TD member NMCs to send requests for updated Trust Domain Specification Template information, as described elsewhere herein.

5.2.13 Data Routing

FIG. 23, which depicts the network of FIG. 3A superimposed with lines of data flow (23105, 23110, 23115, 23120, 23125, 23130, 23135, 23140, 23145, 23150, 23155, 23160, 23165 & 23180) resulting from embodiments in which each CU routes collected data directly or indirectly to one or more DMs. In more specific embodiments, a CU may route data to a DM located on the same device, as with CU (23088) routing data to DM (23083). Alternately a CU may route data r to a DM located on a different device, as with CU (23063) routing data to DM (23083). In some embodiments, the CU routes data to a single DM directly, as the CU (23084) does to the DM (23087) over the network link (23063). In some embodiments, a CU routes data directly to a plurality of DMs, as the CU (23032) located on the DB Server in the D.C. Office is depicted as doing over the links (23160) and (23120). A first CU can route data indirectly through one or more second CUs, as the CU (23078) is depicted doing using the CU (23026) and the CU (23088). Note that a first CU (23026) can route data for a plurality of second CUs (23078 & 23024). A CU can route data indirectly to a plurality of DMs, as the CU (23073) is depicted doing, using the two CUs (23084 & 23086). Note that because the CU (23086) routes its data through the CU (23084), the CU (23084) might see the data collected by the CU (23073) more than once; the first time directly from the CU (23073) and again by way of the CU (23086). The DM (23087) eliminates duplicate data and stores only a single copy. Alternatively, the DM can store both copies, with or without details of the route taken by the data, if such information is deemed worthwhile by those having skill in the art.

FIG. 23 also illustrates embodiments in which a DM (23068) accepts data from a single CU (23063), or from a plurality of CUs (23093), even if the CUs are located on different network segments (23083), or if the CUs are routing data to a plurality of DMs (23032).

In some embodiments, CUs send data to DMs on the same device they are instantiated on (e.g. 23088 to 23083), in other embodiments, to another device on the same Local Area Network (LAN) (e.g. 23024 to 23034), and in still other embodiments, to a DM on a remote network (e.g. 23063 to 23083), or to two or more DMs wherever located (e.g. 23032). In yet other embodiments, a first CU (23024 or 23073) sends data to a second CU (23026 or 23084) for relaying to a DM (23034 or 23087), e.g., for purposes of efficiency, due to limitations of hardware, or for other reasons. In some embodiments, such relaying by CUs also is done when the first CU (23078) is on a different device from the second CU (23026). Where a given CU sends data depends on the configuration of the CU and potentially on the CUs ability to connect to various DMs when configured for prioritized sending with alternative DMs to deal with intermittent or unreliable DM availability. CUs can be configured to send data to a single DM (23088), send duplicate copies of data to two or more DMs for redundant storage (23032), send data to various DMs based on the type of data, where or when it was collected, or based on other factors that will be clear to those having skill in the art.

In some embodiments, Data Routing Specification Templates provided by a TM provide data routing and pre-processing specifications, and support failover to alternate data routing specifications based on NMC reachability as well as data priority. This is advantageous because it increases the flexibility of the overall management process to support a variety of network topologies. Specifically, the ability to change data routing and pre-processing permits the deployment of CUs in situations where a DM is not readily available, in circumstances where persistently available communications between the CU and the DM are not available, and in circumstances where a plurality of CUs are used to monitor a single network resource and the collected monitoring information is combined at the DM. When a plurality of CUs collect the same data, the DM can be configured to eliminate the duplication and store only a single copy of the data from one of the CUs that collected it. Alternatively, in some exemplary embodiments, a single copy of the data can be stored, with separate record being made of each of the CUs that collected the data. In other exemplary embodiments, separate copies of the data are retained from each CU that collected it. When there are no overriding Data Routing Specification Templates present, the collected data storage specifications implicit in the design of the CU determines how data is to be routed and stored. For example a CU can be designed to cache data locally until polled by a DM by default.

5.2.13.1 Priority and Data Routing

In some exemplary embodiments, priority values associated with specific Data Storage Definition Templates or Data Routing Specification Templates can affect how data is processed and routed. For example, normal priority data can be routed to a particular DM, with the receiving DM's configuration causing it to distribute the collected data to other DMs during scheduled data synchronization sessions, while high priority data is routed to a plurality of DMs directly to reduce the delay in having the high priority data visible to all DMs and the NMCs that access them. Normal priority data, in this example, is not routed directly to all DMs in order to reduce network traffic load and CU workload when delay in disseminating information is acceptable. In other exemplary embodiments priority values can be assigned in finer increments than the binary high/normal just described, such as by use of numerical values, with larger values having higher priority than smaller values, by calculations involving current traffic load, data priority, time of day or other factors, or by other means as will be understood by those having skill in the art. As can readily be seen by those with skill in the art, the principle of sending higher priority data by different routing than lower priority data remains the same, regardless of the method of specifying relative priority values.

In some exemplary embodiments, a temporary increase in priority of all transmitted data can be defined by a Data Routing Specification Template for situations when the DM or DMs specified by the Data Routing Specification Template are not reachable. This increase in priority can cause additional Data Routing Specification Templates to be used, which can result in the data being routed to a DM or DMs that are reachable. This use of alternative routing specifications when a given destination NMC is not reachable is referred to herein as "fallback." The priority increase is temporary, and confined to the CU that is transmitting the data; it is not a change in the priority specified in the Data Definition Template itself, and does not apply in other NMCs that may relay or forward the Data Definition Template.

FIG. 24 is a diagram depicting a CU (24010), and some of the elements of its three Data Routing Specification Templates (24100), as well as the four DMs it routes data to: DM1 (24020), DM2 (24030), DM3 (24040) and DM4 (24045) according to an exemplary embodiment. In the exemplary embodiment depicted, priority values comprise positive integers, with larger integer values describing higher priorities, and smaller integer values describing lower priorities. Data is routed to a particular DM when the priority of the data (the Priority element of the Data Definition Template containing the data), plus any temporary priority increase applied by the CU, is equal to, or greater than, the Data Priority Required element of the Data Routing Specification Template. In the example depicted by FIG. 24, all data is routed from the CU (24010) to DM1 (24020) over the network route (24050), because the Data Priority Required for that Data Routing Specification Template is zero, and no data Priority value can be less than zero. Data with Priority element values greater than 19 additionally is routed (24060) to DM2 (24030) over the route (24060). Data with Priority element values greater than 99 additionally is routed) to DM3 (24040) over the route (24970). Data with Priority element values greater than 999 additionally is routed to DM4 (24045) over the route (24080).

Continuing with the discussion of FIG. 24, temporary priority increase is applied to data that matches one or more Data Routing Specification Templates, but which cannot be sent to any destination due to the specified destination(s) not being reachable. For example, data contained in a Data Definition Template with a Priority element of 30 would match the Data Routing Specification Template that routes data to DM1 (24020), because a priority of 30 is greater than the Data Priority Required element of 0 required by that template, and to DM2 (24030), because the priority of 30 is greater than the Data Priority Required element of 20 required by that template. The other two Data Routing Specification Templates would not match, because they require a Priority element value of 100 and 1000, respectively, and 30 is less than either of these. If the Route To Reference elements of the matching Data Routing Specification Templates DM1 (24020) and DM2 (24030)) specify destinations that are not reachable, the data cannot be sent with its current Priority value, and so a temporary priority increase operation is performed to find a "fallback" destination to route the data to. The temporary priority increase chosen is the smallest increase that results in a match with a Data Routing Specification Template with a reachable Route To Reference destination. In the example illustrated in FIG. 24, there are two Data Routing Specification Templates that the data priority matches, but which do not specify reachable destinations, and the Priority Increase values of these templates are candidates for use in temporarily increasing the priority of the data to be sent. The template specifying DM1 (24020) has a Priority Increase value of 100, and the template specifying DM2 (24030) has a Priority Increase value of 50. 50 is less than 100, so 50 is chosen as the temporary priority increase value. The temporary priority increase value is added to the priority of the data, 30, and a temporary priority value of 80 is obtained. This value still does not match a Data Routing Specification Template with a reachable destination, so the next largest Priority Increase value, 100, is selected and added to the data priority value of 30, resulting in a temporary priority value of 130. This priority value matches the Data Routing Specification Template that specifies DM3 (24040) as the destination. DM3 (24040) is reachable, so the data is routed (24070) to DM3 (24040) and the process is complete. The Data Definition Template with the data arrives at DM3 (24040) with a Priority value of 30, because temporary priority increases are not stored in the template and are discarded once the priority increase operation is complete. The data is not routed to DM4 (24045), because even with the temporary priority increase to 130, the resulting priority does not match the value of 1000 required to route data (24080) to DM4 (24045).

FIG. 25 shows an exemplary process flow chart that describes the processing involved in selecting destinations to transmit prioritized data to and from a CU, with or without a temporary priority increase. The first step (25010) is to compare the Priority element of the Data Definition Template to be transmitted to each of the CU's Data Routing Specification Template Data Priority Required elements. A list is created, comprising those Data Routing Specification Templates that match the Data Definition Template's Priority element specification (i.e., the Data Definition Template Priority value is greater than, or equal to, the Data Routing Specification Template's Data Priority Required element). If no matches are found in step (25020), an error condition results in step (25060) because the CU has no valid destinations to send the data to. In some exemplary embodiments, the error is resolved by increasing the Priority element value of the Data Definition Template to the smallest value found in any of the CUs Data Routing Specification Templates and the procedure is restarted. In other exemplary embodiments, the error is reported to an operator or to a TM, the CU is given a new or updated Data Routing Specification, and the process terminates. Still other exemplary embodiments can provide other processes for resolving the error condition, as may be determined to be appropriate by those having skill in the art.

If at least one match is found in step (25020), the CU next determines if the destination specified by the Route To Reference element of the matching Data Routing Specification Template is reachable, for each matching template. If one or more destinations are reachable as determined in step (25030), the data is sent to the matching, reachable, destinations in step (25090) and the process is complete. If no destination is reachable as determined in step (25030), a list of the Priority Increase values for the Data Routing Specification Template in the destination list is created in step (25040). A search is made for the smallest value in the Priority Increase list that, when added to the Priority element of the Data Definition Template of the data to be sent, results in a match with at least one additional Data Routing Specification Template in step (25050). If such a value does not exist as determined in step (25070), the process terminates without sending the data. If a priority increase value is found that matches at least one additional Data Routing Specification Template in step (25070), and the destination specified by the matching template(s) is/are reachable as determined in step (25080), the data is sent to the destination(s) specified by the matching template(s) in step (25090) and the process is complete. If at least one additional matching Data Routing Specification Template was found in step (25070), but the destination specified by it also is not reachable as determined in step (25080), then larger Priority Increase values, if any, are used to attempt to find another matching Data Routing Specification Template or Templates in step (25050) and the process continues until either a matching, reachable destination is found and the data is sent, which terminates the process, or all of the Priority Increase values in the list have been tried without finding a matching, reachable destination and the process terminates.

5.2.13.2 Collection Unit Data Transmission Methods

In some embodiments, CUs also handle data transmission in various ways, whether the data was originally collected by a first CU or by a second CU that is using a first CU to route the data. One example of such embodiments is depicted in FIG. 26. In a first method (26000) a CU (26010) can send data in step (26020) to at least one DM (26030) as it is collected. This method places the lowest resource burden on the device hosting the CU, but can be problematic if connectivity with DM(s) is interrupted. In such instances, a CU can be configured to use an alternate method of handling data, such as a second method (26100), in which a CU (26110) can cache data in a cache (26120) using standard caching methods prior to sending data in step (26130) to at least one DM (26140), with send occurring at periodic intervals, when the network is otherwise idle, when cache storage reaches a predetermined state, when the device's interfaces are otherwise idle, or based on other criteria as determined to be proper by those having skill in the art. Alternately, in a third method (26200), a CU (26210) can cache data in cache (26220) until a DM (26230) requests the data to be sent in step (26240). Alternately, in a fourth method (26300), a CU (26310) can apply one or more rules in step (26320) to determine whether to generate an Alert or Trap (26325) based on data being sent, and which of the prior described methods to use to transmit the data: send immediately (26330) to the DM (26340), cache in the cache (26350) then send to the DM (26360) in step (26355), or cache the data in the cache (26370) until the DM (26380) requests a send (26395) in step (26390). Rules can be used to define data in various ways, such as all data, data matching specified criteria (e.g., from and/or to a particular device or device type, containing a particular protocol, collected at specified times, collected by a particular CU, collected on a particular network segment, matching a particular pattern, etc.).

When caching data for transmission, a method of avoiding cache overflow is preferred. In some exemplary embodiments, when resources for caching additional data are near depletion, a CU can employ a variety of methods to reduce the chance of the cache being fully depleted. The CU can refuse to accept additional data for relaying, which places the burden on CUs attempting to route data indirectly, but reserves what cache resources remain for data collected by the CU itself. If CUs attempting to route indirectly do not have the ability to cache data, and do not have alternate routes to send data over, data can be lost. Alternatively, a CU with insufficient remaining cache resources can send some or all cached data to a DM, even if the CU is configured to cache data until a DM requests transmission. Alternatively, the CU can send a request to one or more DMs asking that the DMs request transmission from the CU. If the CU cannot, for whatever reason, send data to free cache resources, the CU can delete data from the cache until sufficient levels of cache are restored. In deleting data, the CU uses rules that are embedded or dynamically configured into the CU, such as by use of a dynamic application, to determine which data to delete. For example, in some exemplary embodiments, certain types of data can have a limited useful life span, after which it is no longer useful. Data that has passed its useful life can be deleted without loss of functionality in such embodiments. In some exemplary embodiments, data can be marked with an expiration time and deleted once this time has been reached, regardless of whether the CU is low on available cache. In such exemplary embodiments, the expiration time also can be used by DMs to determine data retention limits. In some exemplary embodiments, data can be prioritized as to importance. In such embodiments, data with a lower priority can be deleted to create cache space for data with higher priority. Regardless of the method used to deal with insufficient cache resources, a CU experiencing this condition is considered to be overloaded, and alerts one or more TMs responsible for managing the CU to this condition. One or more of the TMs can respond by reducing the load on the CU, such as by adjusting the tasks performed by the CU to reduce locally generated data, the data routing templates of CUs routing data indirectly through the overloaded CU to cause them to route their data by alternate paths, the tasks performed by DMs that request data from the CU to cause them to poll for data more frequently, or by other adjustments to one or more components of the network management system.

5.2.13.3 Collection Unit Data Processing

In some embodiments, CUs also have several methods by which they can process data prior to attempting to transmit it. Pre-transmission data processing is specified as part of a Data Element Definition Template in some exemplary embodiments. In alternative exemplary embodiments, pre-transmission data processing is specified as part of a Data Routing Specification Template. In yet other alternative embodiments, pre-transmission data processing is specified by either of these templates, or by dynamic application functionality, by CU configuration, or by other means as will be known to those with skill in the art. Some exemplary illustrative methods are depicted in the diagrams of FIG. 27.

In a first method (27000), the CU (27010) performs no processing on the data, and simply passes the data on in step (8020) for transmission, as described above.

In a second method (27100), the CU (27110) performs filtering in step (27120) before passing the data that survives filtering on in step (27130) for transmission as described above. Data that does not pass the filtering process is deleted. Alternatively, in some exemplary embodiments, data can be filtered by the collection process, and thus data specified by the filtering specification is never collected. For example, if the configuration of the filter specifies that only data sent over one of two networks visible to the CU is of interest, the CU can collect data from only that network, and not collect any data from the other network. Such filtering can reduce the resource requirements of the CU. Filtering is configured statically by templates embedded in the CU prior to instantiation and/or dynamically by templates sent to the CU by one or more controlling TMs.

In a third method (27200), the CU (27210) performs processing of data in step (27220) prior to passing the processed data on in step (27230) for transmission as described above. Processing is defined statically by Data Routing Specification templates embedded in the CU prior to instantiation, and/or dynamically by Data Routing Specification templates sent to the CU by one or more controlling TMs. In some exemplary illustrative embodiments, CUs can process data in various ways, such as by adding annotations to identify protocols or devices, converting data to a standardized format such as XML, truncating, editing, compressing, encoding or encrypting data, extracting information from collected data, such as the address that originated the data, the address the data was destined for, or the device type or identification of the originating device. In some exemplary embodiments, CUs process data by computing derivative data, such as the rate at which a device is generating transmissions, the average size of messages from a given device, the rate of change in message generation frequency by a particular device or for a particular protocol, or other such data. Processing collected data in CUs in this manner can reduce the workload and resource requirements of DMs that ultimately receive the data by shifting the processing burden to the CU. This can be desirable when there are many CUs for each DM, or when the CUs are hosted on systems with large resource limits compared to the system(s) hosting the DM(s). In some scenarios, only derivative data is desired, and determining this data at the CU can eliminate the requirement to send the original collected data at all, thus reducing the network traffic load from network management system activities. By routing data indirectly through other CUs that are configured to perform processing of data, CUs with limited processing resources can still avoid burdening DMs. Configuration of CU processing is performed by TMs having control over the CU.

In a fourth method (27300), the CU (27310), filters data in step (27320) and also processes data which survives filtering in step (27330), before sending the processed data on for transmission in step (27340) as described above.

In a fifth method (27400), the CU (27410) uses one or more rules in step (27420) to determine how data is to be handled. Rules can be used to define data in various ways, such as all data, data matching specified criteria (e.g., from a particular device or device type, containing a particular protocol, collected at specified times, collected by a particular CU, etc.) or data matching one or more specified patterns, or no data. Rules also can specify how data that meets particular definitions is to be dealt with, such as passing it along for transmission as described above in step (27430), filtering the data in step (27440) to eliminate unwanted data before passing it along for transmission as described above in step (27450), processing the data in some way in step (27460) prior to passing it along for transmission as described above in step (27470), or filtering the data in step (27480) and then processing the data that survives filtering in step (27490) before passing the processed data along for transmission as described above in step (27495).

The data processing described herein for CUs can, in some exemplary embodiments, be performed by DMs, such as when a first DM is forwarding, copying, or summarizing data being sent to a second DM. Such processing is specified by TMs having control over the DM.

While the invention has been described above in terms of exemplary illustrative non-limiting implementations, it is not limited thereto. Various features and aspects of the invention may be used individually or jointly. Further, although the invention has been described in the context of its exemplary illustrative non-limiting implementations in particular network environments, and for particular applications in those network environments, those skilled in the art will recognize that its usefulness is not limited thereto and that the present invention can be beneficially utilized in any number of environments and implementations where it is desirable to manage a collection of network devices and the communication networks used to interconnect the network devices. Accordingly, the claims set forth below should be construed in view of the full breadth and spirit of the invention.

We claim:

1. A network management system comprising:
    an arrangement of network task managers deployed on a network, subnetwork or host computing system(s), said arrangement of network task managers comprising non-transitory storage media storing at least one specification defining trust domain membership and/or privileges including specifying:
        at least one task manager software authorized to operate on a trust domain,
        at least one hardware computing component upon which the task manager software is authorized to operate,
        at least one network collection software,
        at least one collection hardware computing component upon which the network collection software is authorized to operate,
        at least one network collection specification specifying information the at least one network collection software is authorized to collect from the network,
        at least one data manager software, and
        at least one data management computing component upon which the data manager software is authorized to operate;
    wherein the at least one hardware computing component upon which the specification authorizes the task management software to operate includes a processor, storage, network interface, and operating system software, the at least one hardware computing component upon which the specification authorizes the task management software to operate executing said task manager software to at least in part manage the trust domain,
        wherein the at least one collection hardware computing component including a processor, storage, network interface, and operating system software, the at least one collection hardware computing component executing said network collection software to collect information about the network, subnetwork or host computing system(s); and
        wherein the at least one data management computing component including a processor, storage, network interface, and operating system software, the at least one data management computing component executing said data manager software.

2. The system of claim 1 wherein the at least one specification defining trust domain membership and/or privileges provides an authorization to install the data manager software on the data management computing component.

3. The system of claim 1 wherein the at least one specification defining trust domain membership and/or privileges provides an authorization for the task manager software to communicate with and control the operation of the data manager software on the data management computing component.

4. The system of claim 1 wherein the at least one specification defining trust domain membership and/or privileges provides an authorization to configure the data manager software on the data management computing component.

5. The system of claim 1 wherein the at least one specification defining trust domain membership and/or privileges specifies information to be managed by the data manager software at least in part within the at least one network collection specification.

6. The system of claim 1 wherein the network collection software and the data manager software are configured to communicate therebetween.

7. The system of claim 6 wherein the at least one specification defining trust domain membership and/or privileges authorizes communicating between the network collection software and the data manager software.

8. The system of claim 6 wherein the task manager software configures the network collection software and the data manager software to communicate therebetween.

9. A system of claim 1, wherein the task manager software and the data manager software are configured to communicate therebetween.

10. The system of claim 9 wherein the task manager software is configured to communicate, to the data manager software and the network collection software, a specification for information communicated between the network collection software and the data manager software.

11. The system of claim 9, wherein the task manager software is configured to provide a status check of operations of the data manager software.

12. The system of claim 11, wherein the task manager software is configured to communicate with the data manager software, determine the status of the data manager software, and take an action based upon determined status.

13. The system of claim 12, wherein the action comprises restarting the data manager software.

14. The system of claim 12, wherein the action comprises reconfiguring the data manager software.

15. The system of claim 12, wherein the action comprises altering the at least one specification defining trust domain membership and/or privileges, instantiating new data manager software, and configuring the new data manager software to operate using at least part of the network collection specification.

16. The system of claim 15, wherein the action further comprises configuring the network collection software to communicate with the newly instantiated data manager software.

17. The system of claim 1, wherein the at least one specification defining trust domain membership and/or privileges includes at least two specifications for the data manager software and at least two specifications for the data management computing component.

18. The system of claim 17, wherein the task manager software and at least two data manager softwares executing on respective specified data management computing components are configured to communicate therebetween.

19. The system of claim 17, further including the two data manager softwares sharing at least some of the information stored in or by one of the at least two data manager softwares, said sharing being defined in the trust domain, and the task manager software configures the data manager softwares using configuration specification in the at least one specification defining trust domain membership and/or privileges.

20. The system of claim 19 wherein said network collection software is configured to forward collected data to the data manager software along a route selected based at least in part on priority.

21. The system of claim 1 wherein said at least one network collection software is configured to store collected data individually for different data manager softwares.

22. The system of claim 1 wherein said at least one network collection software is configured to push collection data to said data manager software.

23. The system of claim 1 wherein said at least one network collection software is configured to cache and push collection data to said data manager software.

24. The system of claim 1 wherein said at least one network collection software is configured to cache and preprocess collection data, and then transmit at least part of the collection data to said data manager software.

25. The system of claim 24 wherein said at least one network collection software is configured to digest and push collection data to said data manager software.

26. The system of claim 1 wherein said at least one network collection software is configured to cache collection data, preprocess the collection data, and make at least part of the collection data available to said data manager software for retrieval.

* * * * *